(12) United States Patent
Dutta

(10) Patent No.: US 11,627,077 B2
(45) Date of Patent: Apr. 11, 2023

(54) RELIABLE OVERLAY BASED ON RELIABLE TRANSPORT LAYER

(71) Applicant: NOKIA SOLUTIONS AND NETWORKS OY, Espoo (FI)

(72) Inventor: Pranjal Kumar Dutta, Sunnyvale, CA (US)

(73) Assignee: NOKIA SOLUTIONS AND NETWORKS OY, Espoo (FI)

( * ) Notice: Subject to any disclaimer, the term of this patent is extended or adjusted under 35 U.S.C. 154(b) by 56 days.

(21) Appl. No.: 17/068,908

(22) Filed: Oct. 13, 2020

(65) Prior Publication Data

US 2022/0116319 A1 Apr. 14, 2022

(51) Int. Cl.
*H04L 45/50* (2022.01)
*H04L 45/64* (2022.01)
*H04L 69/18* (2022.01)
*H04L 69/324* (2022.01)

(52) U.S. Cl.
CPC .............. *H04L 45/50* (2013.01); *H04L 45/64* (2013.01); *H04L 69/18* (2013.01); *H04L 69/324* (2013.01)

(58) Field of Classification Search
CPC ......... H04L 45/50; H04L 45/64; H04L 69/18; H04L 69/324
See application file for complete search history.

(56) References Cited

U.S. PATENT DOCUMENTS

| | | | |
|---|---|---|---|
| 7,983,174 B1 * | 7/2011 | Monaghan | H04L 45/50 370/242 |
| 9,948,579 B1 | 4/2018 | Sivaramakrishnan | |
| 10,318,470 B1 * | 6/2019 | Kugel | G06F 13/4282 |
| 10,958,481 B2 * | 3/2021 | Bottorff | H04L 12/66 |
| 11,201,820 B2 * | 12/2021 | Song | H04L 45/34 |
| 11,258,823 B2 | 2/2022 | Dutta | |
| 2002/0163935 A1 | 11/2002 | Paatela et al. | |

OTHER PUBLICATIONS

Xu, X., et al., "Encapsulating MPLS in UDP," Internet Engineering Task Force (IETF), RFC 7510, Apr. 2015, 19 pages.
Information Sciences Institute University of Southern California, "Transmission Control Protocol," Darpa Internet Program, Protocol Specification, RFC 793, Sep. 1981, 89 pages.

(Continued)

*Primary Examiner* — Chandrahas B Patel
(74) *Attorney, Agent, or Firm* — Tong, Rea, Bentley & Kim, LLC

(57) ABSTRACT

Various example embodiments for supporting reliability of an overlay are presented herein. Various example embodiments for supporting reliability of an overlay may support reliable delivery of overlay packets. Various example embodiments for supporting reliable delivery of overlay packets may support reliable delivery of overlay packets of a label switching protocol. Various example embodiments for supporting reliability of an overlay may support reliable delivery of overlay packets based on a reliable transport layer. The reliable transport layer may be provided using a reliable transport layer protocol. The reliable transport layer protocol may be a connection-oriented protocol, may be configured to support flow control, may be configured to support congestion control, or the like.

19 Claims, 61 Drawing Sheets

(56) References Cited

OTHER PUBLICATIONS

Stewart, R., "Stream Control Transmission Protocol," Network Working Group, RFC 4960, Sep. 2007, 152 pages.

Iyengar, J., et al., "QUIC: A UDP-Based Multiplexed and Secure Transport," draft-ietf-quic-transport-28, May 20, 2020, 182 pages.

Rosen, E., et al., "MPLS Label Stack Encoding," Network Working Group, RFC 3032, Jan. 2001, 23 pages.

Rosen, E., et al., "Multiprotocol Label Switching Architecture," Network Working Group, RFC 3031, Jan. 2001, 61 pages.

Eckert, T., et al., "MPLS Multicast Encapsulations," Network Working Group, RFC 5332, Aug. 2008, 11 pages.

Information Sciences Institute University of Southern California, "Internet Protocol," Darpa Internet Program, Protocol Specification, RFC 791, Sep. 1981, 49 pages.

Deering, S., et al., "Internet Protocol, Version 6 (IPv6) Specification," Network Working Group, RFC 2460, Dec. 1998, 39 pages.

Farinacci, D., et al., "Generic Routing Encapsulation (GRE)," Network Working Group, RFC 2784, Mar. 2000, 9 pages.

Postel, J., "User Datagram Protocol," RFC 768, Aug. 28, 1980, 3 pages.

Eubanks, M., et al., "IPv6 and UDP Checksums for Tunneled Packets," Internet Engineering Task Force (IETF), RFC 6935, Apr. 2013, 12 pages.

IEEE, "802.1Qbb-Priority-based Flow Control," printed on Jun. 3, 2020 from https://1.ieee802.org/dcb/802-1qbb/, 9 pages.

IEEE, "802.1Qaz—Enhanced Transmission Selection," printed on Jun. 3, 2020 from https://1.ieee802.org/dcb/802-1qaz/, 13 pages.

Ford, A., et al., "TCP Extensions for Multipath Operation with Multiple Addresses," Internet Engineering Task Force (IETF), RFC 6824, Jan. 2013, 64 pages.

Floyd, S., et al., "An Extensions to the Selective Acknowledgement (SACK) Option for TCP," Network Working Group, RFC 2883, Jul. 2000, 17 pages.

Jacobson, V., et al., "TCP Extensions for High Performance," Network Working Group, RFC 1323, May 1992, 37 pages.

Braden, R., "Requirements for Internet Hosts—Communication Layers," Network Working Group, RFC 112, Internet Engineering Task Force, Oct. 1989, 116 pages.

Thomson, M. et al., "Using TLS to Secure QUIC," draft-ietf-quic-tls-28, QUIC Internet Draft, May 20, 2020, 55 pages.

Friedl, S., et al., "Transport Layer Security (TLS) Application-Layer Protocol Negotiation Extension," Internet Engineering Task Force (IETF), RFC 7301, 9 pages, Jul. 2014.

Worster, T., et al., "Encapsulating MPLS in IP or Generic Routing Encapsulation (GRE)," Network Working Group, RFC 4023, Mar. 2005, 14 pages.

European Search Report mailed in corresponding EP Application No. 21198103.0 dated Mar. 22, 2022, 10 pages.

\* cited by examiner

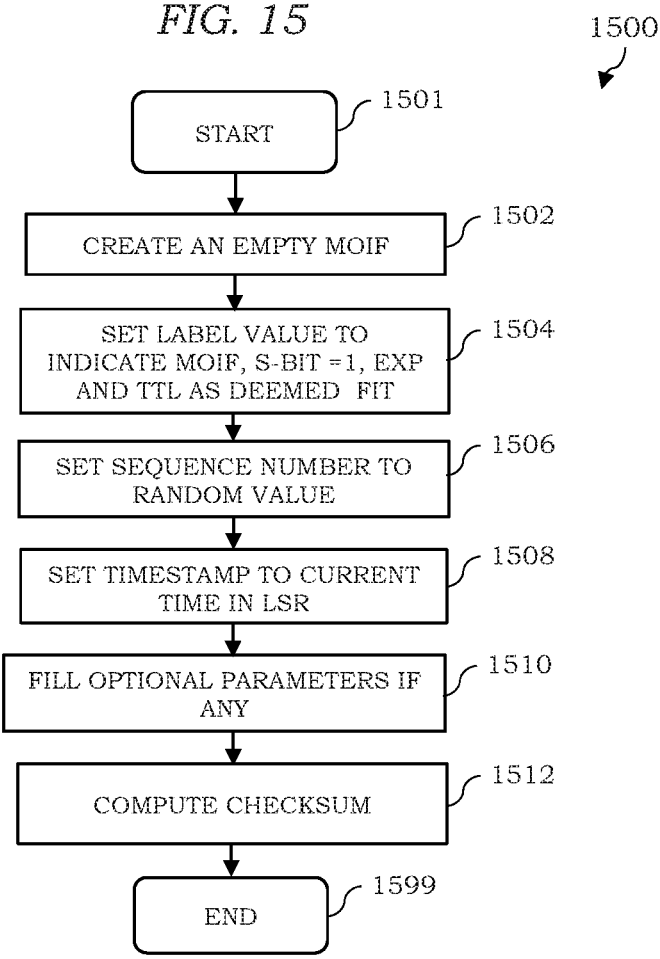
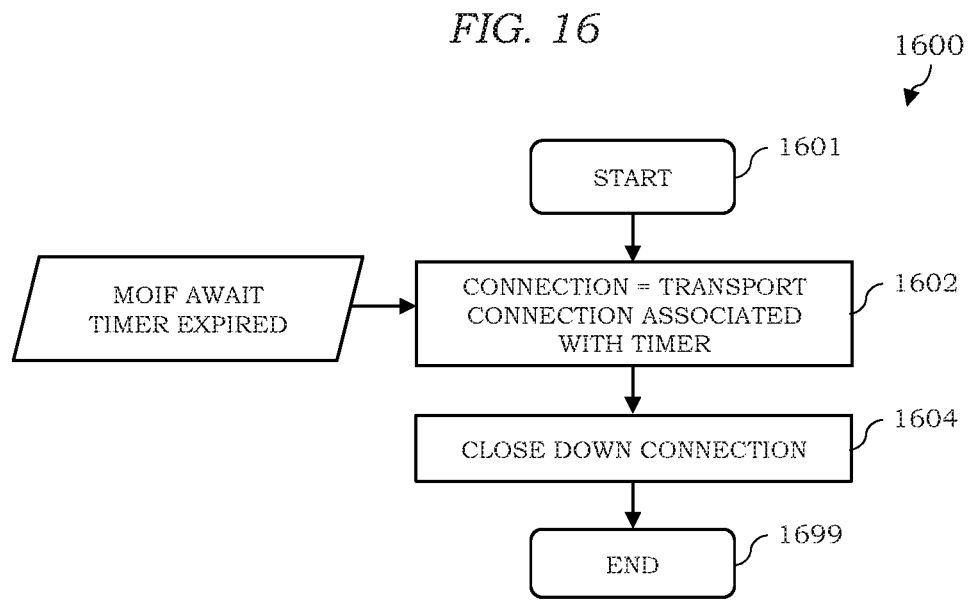

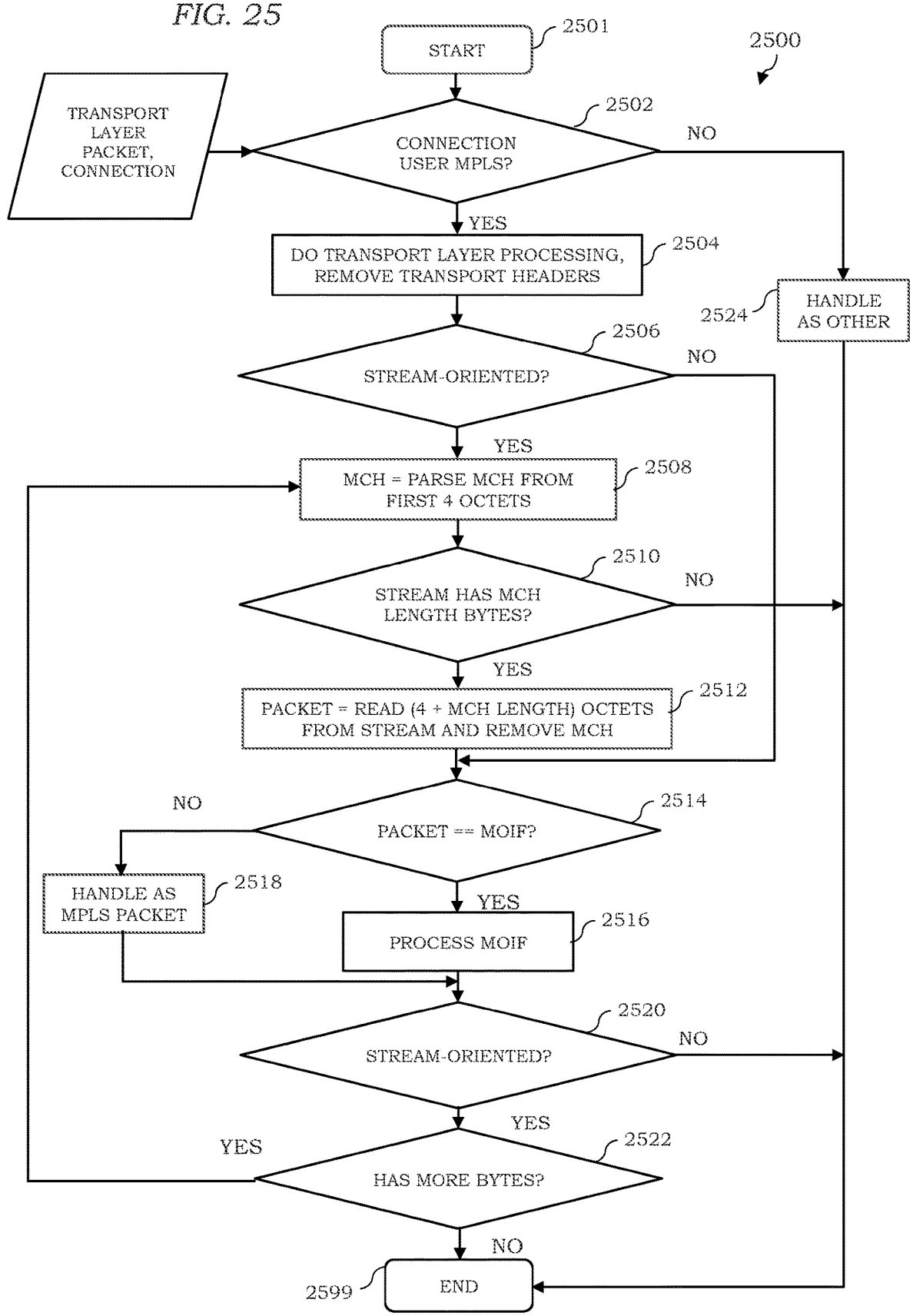

*FIG. 26*

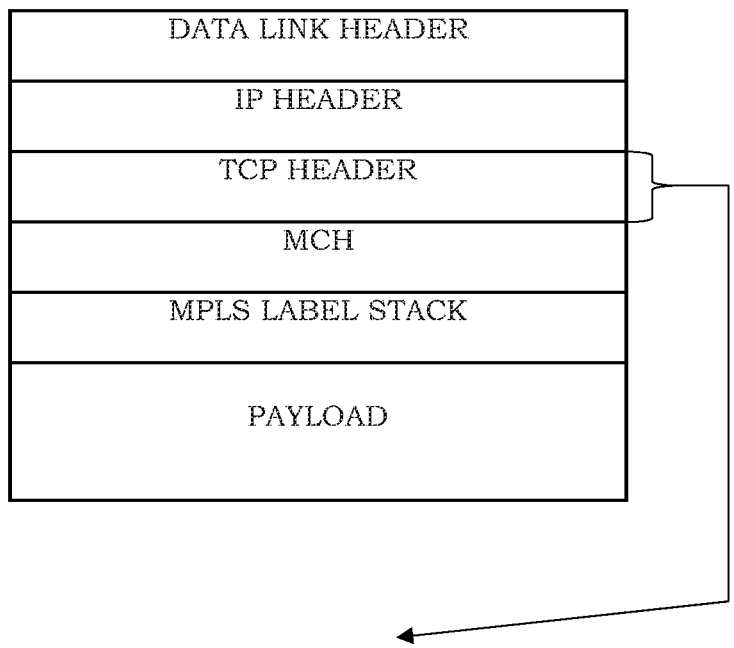

MPLS-IN-TCP
ENCAPSULATION
FORMAT
2600

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|     Source Port = Local ID    |     Destination Port = MPLS   |
+-+-+-+-+-+-+-+-+-+-+-+-+-+-+-+-+-+-+-+-+-+-+-+-+-+-+-+-+-+-+-+-+
|                        Sequence Number                        |
+-+-+-+-+-+-+-+-+-+-+-+-+-+-+-+-+-+-+-+-+-+-+-+-+-+-+-+-+-+-+-+-+
|                     Acknowledgment Number                     |
+-+-+-+-+-+-+-+-+-+-+-+-+-+-+-+-+-+-+-+-+-+-+-+-+-+-+-+-+-+-+-+-+
|  Data |           |U|A|P|R|S|F|                               |
| Offset| Reserved  |R|C|S|S|Y|I|            Window             |
|       |           |G|K|H|T|N|N|                               |
+-+-+-+-+-+-+-+-+-+-+-+-+-+-+-+-+-+-+-+-+-+-+-+-+-+-+-+-+-+-+-+-+
|           Checksum            |         Urgent Pointer        |
+-+-+-+-+-+-+-+-+-+-+-+-+-+-+-+-+-+-+-+-+-+-+-+-+-+-+-+-+-+-+-+-+
|                    Options                    |    Padding    |
+-+-+-+-+-+-+-+-+-+-+-+-+-+-+-+-+-+-+-+-+-+-+-+-+-+-+-+-+-+-+-+-+
```

FIG. 51

QUIC LONG HEADER 5100

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+
|1|1|T T|X X X X|
+-+-+-+-+-+-+-+-+-+-+-+-+-+-+-+-+-+-+-+-+-+-+-+-+-+-+-+-+-+-+-+-+
|                         Version (32)                          |
+-+-+-+-+-+-+-+-+-+-+-+-+-+-+-+-+-+-+-+-+-+-+-+-+-+-+-+-+-+-+-+-+
| DCID Len (8)  |
+-+-+-+-+-+-+-+-+-+-+-+-+-+-+-+-+-+-+-+-+-+-+-+-+-+-+-+-+-+-+-+-+
|               Destination Connection ID (0..160)           ...
+-+-+-+-+-+-+-+-+-+-+-+-+-+-+-+-+-+-+-+-+-+-+-+-+-+-+-+-+-+-+-+-+
| SCID Len (8)  |
+-+-+-+-+-+-+-+-+-+-+-+-+-+-+-+-+-+-+-+-+-+-+-+-+-+-+-+-+-+-+-+-+
|                 Source Connection ID (0..160)              ...
+-+-+-+-+-+-+-+-+-+-+-+-+-+-+-+-+-+-+-+-+-+-+-+-+-+-+-+-+-+-+-+-+
```

FIG. 52

QUIC SHORT HEADER 5200

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+
|0|1|S|R|R|K|P P|
+-+-+-+-+-+-+-+-+-+-+-+-+-+-+-+-+-+-+-+-+-+-+-+-+-+-+-+-+-+-+-+-+
|               Destination Connection ID (0..160)           ...
+-+-+-+-+-+-+-+-+-+-+-+-+-+-+-+-+-+-+-+-+-+-+-+-+-+-+-+-+-+-+-+-+
|                    Packet Number (8/16/24/32)              ...
+-+-+-+-+-+-+-+-+-+-+-+-+-+-+-+-+-+-+-+-+-+-+-+-+-+-+-+-+-+-+-+-+
|                     Protected Payload (*)                  ...
+-+-+-+-+-+-+-+-+-+-+-+-+-+-+-+-+-+-+-+-+-+-+-+-+-+-+-+-+-+-+-+-+
```

FIG. 53

GENERIC FRAME LAYOUT 5300

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|                         Frame Type (i)                     ...
+-+-+-+-+-+-+-+-+-+-+-+-+-+-+-+-+-+-+-+-+-+-+-+-+-+-+-+-+-+-+-+-+
|                    Type-Dependent Fields (*)               ...
+-+-+-+-+-+-+-+-+-+-+-+-+-+-+-+-+-+-+-+-+-+-+-+-+-+-+-+-+-+-+-+-+
```

*FIG. 54*

STREAM FRAME
5400

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+
|   Type (8)    |
+-+-+-+-+-+-+-+-+-+-+-+-+-+-+-+-+-+-+-+-+-+-+-+-+-+-+-+-+-+-+-+-+
|                         Stream ID (i)                       ...
+-+-+-+-+-+-+-+-+-+-+-+-+-+-+-+-+-+-+-+-+-+-+-+-+-+-+-+-+-+-+-+-+
|                         [Offset (i)]                        ...
+-+-+-+-+-+-+-+-+-+-+-+-+-+-+-+-+-+-+-+-+-+-+-+-+-+-+-+-+-+-+-+-+
|                         [Length (i)]                        ...
+-+-+-+-+-+-+-+-+-+-+-+-+-+-+-+-+-+-+-+-+-+-+-+-+-+-+-+-+-+-+-+-+
|                         Stream Data (*)                     ...
+-+-+-+-+-+-+-+-+-+-+-+-+-+-+-+-+-+-+-+-+-+-+-+-+-+-+-+-+-+-+-+-+
```

*FIG. 55*

GENERIC_STREAM FRAME
5500

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
| Type (0x20)   | Flags | Layer |         Protocol ID           |
+-+-+-+-+-+-+-+-+-+-+-+-+-+-+-+-+-+-+-+-+-+-+-+-+-+-+-+-+-+-+-+-+
|                         Stream ID (i)                       ...
+-+-+-+-+-+-+-+-+-+-+-+-+-+-+-+-+-+-+-+-+-+-+-+-+-+-+-+-+-+-+-+-+
|                         [Offset (i)]                        ...
+-+-+-+-+-+-+-+-+-+-+-+-+-+-+-+-+-+-+-+-+-+-+-+-+-+-+-+-+-+-+-+-+
|                         [Length (i)]                        ...
+-+-+-+-+-+-+-+-+-+-+-+-+-+-+-+-+-+-+-+-+-+-+-+-+-+-+-+-+-+-+-+-+
|                         Stream Data (*)                     ...
+-+-+-+-+-+-+-+-+-+-+-+-+-+-+-+-+-+-+-+-+-+-+-+-+-+-+-+-+-+-+-+-+
```

RELIABLE OVERLAY BASED ON RELIABLE TRANSPORT LAYER

TECHNICAL FIELD

Various example embodiments relate generally to communication systems and, more particularly but not exclusively, to supporting reliability of an overlay in a communication system.

BACKGROUND

In many communication networks, various communications technologies may be used to various communications.

SUMMARY

In at least some example embodiments, an apparatus includes at least one processor and at least one memory including a set of instructions, wherein the set of instructions is configured to, when executed by the at least one processor, cause the apparatus to support, by a communication device, communication of a packet, wherein the packet includes a payload, a header of a label switching protocol on the payload, and a header of a reliable transport layer protocol on the header of the label switching protocol. In at least some example embodiments, the header of the label switching protocol includes a set of labels. In at least some example embodiments, the set of labels is organized as a label stack. In at least some example embodiments, the label switching protocol is associated with a label switching overlay. In at least some example embodiments, the label switching protocol includes a Multiprotocol Label Switching (MPLS) protocol. In at least some example embodiments, the reliable transport layer protocol includes a connection-oriented transport layer protocol. In at least some example embodiments, the reliable transport layer protocol includes a transport layer protocol configured to support at least one of flow control or congestion control. In at least some example embodiments, the reliable transport layer protocol includes a Transmission Control Protocol (TCP), a Stream Control Transmission Protocol (SCTP), a Quick User Datagram Protocol (UDP) Internet Connection (QUIC) protocol, or a Transport Layer Security (TLS) protocol. In at least some example embodiments, the packet includes a control header between the header of the label switching protocol and the header of the reliable transport layer protocol. In at least some example embodiments, the control header is configured to indicate a size of the payload and the header of the label switching protocol. In at least some example embodiments, the packet includes a header of a network layer protocol on the header of the reliable transport layer protocol. In at least some example embodiments, the network layer protocol includes an Internet Protocol (IP). In at least some example embodiments, the packet includes a header of a data link layer protocol on the header of the network layer protocol. In at least some example embodiments, the data link layer protocol includes at least one of Ethernet or Point-to-Point Protocol (PPP). In at least some example embodiments, to support communication of the packet, the set of instructions is configured to, when executed by the at least one processor, cause the apparatus to generate, by the communication device, the packet and send, by the communication device toward a next-hop node, the packet. In at least some example embodiments, to support communication of the packet, the set of instructions is configured to, when executed by the at least one processor, cause the apparatus to receive, by the communication device, the packet and process the packet. In at least some example embodiments, the set of instructions is configured to, when executed by the at least one processor, cause the apparatus to support, by the communication device, communication of an overlay initial frame configured to convey one or more overlay parameters for an overlay that is supported between the communication device and a remote communication device based on the reliable transport layer protocol. In at least some example embodiments, the overlay initial frame is sent by the communication device toward the remote communication device or received by the communication device from the remote communication device.

In at least some example embodiments, a non-transitory computer-readable medium stores a set of instructions configured to cause an apparatus to support, by a communication device, communication of a packet, wherein the packet includes a payload, a header of a label switching protocol on the payload, and a header of a reliable transport layer protocol on the header of the label switching protocol. In at least some example embodiments, the header of the label switching protocol includes a set of labels. In at least some example embodiments, the set of labels is organized as a label stack. In at least some example embodiments, the label switching protocol is associated with a label switching overlay. In at least some example embodiments, the label switching protocol includes a Multiprotocol Label Switching (MPLS) protocol. In at least some example embodiments, the reliable transport layer protocol includes a connection-oriented transport layer protocol. In at least some example embodiments, the reliable transport layer protocol includes a transport layer protocol configured to support at least one of flow control or congestion control. In at least some example embodiments, the reliable transport layer protocol includes a Transmission Control Protocol (TCP), a Stream Control Transmission Protocol (SCTP), a Quick User Datagram Protocol (UDP) Internet Connection (QUIC) protocol, or a Transport Layer Security (TLS) protocol. In at least some example embodiments, the packet includes a control header between the header of the label switching protocol and the header of the reliable transport layer protocol. In at least some example embodiments, the control header is configured to indicate a size of the payload and the header of the label switching protocol. In at least some example embodiments, the packet includes a header of a network layer protocol on the header of the reliable transport layer protocol. In at least some example embodiments, the network layer protocol includes an Internet Protocol (IP). In at least some example embodiments, the packet includes a header of a data link layer protocol on the header of the network layer protocol. In at least some example embodiments, the data link layer protocol includes at least one of Ethernet or Point-to-Point Protocol (PPP). In at least some example embodiments, to support communication of the packet, the set of instructions is configured to cause the apparatus to generate, by the communication device, the packet and send, by the communication device toward a next-hop node, the packet. In at least some example embodiments, to support communication of the packet, the set of instructions is configured to cause the apparatus to receive, by the communication device, the packet and process the packet. In at least some example embodiments, the set of instructions is configured to cause the apparatus to support, by the communication device, communication of an overlay initial frame configured to convey one or more overlay parameters for an overlay that is supported between the communication device and a remote communication device based on the reliable transport layer protocol. In at least some example embodiments, the overlay initial frame is sent by the communication device toward the remote communication device or received by the communication device from the remote communication device.

In at least some example embodiments, a method includes supporting, by a communication device, communication of a packet, wherein the packet includes a payload, a header of a label switching protocol on the payload, and a header of a reliable transport layer protocol on the header of the label switching protocol. In at least some example embodiments, the header of the label switching protocol includes a set of labels. In at least some example embodiments, the set of labels is organized as a label stack. In at least some example embodiments, the label switching protocol is associated with a label switching overlay. In at least some example embodiments, the label switching protocol includes a Multiprotocol Label Switching (MPLS) protocol. In at least some example embodiments, the reliable transport layer protocol includes a connection-oriented transport layer protocol. In at least some example embodiments, the reliable transport layer protocol includes a transport layer protocol configured to support at least one of flow control or congestion control. In at least some example embodiments, the reliable transport layer protocol includes a Transmission Control Protocol (TCP), a Stream Control Transmission Protocol (SCTP), a Quick User Datagram Protocol (UDP) Internet Connection (QUIC) protocol, or a Transport Layer Security (TLS) protocol. In at least some example embodiments, the packet includes a control header between the header of the label switching protocol and the header of the reliable transport layer protocol. In at least some example embodiments, the control header is configured to indicate a size of the payload and the header of the label switching protocol. In at least some example embodiments, the packet includes a header of a network layer protocol on the header of the reliable transport layer protocol. In at least some example embodiments, the network layer protocol includes an Internet Protocol (IP). In at least some example embodiments, the packet includes a header of a data link layer protocol on the header of the network layer protocol. In at least some example embodiments, the data link layer protocol includes at least one of Ethernet or Point-to-Point Protocol (PPP). In at least some example embodiments, supporting communication of the packet includes generating, by the communication device, the packet and sending, by the communication device toward a next-hop node, the packet. In at least some example embodiments, supporting communication of the packet includes receiving, by the communication device, the packet and processing the packet. In at least some example embodiments, the method includes supporting, by the communication device, communication of an overlay initial frame configured to convey one or more overlay parameters for an overlay that is supported between the communication device and a remote communication device based on the reliable transport layer protocol. In at least some example embodiments, the overlay initial frame is sent by the communication device toward the remote communication device or received by the communication device from the remote communication device.

In at least some example embodiments, an apparatus includes means for supporting, by a communication device, communication of a packet, wherein the packet includes a payload, a header of a label switching protocol on the payload, and a header of a reliable transport layer protocol on the header of the label switching protocol. In at least some example embodiments, the header of the label switching protocol includes a set of labels. In at least some example embodiments, the set of labels is organized as a label stack. In at least some example embodiments, the label switching protocol is associated with a label switching overlay. In at least some example embodiments, the label switching protocol includes a Multiprotocol Label Switching (MPLS) protocol. In at least some example embodiments, the reliable transport layer protocol includes a connection-oriented transport layer protocol. In at least some example embodiments, the reliable transport layer protocol includes a transport layer protocol configured to support at least one of flow control or congestion control. In at least some example embodiments, the reliable transport layer protocol includes a Transmission Control Protocol (TCP), a Stream Control Transmission Protocol (SCTP), a Quick User Datagram Protocol (UDP) Internet Connection (QUIC) protocol, or a Transport Layer Security (TLS) protocol. In at least some example embodiments, the packet includes a control header between the header of the label switching protocol and the header of the reliable transport layer protocol. In at least some example embodiments, the control header is configured to indicate a size of the payload and the header of the label switching protocol. In at least some example embodiments, the packet includes a header of a network layer protocol on the header of the reliable transport layer protocol. In at least some example embodiments, the network layer protocol includes an Internet Protocol (IP). In at least some example embodiments, the packet includes a header of a data link layer protocol on the header of the network layer protocol. In at least some example embodiments, the data link layer protocol includes at least one of Ethernet or Point-to-Point Protocol (PPP). In at least some example embodiments, the means for supporting communication of the packet includes means for generating, by the communication device, the packet and means for sending, by the communication device toward a next-hop node, the packet. In at least some example embodiments, the means for supporting communication of the packet includes means for receiving, by the communication device, the packet and means for processing the packet. In at least some example embodiments, the apparatus includes means for supporting, by the communication device, communication of an overlay initial frame configured to convey one or more overlay parameters for an overlay that is supported between the communication device and a remote communication device based on the reliable transport layer protocol. In at least some example embodiments, the overlay initial frame is sent by the communication device toward the remote communication device or received by the communication device from the remote communication device.

BRIEF DESCRIPTION OF THE DRAWINGS

The teachings herein can be readily understood by considering the following detailed description in conjunction with the accompanying drawings, in which:

FIG. 15 depicts an example embodiment of a method for use by an initiating router for constructing a MOIF for a new reliable transport connection;

FIG. 16 depicts an example embodiment of a method for use by an initiating router when a MOIF response is not received within a predefined time period;

FIG. 25 depicts an example embodiment of a method for processing a packet received on a reliable MPLS overlay;

FIG. 26 depicts an example embodiment of an MPLS-in-TCP encapsulation format for implementation of a reliable MPLS overlay as MPLS-in-TCP;

FIG. 51 depicts an example embodiment of a QUIC Long Header for a QUIC packet for implementation of a reliable MPLS overlay as MPLS-in-QUIC;

FIG. 52 depicts an example embodiment of a QUIC Short Header for a QUIC packet for implementation of a reliable MPLS overlay as MPLS-in-QUIC;

FIG. 53 depicts an example embodiment of a stack of QUIC frames for a QUIC packet for implementation of a reliable MPLS overlay as MPLS-in-QUIC;

FIG. 54 depicts an example embodiment of a STREAM frame for a QUIC packet for implementation of a reliable MPLS overlay as MPLS-in-QUIC;

FIG. 55 depicts an example embodiment of a generic stream frame format for a QUIC packet;

To facilitate understanding, identical reference numerals have been used herein, wherever possible, in order to designate identical elements that are common among the various figures.

DETAILED DESCRIPTION

Figure 1:
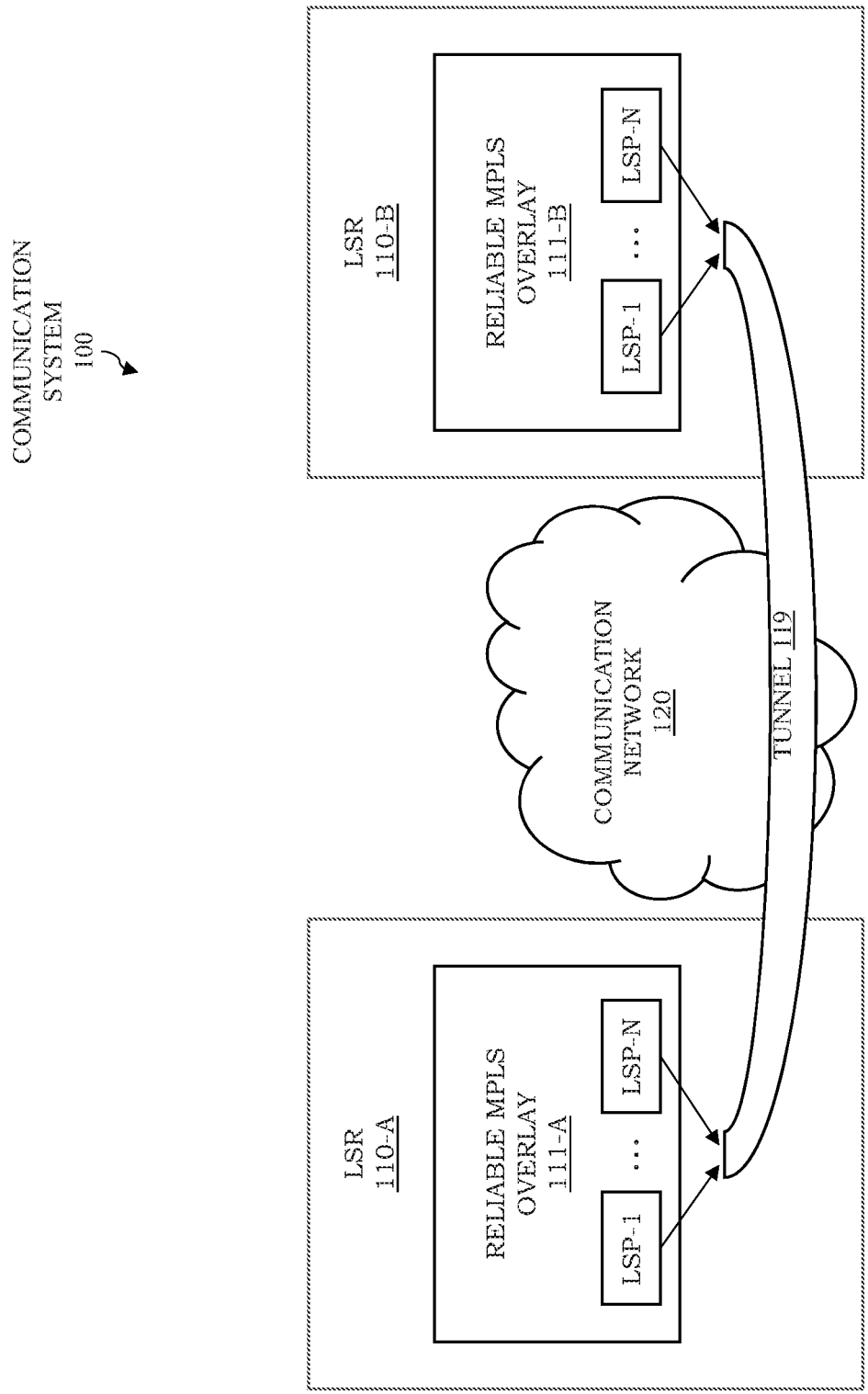
FIG. 1 depicts an example embodiment of a communication system configured to support a reliable MPLS overlay.

Various example embodiments for supporting reliability of an overlay are presented herein.

Various example embodiments for supporting reliability of an overlay may be configured to support reliable delivery of overlay packets. Various example embodiments for supporting reliable delivery of overlay packets may be configured to support reliable delivery of overlay packets of a label switching protocol. The label switching protocol may be the Multiprotocol Label Switching (MPLS) protocol or other suitable label switching protocol. The overlay packets of the label switching protocol may be supported using an underlay tunnel of a network layer protocol operating at the network layer. The network layer protocol may be an Internet Protocol (IP), such as IPv4 or IPv6, in which case the overlay packets of the label switching protocol may be supported using an IP underlay tunnel or any other suitable network layer protocol. The overlay packets of the label switching protocol may be considered to provide a label switching overlay, such that label switching devices exchanging the overlay packets via a label switched path may be considered to be adjacent on the label switched path even though the label switching devices are separated by an underlying network (e.g., an IP network based on an IP underlay tunnel). It will be appreciated that, where the label switching protocol is MPLS, the reliable overlay may be referred to as a reliable MPLS overlay.

Various example embodiments for supporting reliability of an overlay may be configured to support reliable delivery of overlay packets based on a reliable transport layer. The reliable transport layer may be provided using a reliable transport layer protocol. The reliable transport layer protocol may be a connection-oriented protocol. The reliable transport layer protocol may be configured to support reliability features such as loss less delivery, flow control, congestion control, or the like, as well as various combinations thereof. The reliable transport layer protocol may include a Transmission Control Protocol (TCP), a Stream Control Transmission Protocol (SCTP), a Quick User Datagram Protocol (UDP) Internet Connection (QUIC) protocol, Transport Layer Security (TLS) protocol, or other reliable protocol configured to operate at the transport layer. The reliable transport layer may be disposed between the label switching overlay (e.g., the MPLS overlay or other suitable overlay) and the underlying transport layer (e.g., the IP underlay or other suitable transport layer underlay).

It will be appreciated that, although primarily presented herein with respect to example embodiments in which the communication protocol layers are based on the Open Systems Interconnection (OSI) model (e.g., reliable transport layer protocols at the transport layer of the OSI model, network layer protocols at the network layer of the OSI model, and so forth), various example embodiments presented herein may be used with or may be adapted for use with communication protocol layers which may be based on other communication protocol layer models.

It will be appreciated that these and various other example embodiments and advantages or potential advantages of supporting reliability of an overlay may be further understood by way of reference to the various figures, which are discussed further below.

FIG. 1 depicts an example embodiment of a communication system configured to support a reliable MPLS overlay. The communication system 100 includes a pair of label switched routers (LSR) 110-A and 110-B (collectively, LSRs 110) and a communication network 120. The LSRs 110 support a reliable MPLS overlay 111 for reliable delivery of MPLS packets between the LSRs 110. The reliable MPLS overlay 111 is based on a reliable MPLS overlay 111-A on LSR 111-A and a reliable MPLS overlay 111-B on LSR 111-B. The reliable MPLS overlay 111 may have a reliable connection, based on a reliable transport protocol (e.g., TCP, SCTP, QUIC, TLS, or the like), established between the reliable MPLS overlay 111-A on LSR 111-A and the reliable MPLS overlay 110-B on LSR 110-B for supporting reliable delivery of MPLS packets from LSR 110-A to LSR 110-B. The reliable MPLS overlay 111 is configured to support reliable delivery of MPLS packets from LSR 110-A to LSR 110-B based on a set of N label switched paths (denoted as LSPs 1-N) that run over the reliable MPLS overlay 111. The reliable MPLS overlay 111 relies on an underlying tunnel 119, which may be an Internet Protocol (IP)-based tunnel or other suitable type of tunnel, for supporting the LSPs from LSR 110-A to LSR 110-B (e.g., LSR 110-A multiplexes the LSPs on the tunnel 119 since LSR 110-A is not adjacent to LSR 110-B). The reliable MPLS overlay 111 allows the LSRs 110 to be adjacent on the LSPs, even though the LSRs 111 are separated by the communication network 120, in a reliable manner. It will be appreciated that, although primarily presented with respect to a particular direction of transmission, a set of LSPs also may be established to support reliable delivery of MPLS packets from LSR 110-B to LSR 110A. It will be appreciated that reliable MPLS overlays may be used in various contexts, some of which are presented with respect to FIGS. 2-7.

Figure 2:
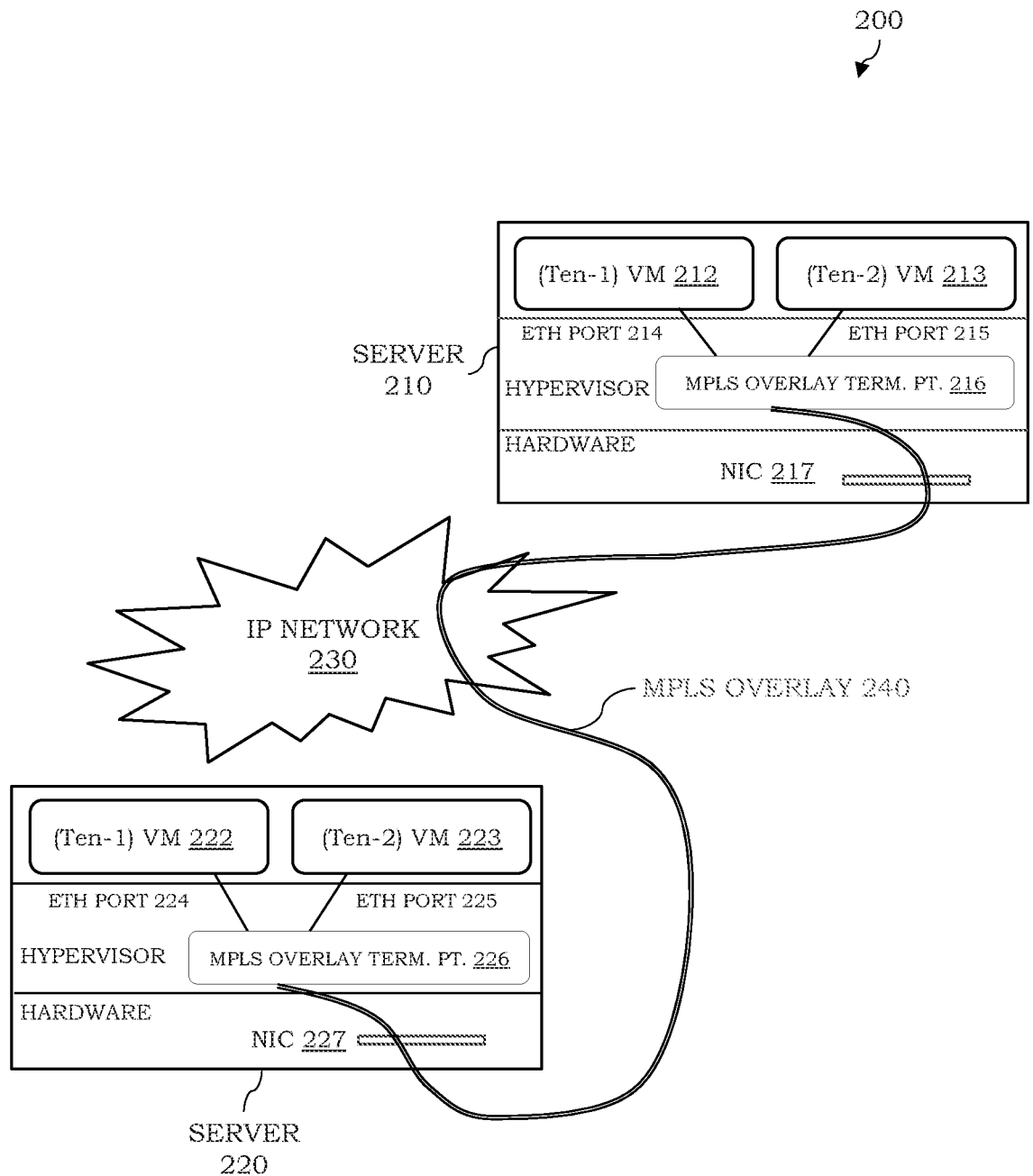
FIG. 2 depicts an example embodiment of use of a reliable MPLS overlay for network virtualization in a multi-tenant datacenter environment.

FIG. 2 depicts an example embodiment of use of a reliable MPLS overlay for network virtualization (NVO) in a multi-tenant datacenter (DC) environment.

In FIG. 2, as indicated above, a reliable MPLS overlay may be used for NVO in a multi-tenant DC environment. In general, a DC is a pool or collection of cloud infrastructure resources specifically designed for particular needs (e.g., for enterprise business needs or other types of needs). The basic resources are the servers (e.g., processor (e.g., CPU), memory (e.g., RAM), and the like), storage (e.g., disk space), and networking (e.g., bandwidth) that interconnects servers and storages. A multi-tenant DC can host virtual DCs for multiple customers (called tenants) on a single physical infrastructure. A virtual DC is a virtual representation of a physical data center, complete with servers, storage clusters, and many networking components, all of which reside in the virtual space hosted by the multi-tenant DC. Servers for a virtual DC are virtualized with Virtual Machines (VMs). One or more VMs may run atop a physical server, wherein each VM is assigned a share of processor resources (e.g., cores) and memory resources (e.g., RAM) of the physical server. VMs in a physical server can belong to the same tenant or may belong to different tenants. A thin layer of software called a "hypervisor" running in a physical server decouples the VMs from the physical server and dynamically allocates computing resources to each VM as needed. There are various solutions to virtualize storage, which are omitted for simplicity. The VMs and virtualized storages for a tenant are interconnected by a virtual network specific to the tenant. The virtual network may be implemented as an overlay network that sits atop the IP-based underlay which interconnects the physical resources in the DC. An NVO solution provides layer 2 and/or layer 3 virtual networks enabling multi-tenancy and VM mobility across the virtual network specific to the tenant. Thus, each tenant is provided an independent island of virtualized servers and virtualized storages, and the virtual network interconnecting them. When an MPLS overlay is deployed as NVO, the MPLS label stack of the MPLS overlay is the demultiplexer that identifies the virtual network.

In FIG. 2, a server 210 and a server 220, both of which are physical servers, are connected by an IP network 230. In FIG. 2, servers 210 and 220 are both shown to have been separated into three strata as follows: (1) a "hardware" layer including the processor, memory (e.g., RAM), I/O ports (e.g., the Network Interface Card (NIC), and the like, (2) a "hypervisor" layer that manages and allocates the hardware resources to VMs, and (3) a VM layer that includes the VMs that run atop the hypervisor. The server 210 connects to the IP network 230 via one or more ports in the NIC 217 (which may be an Ethernet NIC) and the server 220 connects to the IP network 230 via one or more ports in the NIC 227 (which may be an Ethernet NIC).

In FIG. 2, there are two tenants hosted by each physical server, which are named as Ten-1 and Ten-2, respectively, where "Ten" is used as a short-hand notation of "Tenant". VM 212 and VM 222 are the VMs (or virtual servers) for Ten-1 hosted in physical servers 210 and 220, respectively. VM 213 and VM 223 are the VMs (or virtual servers) for Ten-2 hosted in physical servers 210 and 220, respectively.

In FIG. 2, a virtual network among the VMs of each tenant is created using an MPLS overlay 240. For simplicity, since each tenant has only two VMs, the virtual network here is point-to-point Ethernet link. The MPLS overlay 240 is created between the hypervisors in the servers 210 and 220. The MPLS overlay termination point 216 in server 210 is located in the hypervisor in server 210. The MPLS overlay termination point 216 is configured with an IP address to be used for the IP underlay, such that the address is reachable by the IP network 230. The MPLS overlay termination point 226 in server 220 is located in the hypervisor in server 220. The MPLS overlay termination point 226 is configured with an IP address to be used for the IP underlay, such that the address is reachable by the IP network 230. Each tenant is assigned a network wide unique MPLS label to be used as its demultiplexer in its MPLS overlay. For example, assume that Ten-1 is assigned label 100 and Ten-2 is assigned label 200. It is noted that this example uses a bidirectional LSP as the MPLS overlay of a tenant and, thus, the same label is assigned for both directions. It is noted that the MPLS overlay termination points 216 and 226 of FIG. 2 may be considered to correspond to the LSRs 110 of FIG. 1 in terms of operating as the endpoints of the MPLS overlay.

In FIG. 2, VM 212 is connected to MPLS overlay termination point 216 via a virtual Ethernet port 214. In the MPLS overlay termination point 216, the virtual Ethernet port 214 is mapped to the MPLS overlay label 100. Similarly, VM 222 is connected to MPLS overlay termination point 226 via a virtual Ethernet port 224. In the overlay termination point 226, the virtual Ethernet port 224 is mapped to the MPLS overlay label 100. This completes the set-up of the point-to-point virtual network between the VMs of Ten-1.

In FIG. 2, VM 213 is connected to MPLS overlay termination point 216 via a virtual Ethernet port 215. In the MPLS overlay termination point 216, the virtual Ethernet port 215 is mapped to the MPLS overlay label 200. Similarly, VM 223 is connected to overlay termination point 226 via a virtual Ethernet port 225. In the overlay termination point 226, the port 225 is mapped to the MPLS overlay label 200. This completes the set-up of the point-to-point virtual network between the VMs of Ten-2.

In FIG. 2, the payload of the MPLS overlay 240 is a layer-2/Ethernet packet, as each VM generates Ethernet packets. In Ten-1, assume that VM 212 sends a packet to VM 222. First, VM 212 sends an Ethernet packet via the virtual Ethernet port 214. When the packet is received by MPLS overlay termination point 216, it pushes the MPLS label 100 onto the packet and then pushes the tunneling encapsulation (e.g., MPLS-in-IP, MPLS-in-GRE or MPLS-in-UDP, or the like). The source address in the IP header of the tunnel is set to the IP address of MPLS overlay termination point 216 and the destination address in the IP header of the tunnel is set to the IP address of the MPLS overlay termination point 226. The resultant packet is sent by MPLS overlay termination point 216 to the IP network 230. After being routed by the IP network 230, the packet eventually reaches the MPLS overlay termination point 226. The MPLS overlay termination point 226 decapsulates the tunneling encapsulation and then finds the MPLS label 100 beneath. Since the label 100 is mapped in the MPLS overlay termination point 226 to virtual Ethernet port 224, the label 100 is removed and the resultant Ethernet packet is forwarded on port 224. The packet is then received by VM 220. In the same way, the VMs in Ten-2 exchange packets among each other over its virtual network. Thus, multiple virtual networks are multiplexed between two tunneling endpoints using their respective MPLS overlay labels.

Various example embodiments for supporting a reliable MPLS overlay may be applied within the context of FIG. 2 for supporting reliable delivery of MPLS overlay packets for NVO in a multi-tenant DC environment. For example, a reliable MPLS overlay may prevent dropping of MPLS overlay packets which might otherwise be dropped in the absence of a reliable MPLS overlay (e.g., preventing dropping of MPLS overlay packets between the MPLS overlay termination points 216 and 226, such as in the NICs 217 and 227 due to buffer overflow, in any of the routers in the IP network 230 (e.g., due to buffer/queue overflow, congestion, or the like), fault in the links along the IP network 230, or the like). It is noted that, if reliability is desired for certain applications, then it would be the responsibility of the application that generated overlay traffic (e.g., an HTTP application based on TCP/IP which is generating traffic on the overlay (that offers traditional layer 2 or layer 3 services) can recover from the losses due to reliability offered by TCP). It is further noted that there are also applications that generate traffic on an MPLS overlay but are not based on protocols that offer reliable transfer for the application (e.g., TCP/IP or the like), and that some such applications are various infrastructure protocols/interconnects which were designed to run on a reliable media, (however, in a multi-tenant DC, the media is virtualized with the MPLS overlay. Such overlay offers the infrastructure interconnect services rather than traditional layer 2 or layer 3 services. It is noted that, since multiples of such MPLS overlays are multiplexed over a tunnel between two tunneling endpoints, reliability may be offered by the tunneling mechanism used by the MPLS overlays.

Figure 3:
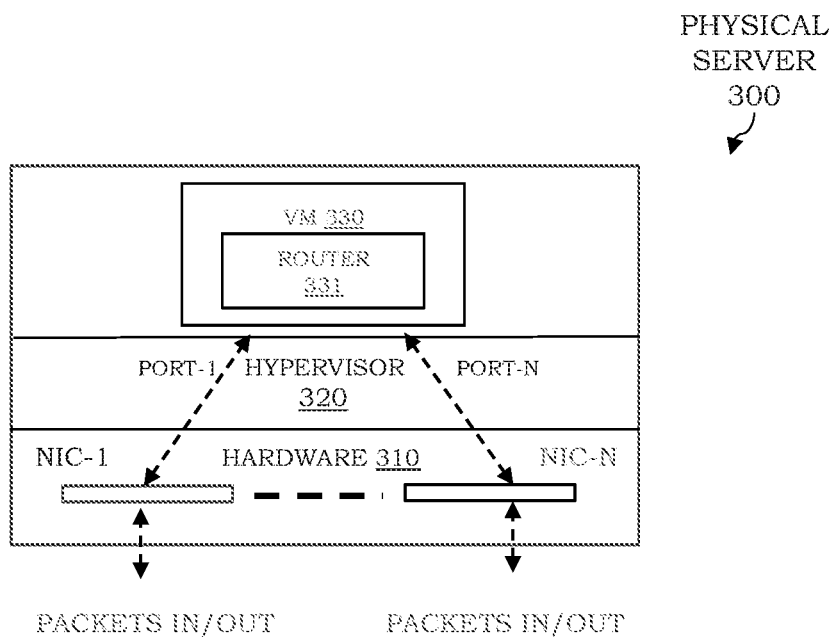
FIG. 3 depicts an example embodiment of a non-chassis-based network function virtualization (NFV) router for enabling further understanding of application of a reliable MPLS overlay to a chassis-based NFV router.

FIG. 3 depicts an example embodiment of a non-chassis-based NFV router for enabling further understanding of application of a reliable MPLS overlay to a chassis-based NFV router. An NFV-based router may implement the router platform with one or more VMs on commodity, off-the-shelf physical servers, such as x86 based server platforms. There can be two approaches of implementing an NFV router: (1) a non-chassis-based approach in which the entire router is hosted on a single VM or (2) a chassis-based approach in which each component of the router is implemented by a separate VM. In FIG. 3, a non-chassis-based NFV router runs as VM on the hypervisor on a physical server. In FIG. 3, a physical server 300 includes hardware 310, a hypervisor 320, and a VM 330 providing a router 331. The hardware 310 includes a set of N NICs (denoted as NIC-1 through NIC-N) having N ports associated therewith (denoted as Port-1 through Port-N associated with NIC-1 through NIC-N, respectively). The router 331 receives packets from the Ports on the NICs, processes the packets, and forwards the processed packets to relevant destinations via the Ports on the NICs. For optimal performance, the NICs assigned to the router 331 (VM 330) are directly controlled by the router 331 (e.g., using Single Root-Input/Output Virtualization (SR-IOV), PCI-Passthrough, or the like) without requiring any mediation by the hypervisor 320. The control plane and the forwarding plane of the router 331 reside within the single VM 330. It is noted that, as the NICs are Ethernet based, NFV routers often use Ethernet as the data link layer.

Figure 4:
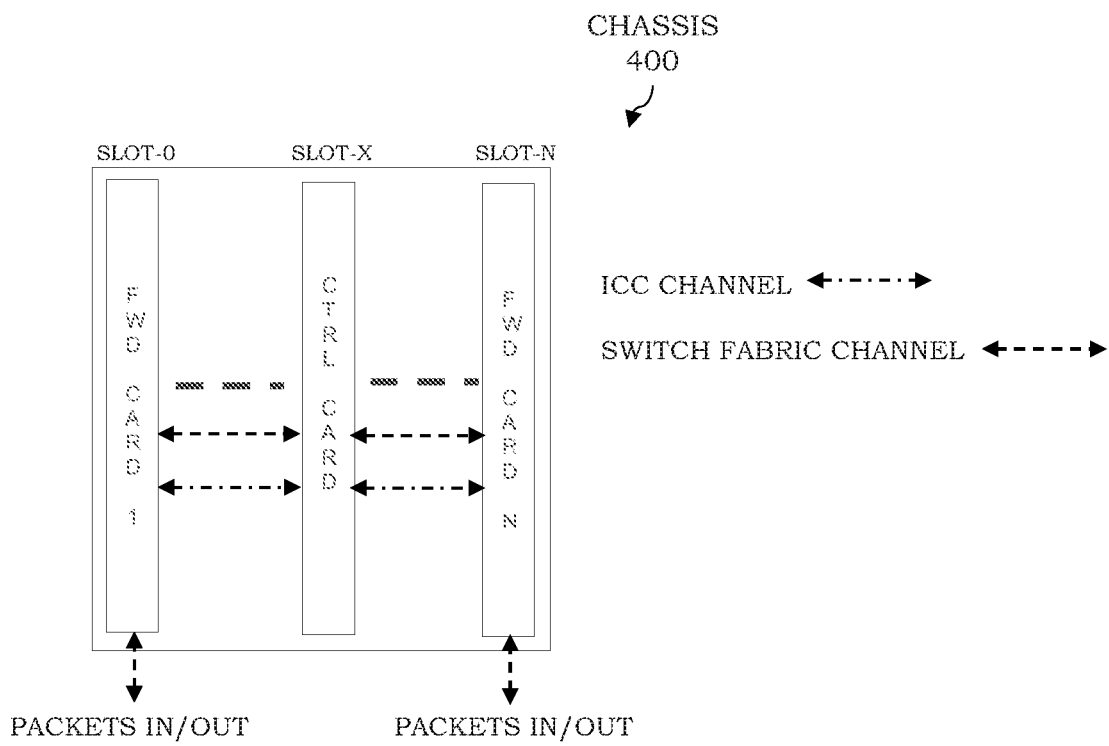
FIG. 4 depicts an example embodiment of a chassis-based router for enabling further understanding of application of a reliable MPLS overlay to a chassis-based NFV router.

FIG. 4 depicts an example embodiment of a chassis-based router for enabling further understanding of application of a reliable MPLS overlay to a chassis-based NFV router. In FIG. 4, the chassis 400 includes N+1 slots including N slots that include forwarding plane cards (denoted as SLOT-0 through SLOT-N which include forwarding plane cards denoted as FWD CARD 1 through FWD CARD N, respectively) and one additional slot that includes a control plane card (denoted as SLOT-X which includes the control plane card denoted as CTRL CARD). The forwarding plane cards provide the forwarding plane of the router. The forwarding plane cards include ports (omitted herein for purposes of clarity) for transmitting and receiving packets. The forwarding plane cards implement the forwarding plane of the router that receive packets, process the packets, and send packets to destinations. The control plane card operates the control plane of the router. It will be appreciated that, while there could be more than one control plane card for redundancy purposes, for simplicity only a single control plane card is illustrated in FIG. 4. It is noted that, typically, there are at least two internal networks that connect the various card with a root node (centralized entity) of each network is located in the control plane card. An example of an expanded view with the interconnections of the two internal networks is presented in FIG. 5.

Figure 5:
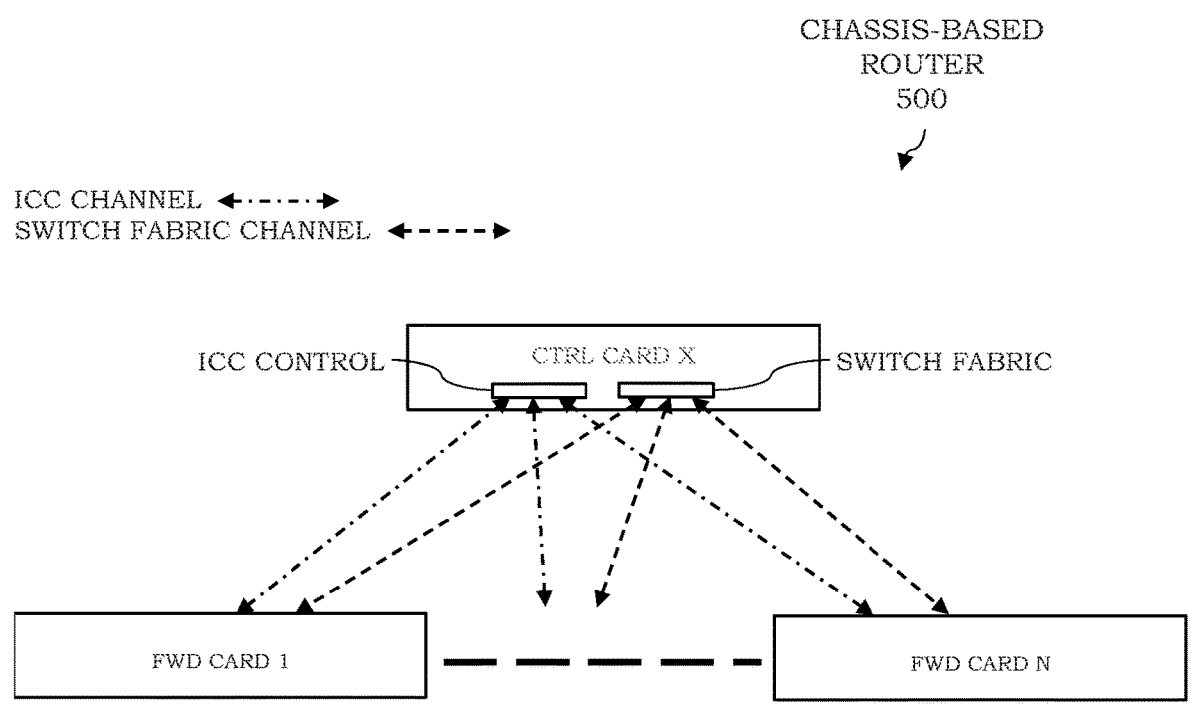
FIG. 5 depicts an example embodiment of internal fabrics in a chassis-based router for enabling further understanding of application of a reliable MPLS overlay to a chassis-based NFV router.

FIG. 5 depicts an example embodiment of internal fabrics in a chassis-based router for enabling further understanding of application of a reliable MPLS overlay to a chassis-based NFV router.

In FIG. 5, the interconnections of two internal networks of a chassis-based router are illustrated.

In FIG. 5, the first network is for the switch fabric through which data packets are switched across the cards. In FIG. 5, the switch fabric is hosted inside the control plane card, but it is also possible to have a separate switch fabric card. If a packet arriving on a port in card 1 needs to be sent out by a port in card 4 then, after performing ingress processing, card 1 sends the packet to the channel to the switch fabric, and the switch fabric then relays the packet to card 4 for egress processing and final transmission. Every card is connected to the switch fabric through a switch fabric channel (a link in the switch fabric network).

In FIG. 5, the second network is for the inter-card communication (ICC). The ICC control is in the control plane, which is connected to every forwarding plane card by an ICC channel (a link in the ICC network). The ICC network is used for all control and management messaging between the control plane and the forwarding planes. For example, configuration of the forwarding plane by the control plane is performed using the ICC network. Any alarms or alerts generated by a forwarding plane are notified to the control plane through ICC network. The heartbeats to check the connectivity between the cards are exchanged as ICC messages.

It is noted that both the switch fabric and ICC networks are lossless, which means that packets/messages generally are reliably transported without any drop.

It will be appreciated that, although primarily presented with respect to use of two interconnect networks, more than two interconnect networks may be used.

Figure 6:
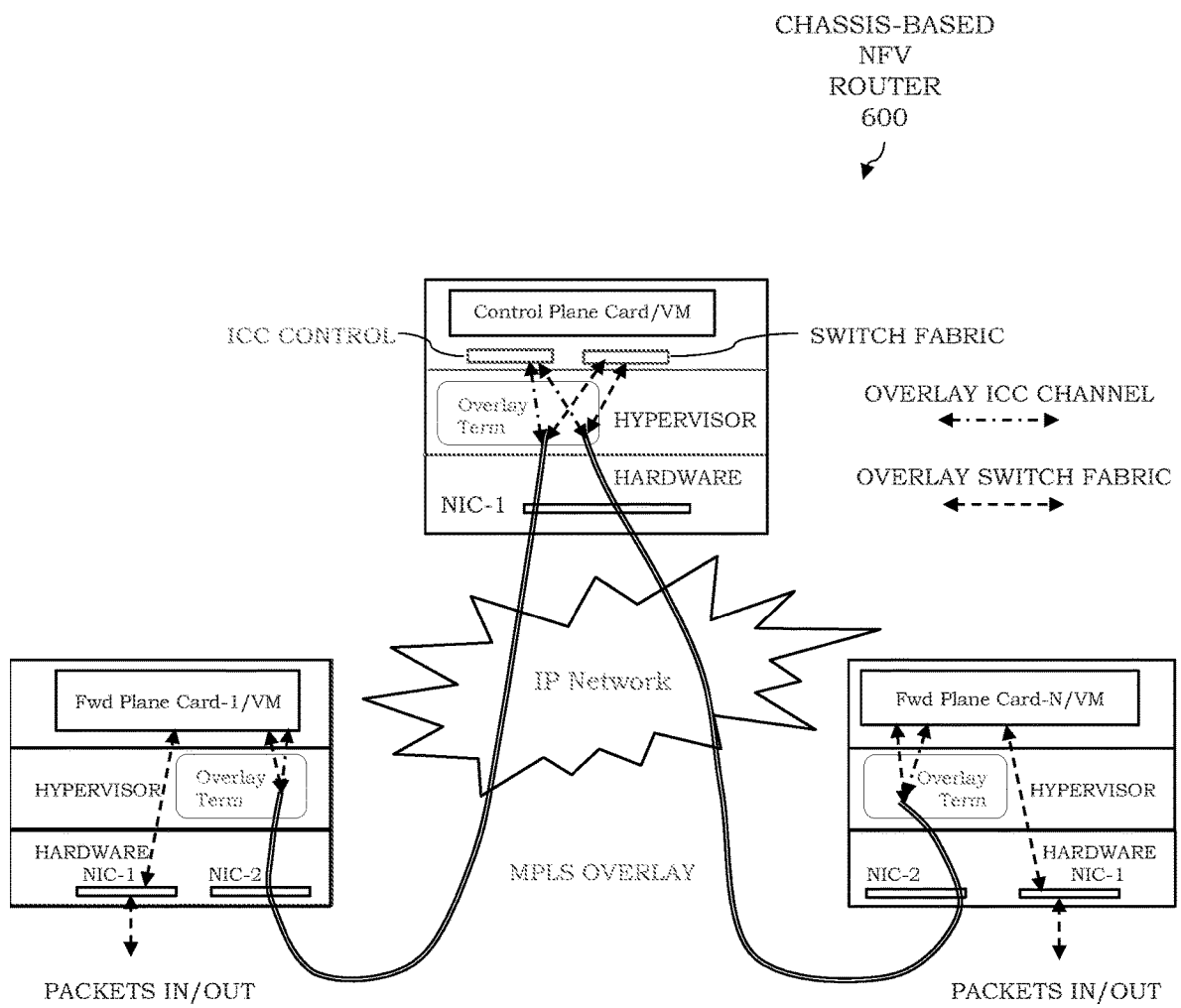
FIG. 6 depicts an example embodiment of use of a reliable MPLS overlay for the internal fabrics in a chassis-based NFV router in which the control plane and the forwarding plane are separated by a network.

It will be appreciated that the router chassis presented with respect to FIGS. 4 and 5 may be virtualized, to provide a chassis-based NFV router, as presented with respect to FIG. 6.

FIG. 6 depicts an example embodiment of use of a reliable MPLS overlay for the internal fabrics in a chassis-based NFV router in which the control plane and the forwarding plane are separated by a network.

In FIG. 6, as indicated above, a reliable MPLS overlay may be used for a chassis-based NFV router in which the control plane and the forwarding plane are separated by a network.

In FIG. 6, each card is emulated by a VM and each VM resides in a separate physical server to minimize the single point of failure. Here, the term "control plane server" is used to denote the physical server that hosts the VM for the control plane card and the term "forwarding plane server-x" is used to denote the physical server that hosts the VM for the forwarding plane card-x.

In FIG. 6, the control plane and the forwarding plane VMs are separated by an IP network. It is possible that the VMs are located within a local area network (LAN), e.g., within the same IP subnet. However, herein the VMs are separated by an IP network as it is the superset case that can also satisfy the requirements if the VMs are connected within a LAN.

In FIG. 6, each forwarding plane VM uses NIC-1 to emulate the ports for packet receive and transmit. For optimal performance, the NIC-1 is directly controlled by the forwarding plane VM (e.g., using SR-IOV, PCI-Passthrough, or the like) without requiring any mediation by the hypervisor. Each forwarding plane server uses a port on NIC-2 to connect to the IP network. The control plane server uses a port on NIC-1 to connect to the IP network. The ICC and switch fabric channels between the VMs are setup as MPLS overlays across the IP network. The MPLS overlay termination points are located in the hypervisors. There are two MPLS overlays between each forwarding plane server and the control plane server—one for the ICC channel and one for the switch fabric channel. Each overlay is set-up as bi-directional LSP that uses the same MPLS label in both directions (i.e., from forwarding plane card to control plane card and vice-versa). For example, assume that the MPLS label used by the overlay for the ICC channel is label 100 and that the MPLS label used by the overlay for the switch fabric channel is label 200.

In FIG. 6, in order to create an IP underlay for the overlay, each overlay termination point creates an IP address on its respective port on the NIC connected to the IP network, such that the IP address is routable by the IP network. The IP address on the overlay termination point at forwarding plane server-x is denoted as "F-IPx" and the IP address on the overlay termination at the control plane server is denoted as "C-IP". The overlay termination point at each forwarding plane server is configured with one underlay tunnel with its destination IP address as C-IP. The overlay termination point at the control plane server is configured with N underlay tunnels, one to each forwarding plane server. For example, the destination IP addresses of the underlay tunnels to forwarding plane server-1, server-2, . . . , server-N are F-IP1, F-IP2, . . . F-IPN, respectively.

In FIG. 6, a forwarding plane VM connects to its local overlay termination point with two virtual ports—one for the ICC channel and one for the switch fabric channel. Within the overlay termination point, the port for the ICC channel is mapped to MPLS label 100 and the port for the switch fabric channel is mapped to MPLS label 200. Both of the labels are multiplexed on the IP underlay tunnel to the control plane server.

In FIG. 6, the control plane VM connects to its local overlay termination point with two virtual ports for each forwarding plane VM—one for the ICC channel and one for the switch fabric channel. So, there are a total 2N virtual ports between the control plane VM and its local overlay termination point. Within the local overlay termination point: (1) the port for the ICC channel to a forwarding plane VM is mapped to MPLS label 100 and the IP underlay tunnel to the forwarding plane server and (2) the port for the switch fabric channel to a forwarding plane VM is mapped to MPLS label 200 and the IP underlay tunnel to the forwarding plane server. It will be appreciated that the MPLS overlays for the ICC and the switch fabric form two virtual networks, which is a case of NVO as described hereinabove.

In FIG. 6, as an example, any ICC message from the forwarding plane VM emulating card-1 to the control plane VM would be first sent on its virtual port for the ICC channel. When the local overlay termination point receives the message, it pushes MPLS label 100 and then the tunnel encapsulation with an IP header in which the source IP address is F-IP1 and the destination IP address is C-IP. Then the packet is sent to the IP network via the port in NIC-2. When overlay termination point in the control plane server receives the packet, it performs the following actions: (1) identifies the source forwarding plane server based on the source IP address in the tunnel encapsulation, (2) removes the tunnel encapsulation, (3) finds MPLS label 100 and, based on label 100, demultiplexes the packet as containing an ICC message and removes the label, (4) finds, based on the identified source forwarding plane server, the virtual port to the control plane VM which is mapped for the ICC channel with the forwarding plane VM, and (6) forwards the ICC message on the virtual port. The ICC message is received by the ICC control module in the control plane VM.

In FIG. 6, as an example, any packet to be sent on the switch fabric channel from the forwarding plane VM emulating card-1 to control plane VM would be first sent on its virtual port for the channel. When the local overlay termination point receives the message, it pushes MPLS label 200 and then the tunnel encapsulation with an IP header in which the source IP address is F-IP1 and the destination IP address is C-IP. Then the packet is sent to the IP network via the port in NIC-2. When overlay termination point in the control plane server receives the packet, it performs the following actions: (1) identifies the source forwarding plane server based on the source IP address in the tunnel encapsulation, (2) removes the tunnel encapsulation, (3) finds MPLS label 200 and, based on label 200, demultiplexes the packet as containing a packet for the switch fabric and removes the label, (4) finds, based on the identified source forwarding plane server, the virtual port to the control plane VM which is mapped for the switch fabric channel with the forwarding plane VM, and (6) forwards the packet on the virtual port. The packet is received by the switch fabric in the control plane VM.

It is noted that, if the physical servers only hosts a single forwarding plane or control plane VM then, for optimal performance the overlay termination points also may be implemented within respective VMs to avoid context switching with the hypervisor while transmitting and receiving packets on the channels. In that case, NIC-2 in forwarding plane server would be directly controlled by the forwarding plane VM (e.g., using SR-IOV, PCI-Passthrough, or the like). The same would be true with NIC-1 in the control plane server.

Various example embodiments for supporting a reliable MPLS overlay may be applied within the context of FIG. 6 for supporting reliable delivery of MPLS overlay packets for a chassis-based NFV router in which the control plane and the forwarding plane are separated by a network (e.g., to prevent dropping of ICC or switch fabric packets by the NICs (at both the control plane server and the forwarding plane server) or within the IP network).

Figure 7:
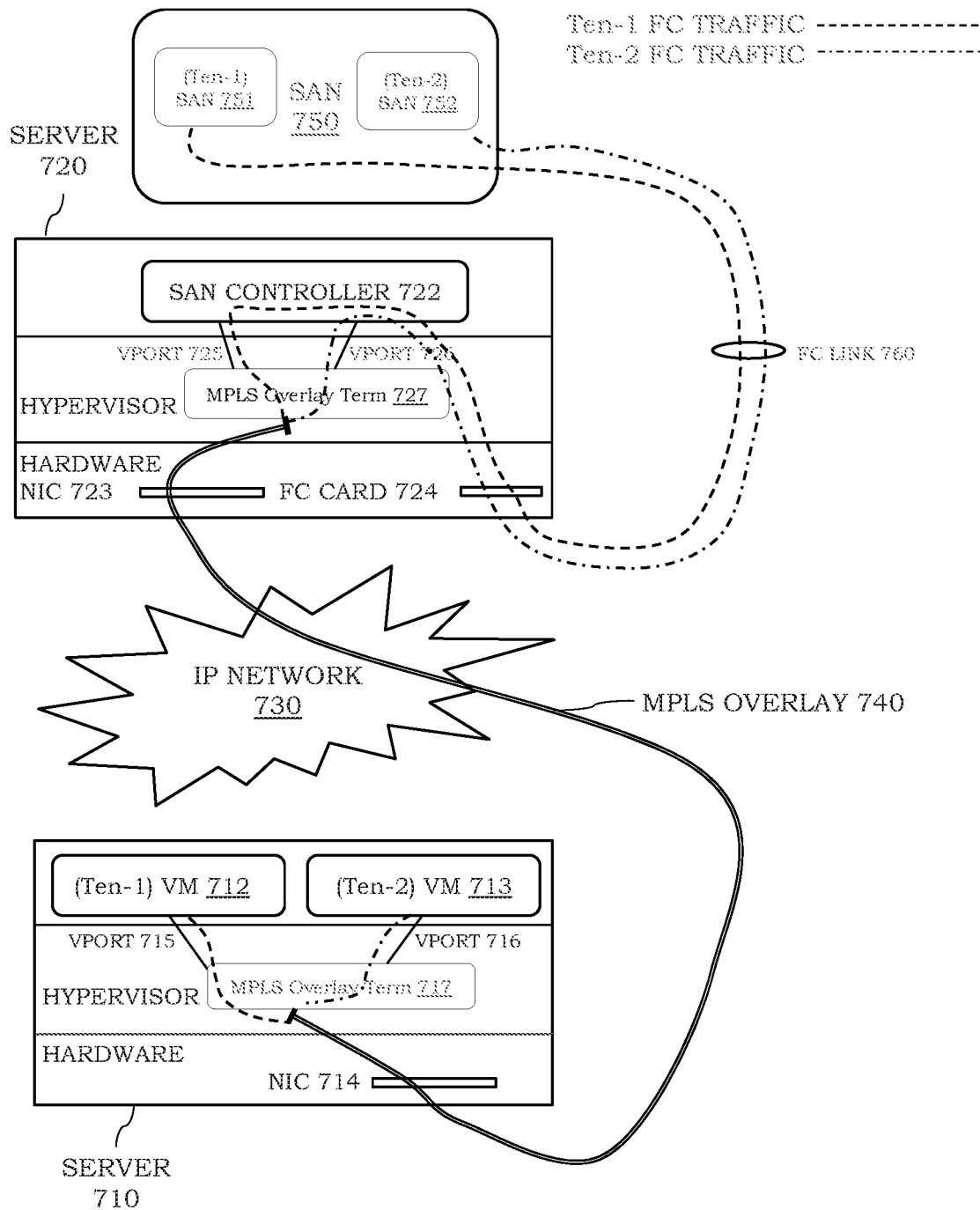
FIG. 7 depicts an example embodiment of use of a reliable MPLS overlay for a virtualized Fibre Channel in a storage area network.

FIG. 7 depicts an example embodiment of use of a reliable MPLS overlay for a virtualized Fibre Channel (FC) in a storage area network (SAN).

In FIG. 7, as indicated above, a reliable MPLS overlay may be used for a virtualized FC in a SAN. FC is a high-speed data transfer protocol, providing in-order, lossless delivery of raw blocks of data, which is primarily used to connect computer data storage to servers in SANs in DCs.

A SAN is a network of a pool of block-based storage devices that can be accessed/shared by multiple servers connected to the SAN. The reliability in FC is provided by its data link layer which is termed as FC-1 (FC-0 is the physical layer which is typically high-speed optical fiber).

In FIG. 7, FC traffic is transported on an MPLS overlay 740 in a multi-tenant DC. The example is described with two tenants, which are denoted as Ten-1 and Ten-2. A server 720 is a physical server which is directly attached to a SAN 750 via a FC link 760. The server 720 interfaces with the FC link 760 via a port on the FC card 724. The server 720 hosts a VM that runs the function of the multi-tenant SAN controller 722. Any access request to the SAN 750 is made through the SAN controller 722. To enable multi-tenancy, the SAN 750 is logically partitioned, so as to appear as multiple independent SANs. Logical SANs of Ten-1 and Ten-2 are mapped onto the SAN 750 as SAN 751 and SAN 752, respectively. The SAN controller 722 maintains the mappings of tenant specific logical data blocks to the physical data blocks in the SAN 750. This logical partitioning and mapping are needed for security reasons so that any bad access by a tenant does not corrupt data of another tenant. The server 710 hosts the VMs for Ten-1 and Ten-2, denoted as VM 712 and VM 713, respectively. The VMs run some tenant specific server applications. VM 712 accesses the SAN 751 and VM 713 accesses the SAN 752.

In FIG. 7, the VMs 712 and 713 and the associated SANs 751-752, respectively, are located in remote sites physically separated by an IP network 730. The physical separation is possible due to VM mobility (e.g., VMs can move across remote sites over the virtual network that connects the VMs), remote disk access, tape backup, and live mirroring. Similar to the model in FIG. 7, it is also possible to interconnect islands of multi-tenant FC SANs over IP networks to form a unified SAN in a single FC fabric. In FIG. 7, the idea is to interconnect the VMs 712 and 713 to the associated SANs 751 and 752 by carrying FC traffic in such a manner that the FC fabric 750 on SAN 750 and the FC devices are unaware of the presence of the IP network 730 therebetween.

In FIG. 7, in order to emulate that VMs 712 and 713 are directly connected to their SANs 751 and 752, respectively, the segment of the FC link 760 between VMs 712 and 713 and the SAN controller 722 needs to be virtualized. This virtualization may be achieved as follows. First, an MPLS overlay 740 is created between the hypervisors in server 710 and 720 that runs atop IP network 730. The hypervisors of the servers 710 and 720 host the MPLS overlay termination points 717 and 727, respectively, and the MPLS overlay termination points 717 and 727 are configured with unique IP addresses which are routable from the IP network 730. The MPLS overlay termination points 717 and 727 access the IP network 730 via the NIC cards 714 and 723, respectively. Second, each tenant is assigned a unique MPLS label (e.g., Ten-1 is assigned label 100 and Ten-2 is assigned label 200). Third, the VM 712 for Ten-1 is connected to the MPLS overlay termination 717 via a virtual FC port 715 (which is mapped to label 100 in the MPLS overlay termination 717) and the VM 713 for Ten-2 is connected to the MPLS overlay termination 717 via a virtual FC port 716 (which is mapped to label 200 in the MPLS overlay termination 717). Fourth, the SAN controller 722 is connected to the MPLS overlay termination 727 with two virtual FC ports—725 and 726 for Ten-1 and Ten-2, respectively. FC port 725 is mapped to label 100 and FC port 726 is mapped to label 200 in the MPLS overlay termination 727.

In FIG. 7, VM 712 sends a FC packet to SAN 750 by virtual FC port 715. When the FC packet is received by MPLS overlay termination 717, MPLS overlay termination 717 pushes the MPLS label 100 as a demultiplexer for traffic belonging to Ten-1. Then the MPLS packet is sent to remote MPLS overlay termination 727, by adding the IP underlay encapsulation. When the packet reaches MPLS overlay termination 727, the MPLS overlay termination 727 pops the IP underlay encapsulation as well as the MPLS label 100 and forwards the resultant FC packet to the virtual FC port 725 which is mapped to label 100. The SAN controller 722 receives the FC packet on virtual FC port 725 which is assigned to Ten-1, so the controller sends the required FC packet to SAN 751 via FC link 760. In the same way, VM 713 accesses the SAN 752.

Various example embodiments for supporting a reliable MPLS overlay may be applied within the context of FIG. 7 for supporting reliable delivery of MPLS overlay packets for a virtualized FC in a SAN (e.g., to be robust against dropping of FC packets by the NICs or within the IP network).

It will be appreciated that, although specific contexts for use of reliable MPLS overlays are presented with respect to FIGS. 2-7, reliable MPLS overlays may be used in various other types of contexts. For example, similar to FC, reliable MPLS overlays may be used for reliable transport of Infiband traffic across storage systems. For example, reliable MPLS overlays may be used for virtualization of a PCI Express (PCIe) bus to support reliable transport of PCIe traffic. For example, similar to FC, reliable MPLS overlays may be used for reliable transport of Non-Volatile Memory express (NVMe) traffic to access storage on solid state drives. It will be appreciated that such applications may be generalized as multi-tenant distributed input-output (I/O) in DCs that may use reliable MPLS overlays. For example, when a pool of VMs in a tenant form a cluster of servers (e.g., grid computing), with the VMs being physically separated by a network, then the interconnections in the cluster/grid can be implemented as MPLS overlays for reliable transport of server cluster traffic. In general, there could be several types of distributed applications spanning across the VMs of a tenant where the application traffic needs to be reliably transmitted between the VMs over the MPLS overlay. It will be appreciated that reliable MPLS overlays may be used in various other types of contexts.

Figure 8:
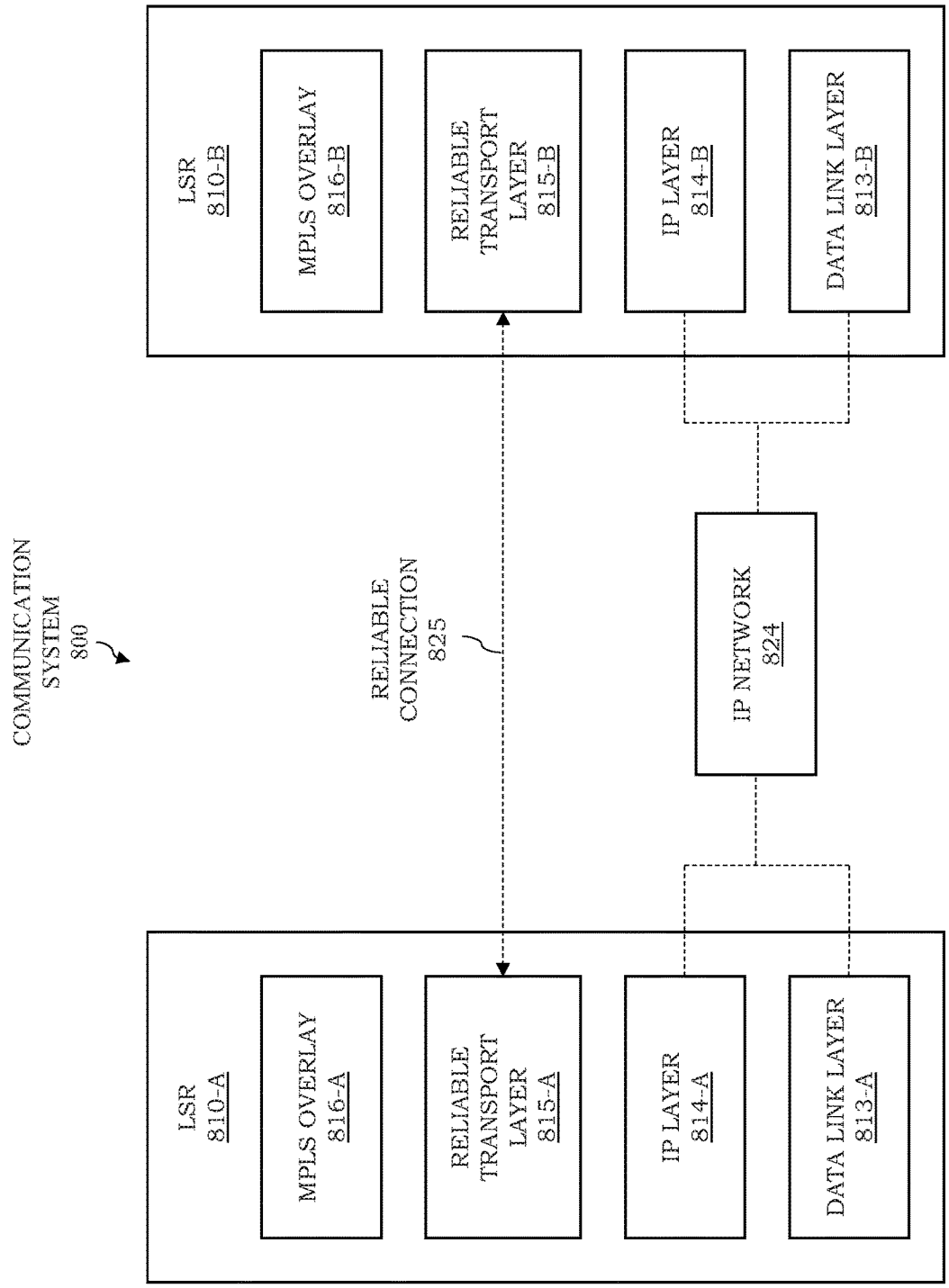
FIG. 8 depicts an example embodiment of a communication system configured to support a reliable MPLS overlay.

FIG. 8 depicts an example embodiment of a communication system configured to support a reliable MPLS overlay.

The communication system 800 includes a pair of LSRs 810, including an LSR 810-A and an LSR 810-B (collectively, LSRs 810), and an IP network 824 configured to support communications between the LSRs 810.

The LSRs 810 support a data link layer 813 (illustratively, based on a data link layer 813-A on LSR 810-A and a data link layer 813-B on LSR 810-B), an IP layer 814 above the data link layer 813 (illustratively, based on an IP layer 814-A on LSR 810-A and an IP layer 814-B on LSR 810-B), a reliable transport layer 815 above the IP layer 814 (illustratively, based on a reliable transport layer 815-A on LSR 810-A and a reliable transport layer 815-B on LSR 810-B), and an MPLS overlay 816 above the reliable transport layer 815 (illustratively, based on an MPLS overlay 816-A on LSR 810-A and an MPLS overlay 816-B on LSR 810-B). The data link layer 813, IP layer 814, reliable transport layer 815, and MPLS overlay 816 on the LSRs 810, respectively, may form all of part of communication protocol stacks configured on the LSRs 810 (e.g., based on the OSI model or one or more other suitable protocol stack models), respectively. The LSRs 810 are configured to provide a reliable MPLS overlay using a reliable transport layer atop IP, thereby supporting reliable delivery of MPLS overlay packets.

The MPLS overlay 816 is configured to operate as a reliable MPLS overlay supporting reliable delivery of MPLS packets between the LSRs 810. The reliability of the MPLS overlay 816 is based on the reliable transport layer 815. The reliability of the MPLS overlay 816 is based on a reliable connection 825 established at the reliable transport layer 815. The reliable transport layer 815 is connection-oriented and guarantees reliable delivery of MPLS overlay packets between the LSRs 810 (e.g., reliable delivery of any MPLS overlay packets between a pair of source and destination addresses in the IP underlay tunnel of the IP layer 814). The reliable transport layer 815 also may support reliability features such as flow control, congestion control, or the like, as well as various combinations thereof. The reliable transport layer 815 supports a reliable connection 825 established between the LSRs 810. The reliable connection 825 is configured to support reliable delivery of MPLS packets between the LSRs 810. The reliable connection 825 is configured to support reliable delivery of MPLS packets between the LSRs 810, even though the LSRs 810 are separated by the IP network 824, in a reliable manner so as to support the reliable MPLS overlay 816.

The reliable transport layer 815 and associated reliable connection 825 may be based on a reliable transport protocol. The reliable transport layer 815 and associated reliable connection 825 may be based on a reliable transport protocol such as TCP, SCTP, QUIC, TLS, or the like. It is noted that a reliable MPLS overlay that uses TCP as the reliable transport layer 815 (e.g., TCP is the "tunneling" layer of the MPLS packets) may be denoted as "MPLS-in-TCP" herein. It is noted that a reliable MPLS overlay that uses SCTP as the reliable transport layer 815 (e.g., SCTP is the "tunneling" layer of the MPLS packets) may be denoted as "MPLS-in-SCTP" herein. It is noted that a reliable MPLS overlay that uses QUIC as the reliable transport layer 815 (e.g., QUIC is the "tunneling" layer of the MPLS packets) may be denoted as "MPLS-in-QUIC" herein. It is noted that a reliable MPLS overlay that uses TLS as the reliable transport layer 815 (e.g., TLS is the "tunneling" layer of the MPLS packets wherein TLS runs atop TCP which actually provides the reliable transport channel) may be denoted as "MPLS-in-TLS" herein. It will be appreciated that, although primarily presented with respect to use of specific reliable transport protocols at the reliable transport layer 815 to provide the reliable connection 825, various other reliable transport protocols may be used at the reliable transport layer 815 to provide the reliable connection 825.

It will be appreciated that, although primarily presented with respect to supporting a single MPLS overlay over the reliable connection 825 (illustratively, between the MPLS overlays 816), multiple MPLS overlays may be multiplexed over the reliable connection 825 and the associated IP underlay tunnel between the LSRs 810 over the IP network 824.

Various example embodiments are configured to provide a framework for operations of a reliable MPLS overlay that uses a connection in a reliable transport layer for tunneling. Any reliable transport layer designed to tunnel MPLS overlay packets may be configured to follow the specifications of the framework. In at least some example embodiments, the framework may be configured to achieve MPLS-in-TCP. In at least some example embodiments, the framework may be configured to achieve MPLS-in-SCTP. In at least some example embodiments, the framework may be configured to achieve MPLS-in-QUIC. In at least some example embodiments, the framework may be configured to achieve MPLS-in-TLS. It will be appreciated that various other reliable transport protocols may be used to provide a reliable MPLS overlay.

It will be appreciated that, although primarily presented with respect to use of a single reliable transport layer to support a reliable MPLS overlay, the reliable MPLS overlay may utilize multiple reliable transport layers. For example, since an MPLS overlay may carry traffic from multiple applications where one or more of the applications require reliability and one or more of the applications do not require reliability, the one or more applications that require reliability may be supported using one or more reliable transport layers and the one or more applications that do not require reliability may be supported using one or more other transport layers that are not necessarily implemented as reliable transport layers as presented herein.

It will be appreciated that application specific packets that are sent on a reliable MPLS overlay may be adapted per the requirements or expectations of the reliable MPLS overlay independent of use of a reliable transport layer to provide reliable transport of the MPLS overlay.

It will be appreciated that, although support for a reliable MPLS overlay is primarily presented herein with respect to providing data plane capabilities for supporting the reliable MPLS overlay, the reliable MPLS overlay also may be supported based on various control plane capabilities which may be utilized for supporting the reliable MPLS overlay. For example, where use of the reliable transport layer to provide a reliable MPLS overlay relies on the LSRs having access to certain information regarding capabilities of remote LSRs (e.g., knowledge of the capability of remote LSRs to decapsulate MPLS packets from the reliable transport protocol header, knowledge of MPLS overlay terminations, or the like, as well as various combinations thereof), various control plane capabilities may be used to configure such information on the LSRs (e.g., using manual configuration of information on the LSRs, dynamic advertising or sending of information between LSRs, or the like, as well as various combinations thereof).

Figure 9:
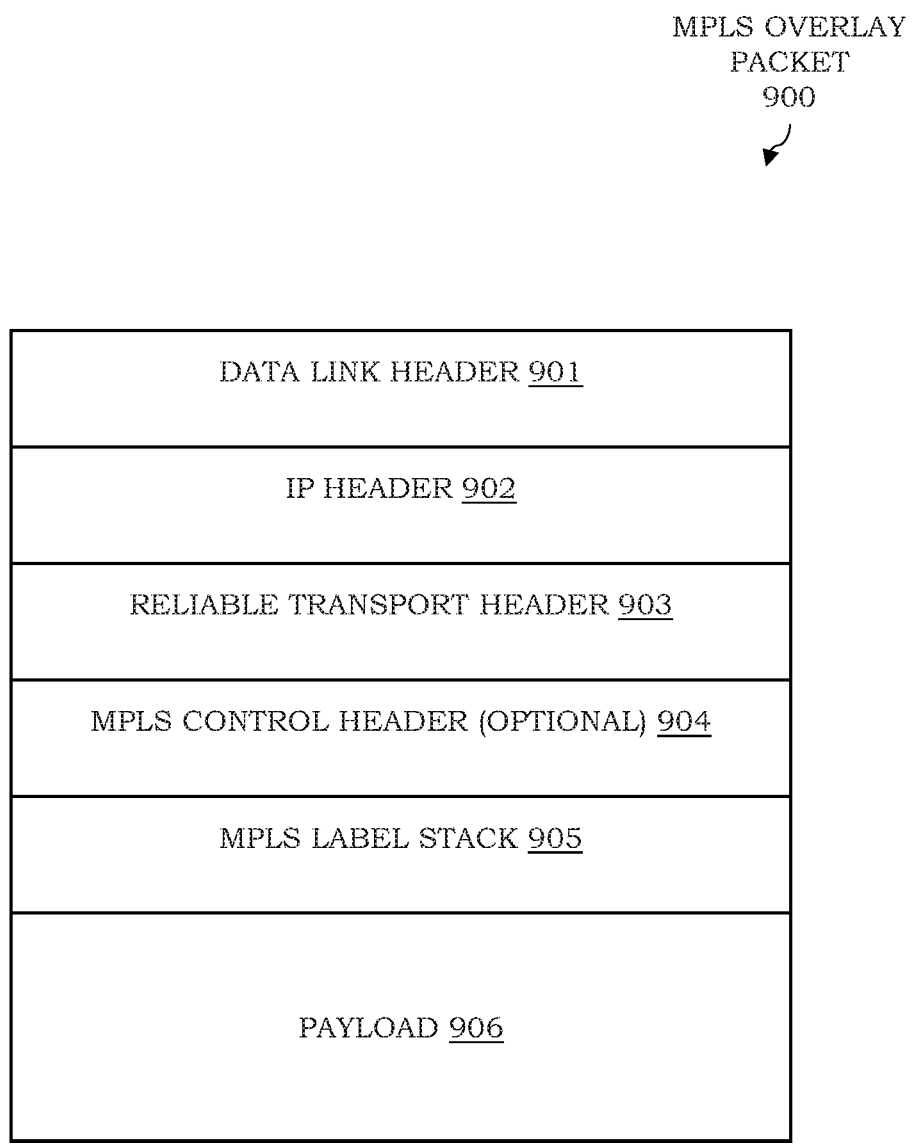
FIG. 9 depicts an example embodiment of an MPLS overlay packet for illustrating the positioning of the header(s) of the reliable transport layer in an MPLS overlay packet.

FIG. 9 depicts an example embodiment of an MPLS overlay packet for illustrating the positioning of the header(s) of the reliable transport layer in an MPLS overlay packet. The MPLS overlay packet 900 includes a data link header 901, an IP header 902 below the data link header 901, a reliable transport header 903 below the IP header 902, an optional MPLS control header 904 below the reliable transport header 903, an MPLS label stack 905 below the optional MPLS control header 904, and a payload 906 below the MPLS label stack 905. The data link header 901 is the data link layer header for a next-hop of the packet in the IP network. The IP header 902 is the IP header of the IP underlay. The reliable transport header 903 includes one or more headers from the reliable transport layer. The MPLS label stack 905 is the MPLS label stack of the MPLS overlay. The payload 1506 is the payload or the application packet that is being transported on the reliable MPLS overlay. The MPLS control header (MCH) 904 is optional and is included when the reliable transport connection is stream-oriented, i.e., when the reliable transport connection reliably transports streams of bytes. In that case, the receiving LSR needs to figure out the MPLS overlay packets within the received byte stream. In order to demarcate the MPLS overlays packets in the byte stream, when an LSR sends a MPLS overlay packet, it pushes the MCH 904 atop the MPLS label stack 905 in the packet. The MCH 904 at least includes a field that indicates the size of the MPLS overlay packet. The receiving LSR parses the first 4 octets (bytes) in the byte stream as the MCH 904 and, based on its length field, determines the ending byte of the MPLS overlay packet. This is illustrated in FIG. 10.

Figure 10:
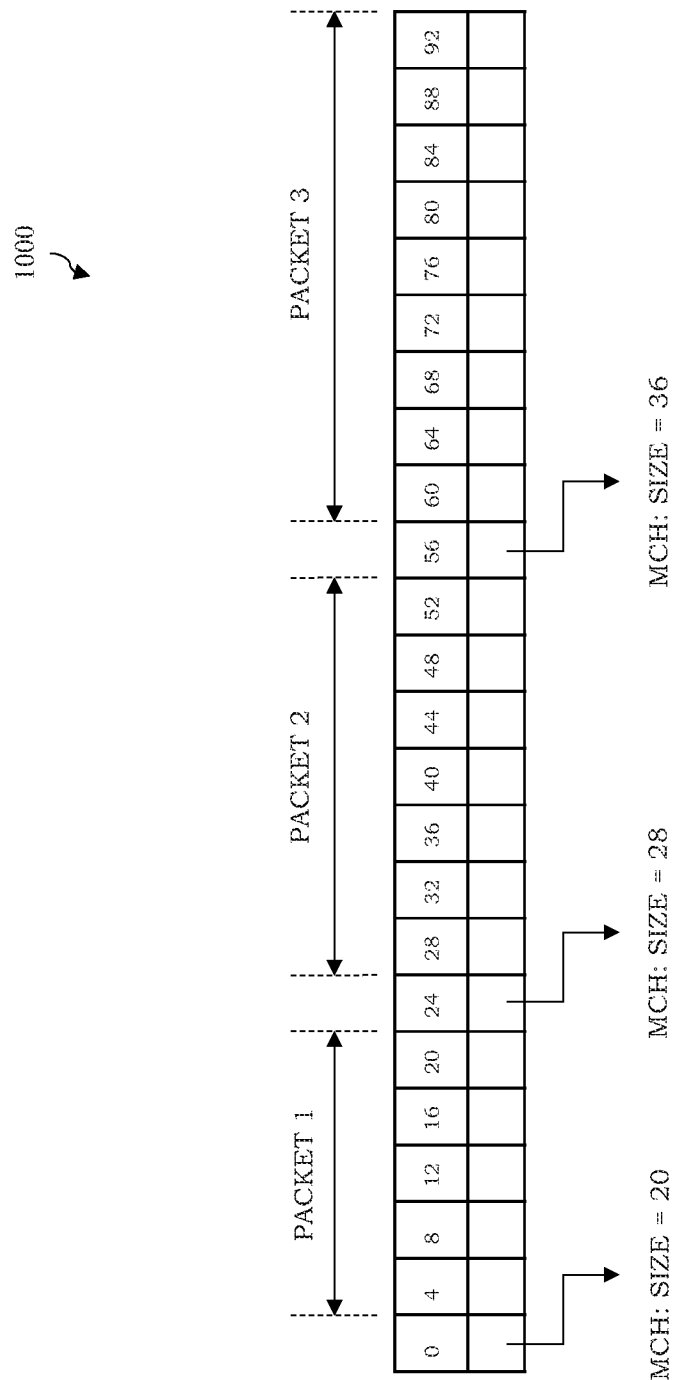
FIG. 10 depicts an example embodiment of a parsing of a byte stream including MPLS overlay packets.

FIG. 10 depicts an example embodiment of a parsing of a byte stream including MPLS overlay packets. The byte stream is processed as a sequence of 4-octet words, where each word is indexed with the sequence number of its first octet. When an LSR receives this byte stream from the reliable transport connection, it parses the word-0 as the MCH, wherein the size field indicates 20 octets. So, the words 4-20 constitute the first MPLS overlay packet. Then, word-24 must be the MCH for the next packet, where the size field indicates 28 octets. So, words 28-52 constitute the second MPLS overlay packet. Then, word-56 must be the MCH for the next packet, and so forth.

Figure 11:
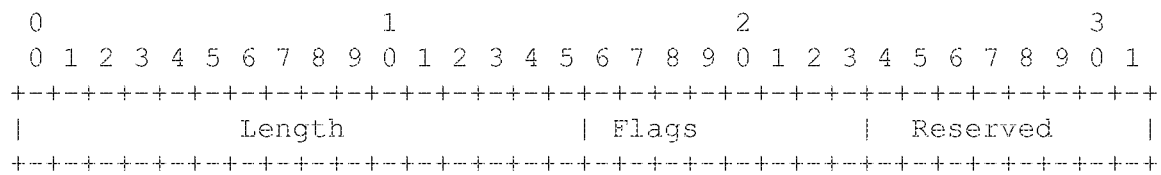
FIG. 11 depicts an example embodiment of an MPLS Control Header (MCH) configured for use on an MPLS overlay packet to support a reliable MPLS overlay.

FIG. 11 depicts an example embodiment of an MCH configured for use on an MPLS overlay packet to support a reliable MPLS overlay. As depicted in FIG. 11, the MCH 1100 is a 4-octet header that includes a Length field, a Flags field, and a Reserved field. The Length field is a 16-bit field that indicates length of the encapsulated MPLS overlay packet in terms of number of octets. This field can accommodate an MPLS overlay packet of size up to 65535B. The Flags field is an 8-bit field where each bit indicates a flag. It will be appreciated that zero or more flags may be defined and used. If no flags are used, the sender sets this field to 0 and the receiver ignores this field. The Reserved field is an 8-bit field which may be used for various purposes. If this field is not used, the sender sets this field to 0 and the receiver ignores this field. The MCH 1100 is pushed atop the MPLS overlay packet before sending the packet on a stream-oriented reliable transport connection. It will be appreciated that, although primarily presented with respect to specific numbers, types, and arrangements of fields, the MCH 1100 may include various other numbers, types, or arrangements of fields (including various custom fields which may be designed and used).

Figure 12:
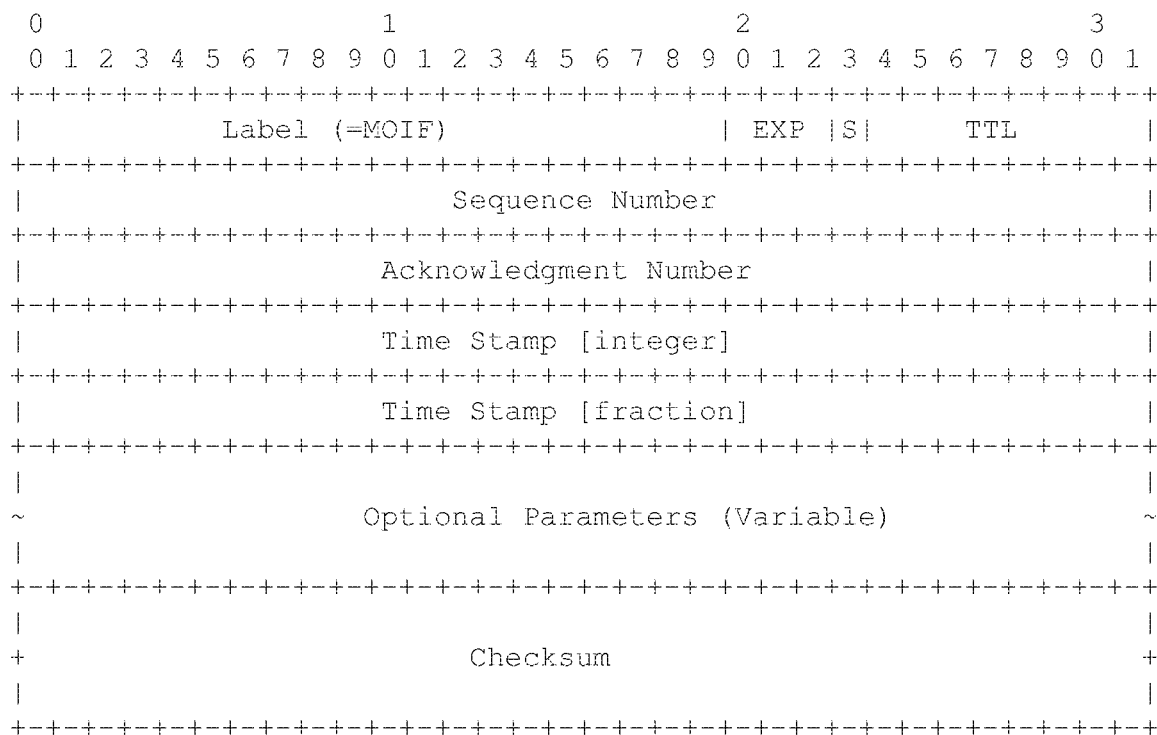
FIG. 12 depicts an example embodiment of an MPLS Overlay Initial Frame (MOIF) for a new transport connection.

FIG. 12 depicts an example embodiment of an MPLS Overlay Initial Frame (MOIF) for a new transport connection.

The MOIF 1200 is a special frame that may be sent roundtrip, from the LSR that initiates the transport connection to the LSR receiving the connection request and back to the LSR that initiated the transport connection, when a new transport connection is established. The use of the MOIF 1200 is optional. The MOIF 1200 enables conveyance of critical parameters (if any) shared by the MPLS overlay layers at both LSRs and supports sanity of the transport connection (e.g., such as data integrity and measurement of performance such as delay, latency, and the like) before MPLS overlay traffic is sent over the transport connection. It is noted that, if MOIF is supported and used, the administrator may configure the requirement for the MOIF in the LSRs that are participating in the connection.

The MOIF 1200 includes an MPLS Label field, a Sequence Number field, an Acknowledgement Number field, a Time Stamp field, an Optional Parameters field, and a Checksum field. The MPLS Label field is a 32-octet field that is encoded with a value that is reserved to indicate that the frame is a MOIF frame. For example, label value 0 (or any other suitable value) may be used to indicate MOIF frame. The special value that is used to indicate the MOIF frame will not be allocated for any other purpose, such as the label for an MPLS overlay. The Sequence Number field includes a random number sent out by the LSR that initiated the MOIF. The Acknowledgement field includes an acknowledgment number encoded by the LSR that receives the MOIF and sends the updated MOIF back to the LSR that initiated the MOIF. For example, the LSR that receives the MOIF and sends the updated MOIF back to the LSR that initiated the MOIF may increment the sequence number received in the Sequence Number field by one to provide the acknowledgment number. The Time Stamp field includes a timestamp inserted by the LSR that initiated MOIF. The timestamp indicates the time of at which the MOIF was sent. This field is used to measure one or more parameters of the MOIF (e.g., round-trip-time (RTT), latency, or the like). The Optional Parameters field is a variable length field that can be used to encode various optional parameters. The Checksum field includes a checksum of all of the prior fields in the MOIF. The checksum is used to verify the sanity of the packet.

It will be appreciated that, although primarily presented with respect to specific numbers, types, and arrangements of fields, the MOIF 1200 may include various other numbers, types, or arrangements of fields (including various custom fields which may be designed and used).

Figure 13:
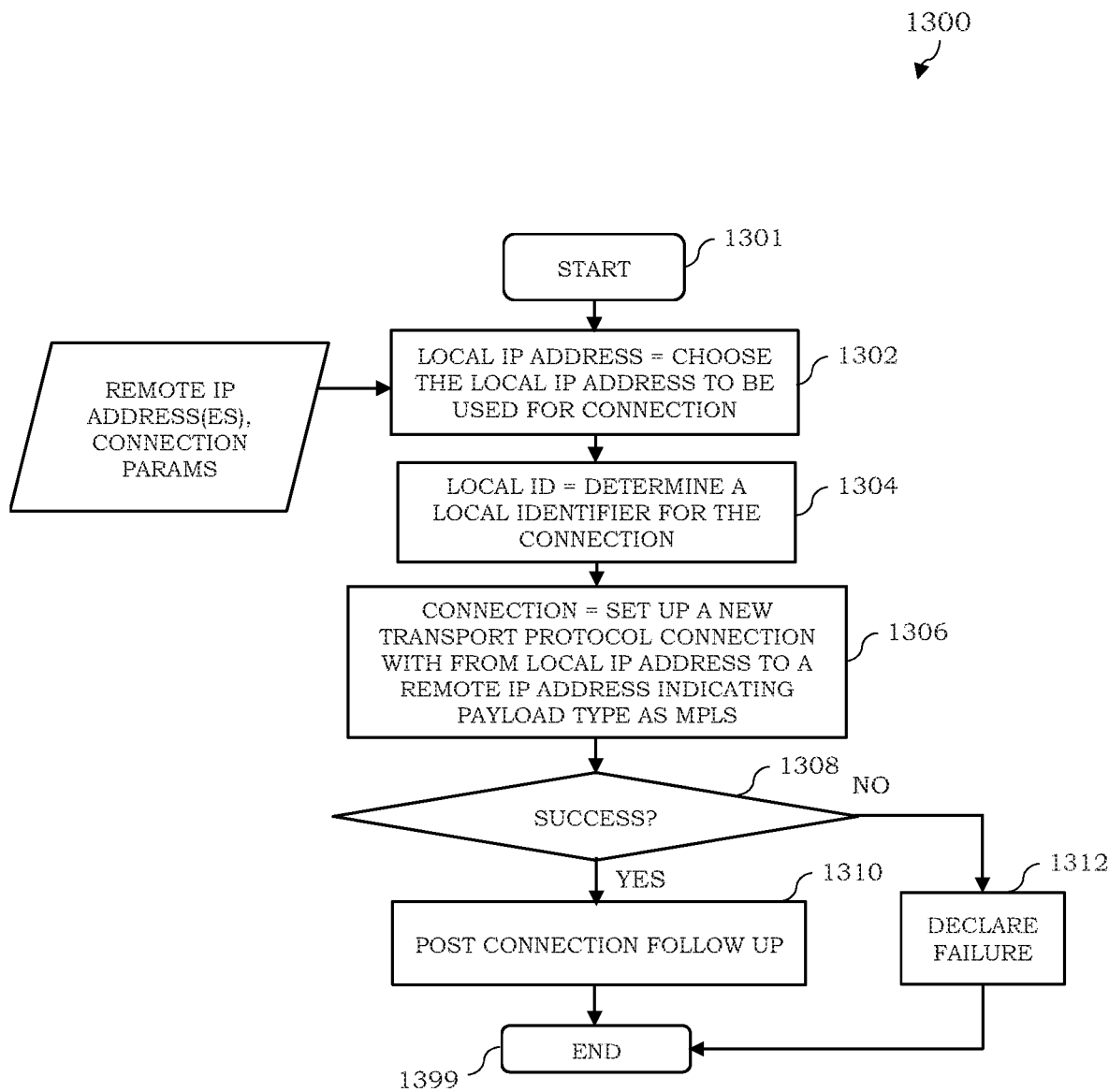
FIG. 13 depicts an example embodiment of a method for use by an initiating router for configuring a reliable transport connection.

FIG. 13 depicts an example embodiment of a method for use by an initiating router for configuring a reliable transport connection. The method 1300 is configured for use by an LSR initiating a reliable transport connection to support configuration of the reliable transport to a remote LSR for tunneling of MPLS overlay packets. It is noted that, if the transport protocol is designed to operate in client-server paradigm, then the method 1300 may be performed by the LSR that takes the role of the client (e.g., in the client-server paradigm, the client initiates the connection set-up request and the server listens to incoming connection requests and responds to the client in accepting or rejecting the connection request. It will be appreciated that, although primarily presented as being performed serially, at least a portion of the blocks of method 1300 may be performed contemporaneously or in a different order than as presented in FIG. 13. The inputs to the method 1300 include (1) one or more remote IP addresses available for the connection (e.g., a set of IP addresses of the remote LSR configured to listen for connection requests) and (2) connection parameters, which define a set of parameters for the connection such as related to delay/timeouts, congestion, segmentation/reassembly of payload (MPLS), and the like. At block 1301, the method 1300 begins. Block 1302 chooses a local IP address in the LSR that can be used for sending and receiving tunnel traffic, and the method 1300 then proceeds to block 1304. Block 1304 determines a local identifier to be used for the new connection, and the method 1300 then proceeds to block 1306. Block 1306 sets up a transport protocol connection with the local identifier from the local IP address to one of the remote IP addresses, specifying that the connection would carry MPLS packets, and the method 1300 then proceeds to block 1308. Block 1308 checks if the connection succeeded. If the connection succeeded, then the method 1300 proceeds to block 1310, otherwise the method 1300 proceeds to block 1312. Block 1312 declares failure to configure the connection and the method 1300 then proceeds to block 1399 where the method 1300 ends. Block 1310 performs certain follow up actions on the new connection (e.g., initiating the MOIF and so forth) until the transport connection is ready to be used by MPLS overlays, and the method 1300 then proceeds to block 1399 where the method 1300 ends. At block 1399, the method 1300 ends.

Figure 14:
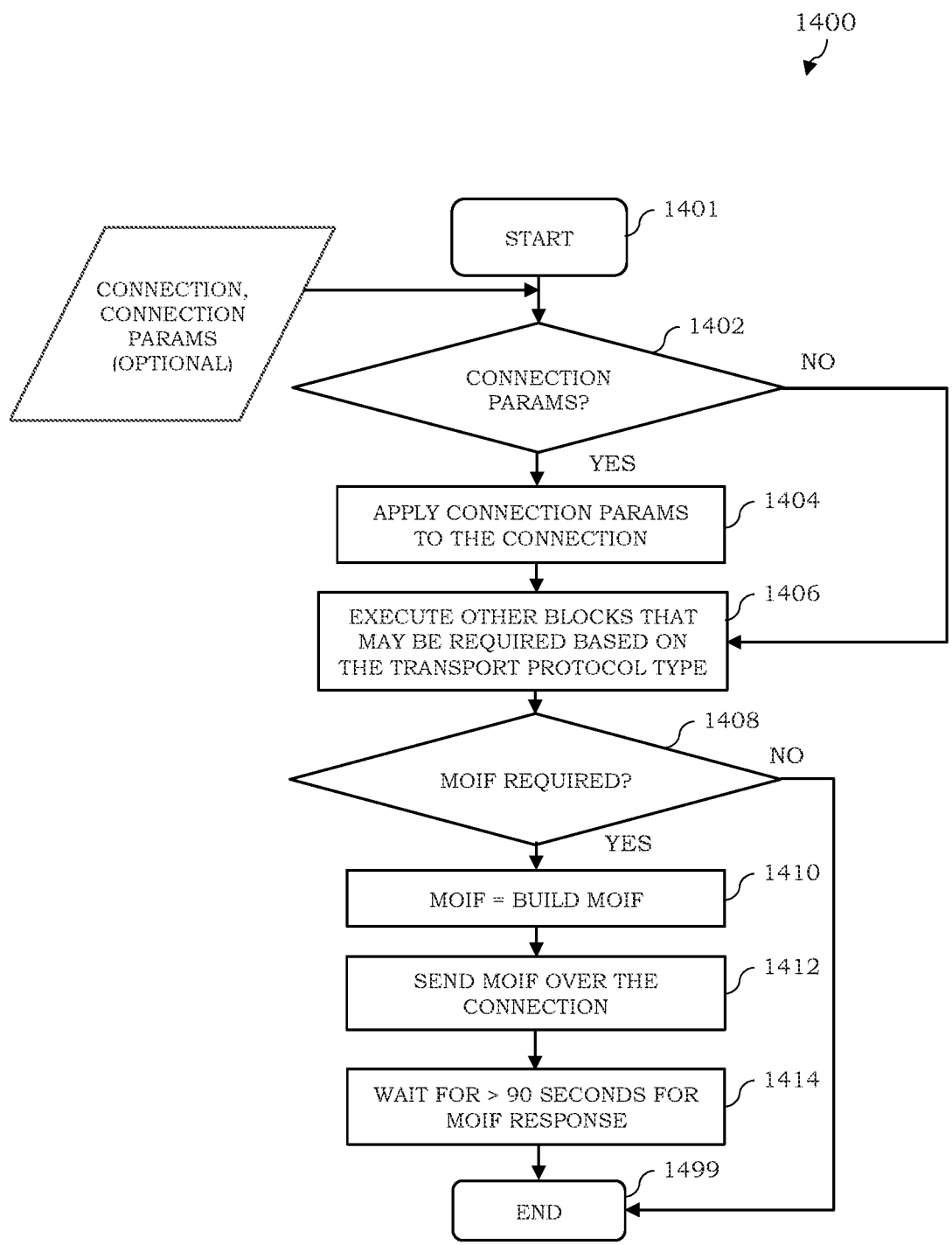
FIG. 14 depicts an example embodiment of a method for use by an initiating router for supporting follow-up actions for a new reliable transport connection.

FIG. 14 depicts an example embodiment of a method for use by an initiating router for supporting follow-up actions for a new reliable transport connection. The method 1400 may be used to provide block 1310 of method 1300 of FIG. 13. It will be appreciated that, although primarily presented as being performed serially, at least a portion of the blocks of method 1400 may be performed contemporaneously or in a different order than as presented in FIG. 14. The inputs to method 1400 include (1) the transport connection that is operational (denoted as Connection) and (2) the parameters for the transport connection that is operational (denoted as connection parameters). For example the connection parameters may include parameters related to delay/timeouts, congestion, segmentation/reassembly of payload (MPLS), and the like. It is noted that the connection parameters may not be applicable to certain transport protocol types and, thus, that the connection parameters may be considered to be optional in certain situations. At block 1401, the method 1400 begins. Block 1402 checks if connection parameters were provided. If connection parameters were provided, then the method 1400 proceeds to block 1404, otherwise the method 1400 proceeds to block 1406. Block 1404 applies the input connection parameters to the new connection and the method 1400 then proceeds to block 1406. Block 1406 may execute various other actions based on the transport protocol type, such as further conditioning of the connection, and the method 1400 then proceeds to block 1408. Block 1408 checks if the requirement of MOIF is configured in the LSR. If the requirement of MOIF is configured in the LSR, then the method 1400 proceeds to block 1410, otherwise the method 1400 proceeds to block 1499 where the method 1400 ends. Block 1410 builds a MOIF and fills the necessary fields, and the method 1400 then proceeds to block 1412. Block 1412 sends the MOIF over the transport connection and the method 1400 then proceeds to block 1414. Block 1414 waits for MOIF response from the peer LSR. It is noted that an implementation may wait for at least 90 seconds (or any other suitable length of time) for a MOIF response. In order to wait, the LSR may start a timer for a duration within which it expects a MOIF response and associate the timer with the transport connection (although it will be appreciated that other mechanisms are contemplated). From block 1414, the method 1400 proceeds to block 1499 where the method 1400 ends. At block 1499, the method 1400 ends.

FIG. 15 depicts an example embodiment of a method for use by an initiating router for constructing a MOIF for a new reliable transport connection. The method 1500 may be used to provide block 1410 of method 1400 of FIG. 14. It will be appreciated that, although primarily presented as being performed serially, at least a portion of the blocks of method 1500 may be performed contemporaneously or in a different order than as presented in FIG. 15. At block 1501, the method 1500 begins. Block 1502 creates an empty MOIF, meaning a MOIF with all fields zeroed out, and the method 1500 the proceeds to block 1504. Block 1504 sets the value of the MPLS label to the special value that indicates that the packet is a MOIF packet, sets the S-bit to 1 (since no more labels follow), and sets the EXP and TTL values as per the choice of an implementation. The method 1500 then proceeds to block 1506. Block 1506 sets the Sequence Number field to a random value, and the method 1500 then proceeds to block 1508. Block 1508 sets the Time Stamp field to the current time in the LSR, and the method 1500 then proceeds to block 1510. Block 1510 fills the optional parameters if any (this block is specific to an implementation), and the method 1500 then proceeds to block 1512. Block 1512 computes the checksum of all prior fields in the MOIF and fills the result into the Checksum field, and the method 1500 then proceeds to block 1599. At block 1599, the method 1500 ends.

FIG. 16 depicts an example embodiment of a method for use by an initiating router when a MOIF response is not received within a predefined time period. The method 1600 may be used to provide block 1414 of method 1400 of FIG. 14. It will be appreciated that, although primarily presented as being performed serially, at least a portion of the blocks of method 1600 may be performed contemporaneously or in a different order than as presented in FIG. 16. The input to method 1600 includes a notification that the MOIF await timer expired. At block 1601, the method 1600 begins. Block 1602 retrieves the transport connection associated with the timer and the method 1600 then proceeds to block 1604. Block 1604 closes the transport connection, and the method 1600 then proceeds to block 1699. At block 1699, the method 1600 ends.

Figure 17:
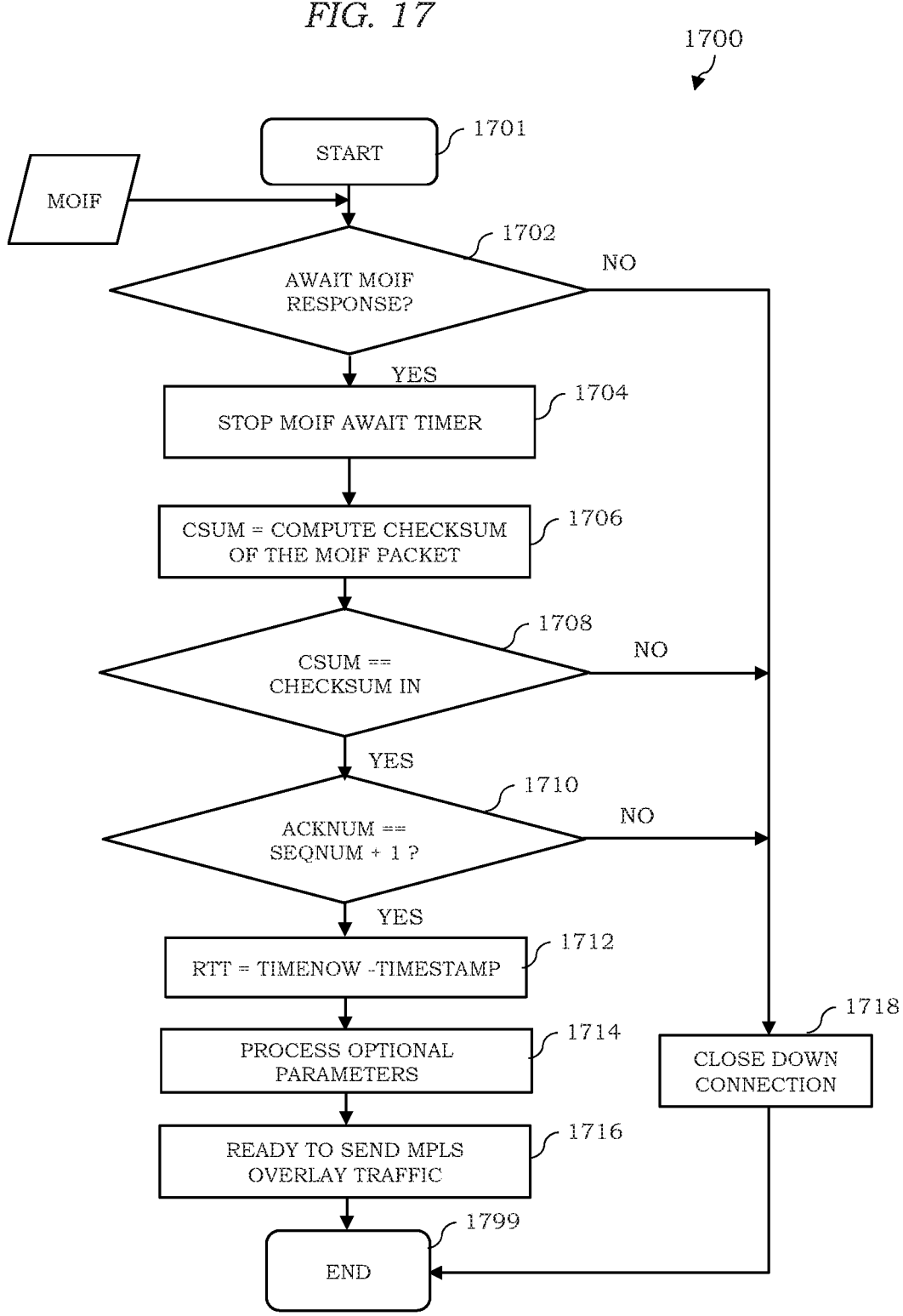
FIG. 17 depicts an example embodiment of a method for use by an initiating router to handle a MOIF response.

FIG. 17 depicts an example embodiment of a method for use by an initiating router to handle a MOIF response. It will be appreciated that, although primarily presented as being performed serially, at least a portion of the blocks of method 1700 may be performed contemporaneously or in a different order than as presented in FIG. 17. The input to method 1700 includes a MOIF packet. It is noted that the determination that a received packet is a MOIF packet may be made as part of general processing of MPLS overlay packets on the transport connection (e.g., as presented with respect to blocks 2502-2514 of method 2500 of FIG. 25). At block 1701, the method 1700 begins. Block 1702 checks if the LSR has been waiting for a MOIF response from a peering LSR (e.g., if a MOIF await timer is running). If the LSR has been waiting for a MOIF response from a peering LSR, then the method 1700 proceeds to block 1704, otherwise the method 1700 proceeds to block 1718 to handle as invalid packet. Block 1718 closes the transport connection. Block 1704 stops the MOIF await timer, and the method 1700 then proceeds to block 1706. Block 1706 computes the checksum of all fields in the MOIF packet, except for the checksum field, and the method 1700 then proceeds to block 1708. Block 1708 checks if the computed checksum is equal to the value of the checksum field in the packet. If the computed checksum is equal to the value of the checksum field in the packet, then the method 1700 proceeds to block 1710, otherwise the method 1700 proceeds to block 1718 to handle an erroneous MOIF packet. Block 1718 closes the transport connection. Block 1710 checks if the value in acknowledgement number field in MOIF packet is equal to the value in sequence number field plus one. If the value in acknowledgement number field in MOIF packet is equal to the value in sequence number field plus one, then the method 1700 proceeds to block 1718 to handle an erroneous MOIF packet, otherwise the method 1700 proceeds to block 1712. Block 1718 closes the transport connection. Block 1712 computes the RTT of the MOIF packet by decrementing the value in timestamp field in the MOIF packet from the current timestamp in the LSR. The RTT provides an idea about the latency of the tunnel to the remote LSR. From block 1712, the method 1700 proceeds to block 1714. Block 1714 handles the optional parameters (if any) in the MOIF packet, and the method 1700 then proceeds to block 1716. Block 1716 marks the connection as ready for tunneling MPLS overlay traffic, and the method 1700 then proceeds to block 1799 where the method 1700 ends. At block 1700, the method 1700 ends.

Figure 18:
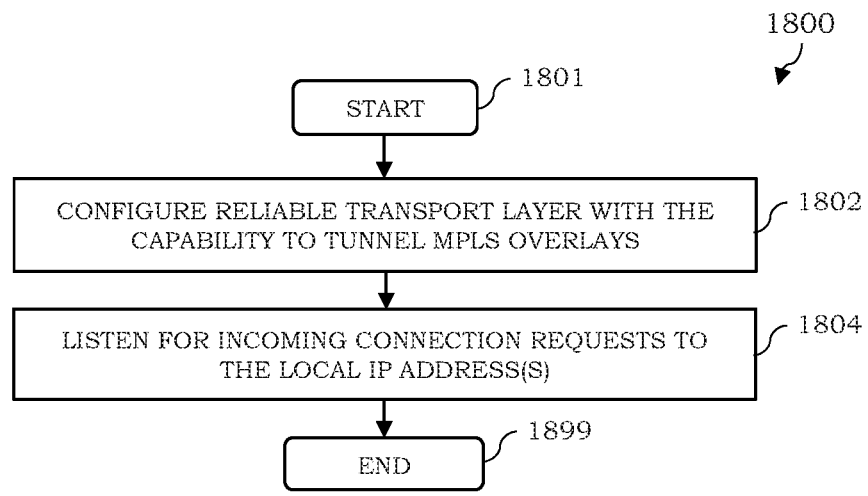
FIG. 18 depicts an example embodiment of a method for use by a receiving router for configuring a reliable transport connection listener.

FIG. 18 depicts an example embodiment of a method for use by a receiving router for configuring a reliable transport connection listener. It is noted that an LSR may configure a reliable transport layer to listen for requests for incoming connections to be used for MPLS overlays. It is noted that this may be used by any LSRs that configure MPLS overlays. It will be appreciated that, although primarily presented as being performed serially, at least a portion of the blocks of method 1800 may be performed contemporaneously or in a different order than as presented in FIG. 18. At block 1801, the method 1800 begins. Block 1802 configures the transport layer with the capability to tunnel MPLS overlays, and the method 1800 then proceeds to block 1804. Block 1804 starts listening to incoming connection requests to any IP address in a pool of local IP addresses (e.g., chosen administratively). At block 1899, the method 1800 ends.

Figure 19:
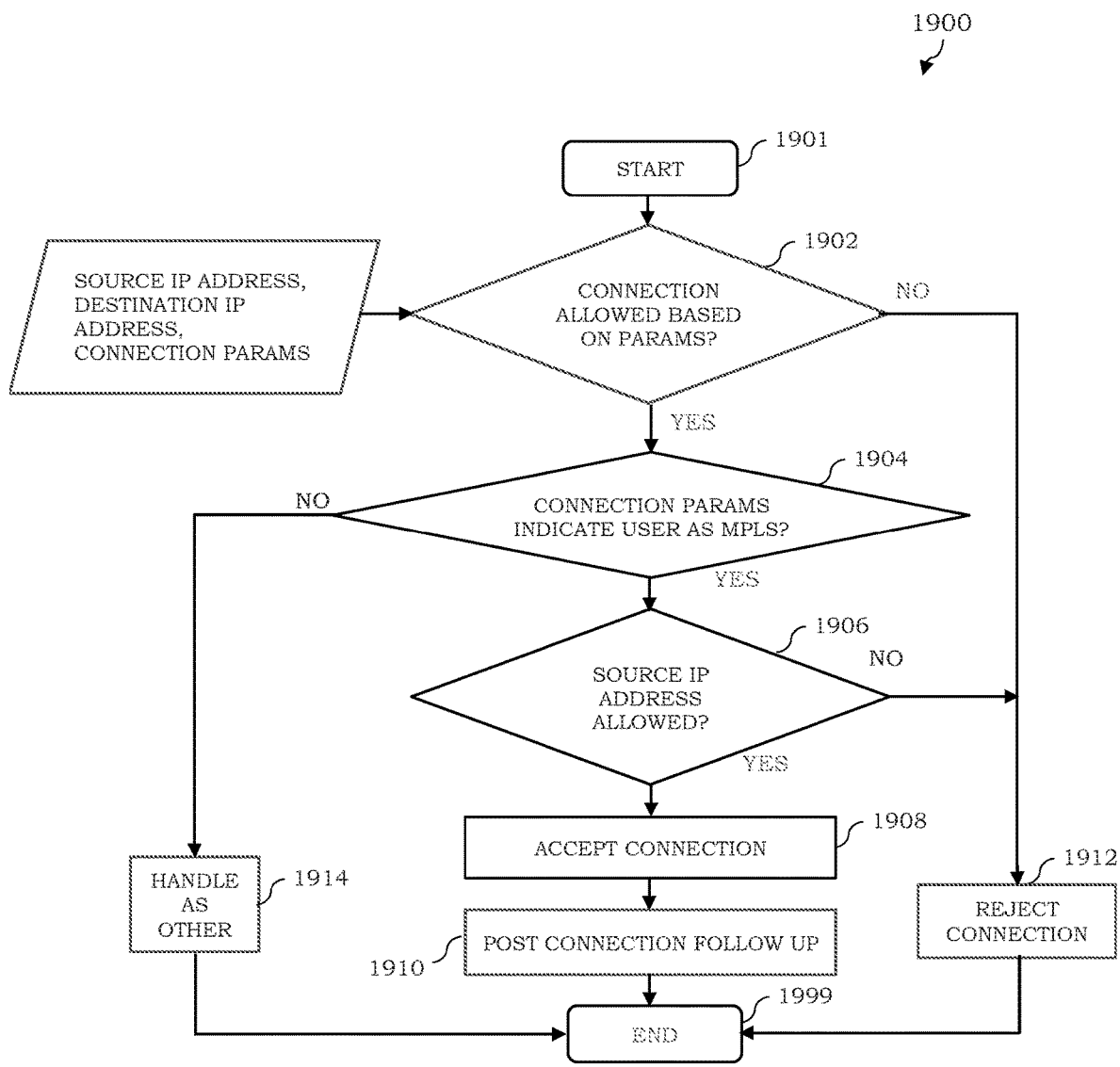
FIG. 19 depicts an example embodiment of a method for use by a receiving router for processing incoming requests for transport layer connections.

FIG. 19 depicts an example embodiment of a method for use by a receiving router for processing incoming requests for transport layer connections. It will be appreciated that, although primarily presented as being performed serially, at least a portion of the blocks of method 1900 may be performed contemporaneously or in a different order than as presented in FIG. 19. The input to method 1900 includes a connection request with the following parameters (1) source IP address (the IP address of the remote LSR that sent the request), (2) destination IP address (a local IP address of the LSR), and (3) connection parameters (the transport protocol specific parameters in the connection request). At block 1901, the method 1900 begins. Block 1902 evaluates the connection parameters to check if the connection can be allowed. If the connection cannot be allowed, then the method 1900 proceeds to block 1912, otherwise the method 1900 proceeds to block 1904. Block 1912 rejects the connection using appropriate methods in the transport layer (e.g., a rejection notification to the remote LSR as per methods in the transport protocol), and the method 1900 then proceeds to block 1999 where the method 1900 ends. Block 1904 checks if the connection parameters indicate the user as MPLS. If the connection parameters do not indicate the user as MPLS, then the method 1900 proceeds to block 1914, otherwise the method 1900 proceeds to block 1906. Block 1914 handles the connection request as per the associated user and the method 1900 then proceeds to block 1999 where the method 1900 ends. Block 1906 checks if a connection is allowed from the remote LSR (i.e., from the source IP address). It is noted that there are various factors that determine whether an LSR should allow an incoming connection. For example, the LSR may employ a method to discover all potential remote LSRs that may participate in an MPLS overlay with the LSR. If a connection from the remote LSR is not allowed, then the method 1900 proceeds to block 1912, otherwise, the method 1900 proceeds to block 1908. Block 1912 rejects the connection using appropriate methods in the transport layer (e.g., rejection notification to the remote LSR as per methods in the transport protocol), and the method 1900 then proceeds to block 1999 where the method 1900 ends. Block 1908 accepts the connection request (which means that the state for the connection is created based on the semantics of the transport layer, which may use certain elements in the connection parameters and which may include the source and destination IP addresses as well), and the method 1900 then proceeds to block 1910. Block 1910 performs certain follow up actions on the new connection, and the method 1900 then proceeds to block 1999 where the method 1900 ends.

Figure 20:
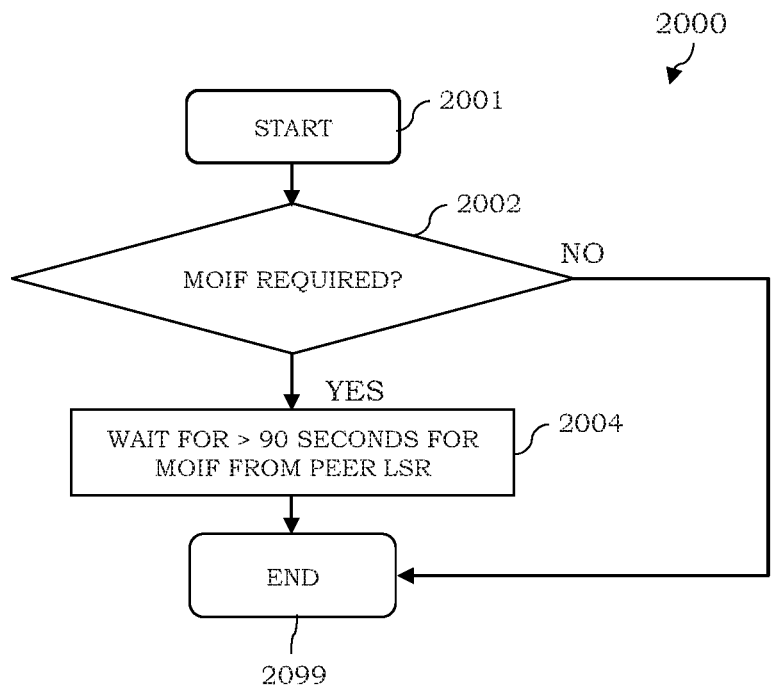
FIG. 20 depicts an example embodiment of a method for use by a receiving router for performing post connection follow-up for a new reliable transport connection.

FIG. 20 depicts an example embodiment of a method for use by a receiving router for performing post connection follow-up for a new reliable transport connection. It is noted that the method 2000 may be performed by the LSR that receives the connection request for the reliable transport connection. It will be appreciated that, although primarily presented as being performed serially, at least a portion of the blocks of method 2000 may be performed contemporaneously or in a different order than as presented in FIG. 20. At block 2001, the method 2000 begins. Block 2002 checks if MOIF is required by the LSR. If MOIF is required by the LSR, the method 2000 proceeds to block 2004, otherwise the method 2000 proceeds to block 2099 where the method 2000 ends. Block 2004 waits for a MOIF from peer LSR. It will be appreciated that the LSR may wait for the MOIF for any suitable amount of time (e.g., 90 seconds or any other suitable amount of time). It will be appreciated that the LSR may use various mechanisms for controlling the wait for the MOIF (e.g., the LSR may start a timer for a duration within which it expects a MOIF response and associate the timer with the transport connection). From block 2004, the method 2000 proceeds to block 2099 where the method 2000 ends. If the LSR fails to receive a MOIF within a predefined time period (e.g., the timeout set at block 2004 expires), then the LSR executes the method 1600 of FIG. 16 (then handling is common in both initiating and receiving LSRs). At block 2099, the method 2000 ends.

Figure 21:
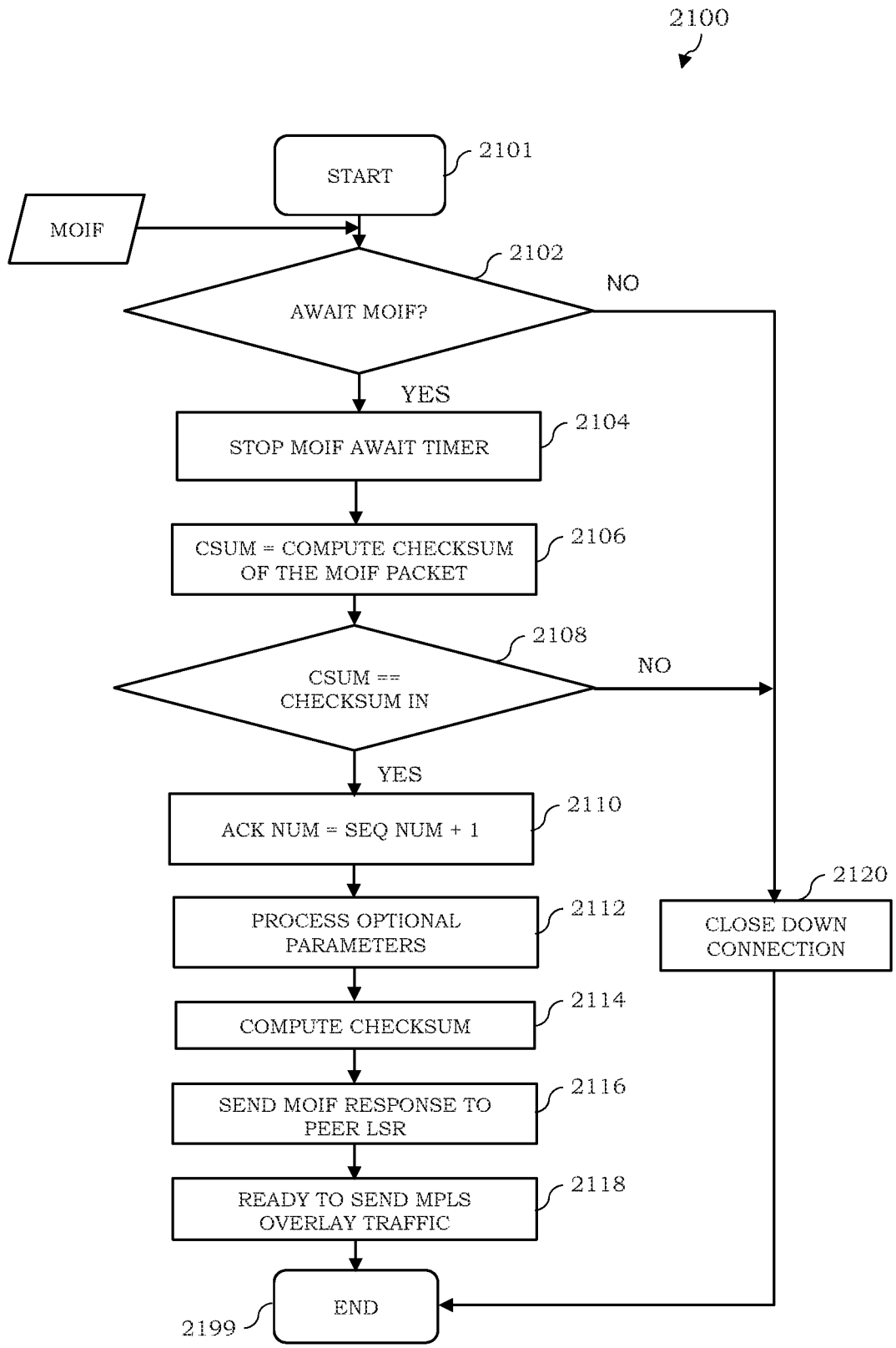
FIG. 21 depicts an example embodiment of a method for use by a receiving router to handle a MOIF while waiting for a MOIF response.

FIG. 21 depicts an example embodiment of a method for use by a receiving router to handle an MOIF while waiting for a MOIF response. It is noted that the method 2100 may be used while the LSR waits for the response in block 2004 of the method 2000 of FIG. 20. It will be appreciated that, although primarily presented as being performed serially, at least a portion of the blocks of method 2100 may be performed contemporaneously or in a different order than as presented in FIG. 21. The input to method 1700 includes a MOIF packet. It is noted that the determination that a received packet is a MOIF packet may be made as part of general processing of MPLS overlay packets on the transport connection (e.g., as presented with respect to blocks 2502-2514 of method 2500 of FIG. 25). At block 2101, the method 2100 begins. Block 2102 checks if the LSR has been waiting for a MOIF response from a peering LSR (e.g., checks if the MOIF await timer is running). If the LSR has been waiting for a MOIF response from a peering LSR, then the method 2100 proceeds to block 2104, otherwise the method 2100 proceeds to block 2120 to handle the packet as an invalid packet. Block 2120 closes the transport connection. Block 2104 stops the MOIF await timer, and the method 2100 then proceeds to block 2106. Block 2106 computes the checksum of all fields in the MOIF packet, except the checksum field, and the method 2100 then proceeds to block 2108. Block 2108 checks if the computed checksum is equal to the value of checksum field in the packet. If the computed checksum is equal to the value of checksum field in the packet, then the method 2100 proceeds to block 2110, otherwise the method 2100 proceeds to block 2120 to handle the erroneous MOIF packet. Block 2120 closes the transport connection. Block 2110 sets the value in acknowledgement number field in the MOIF packet equal to the value in the sequence number field plus one, and the method 2100 then proceeds to block 2112. Block 2112 handles the optional parameters (if any) in the MOIF packet, and the method 2100 then proceeds to block 2114. Block 2114 computes the checksum of all prior fields in the MOIF and updates the result into the checksum field, and the method 2100 then proceeds to block 2116. Block 2116 sends the updated MOIF packet back to the peer LSR, and the method 2100 then proceeds to block 2118. Block 2118 marks the connection as ready for tunneling MPLS overlay traffic, and the method 2100 then proceeds to block 2199 where the method 2100 ends.

Figure 22A:
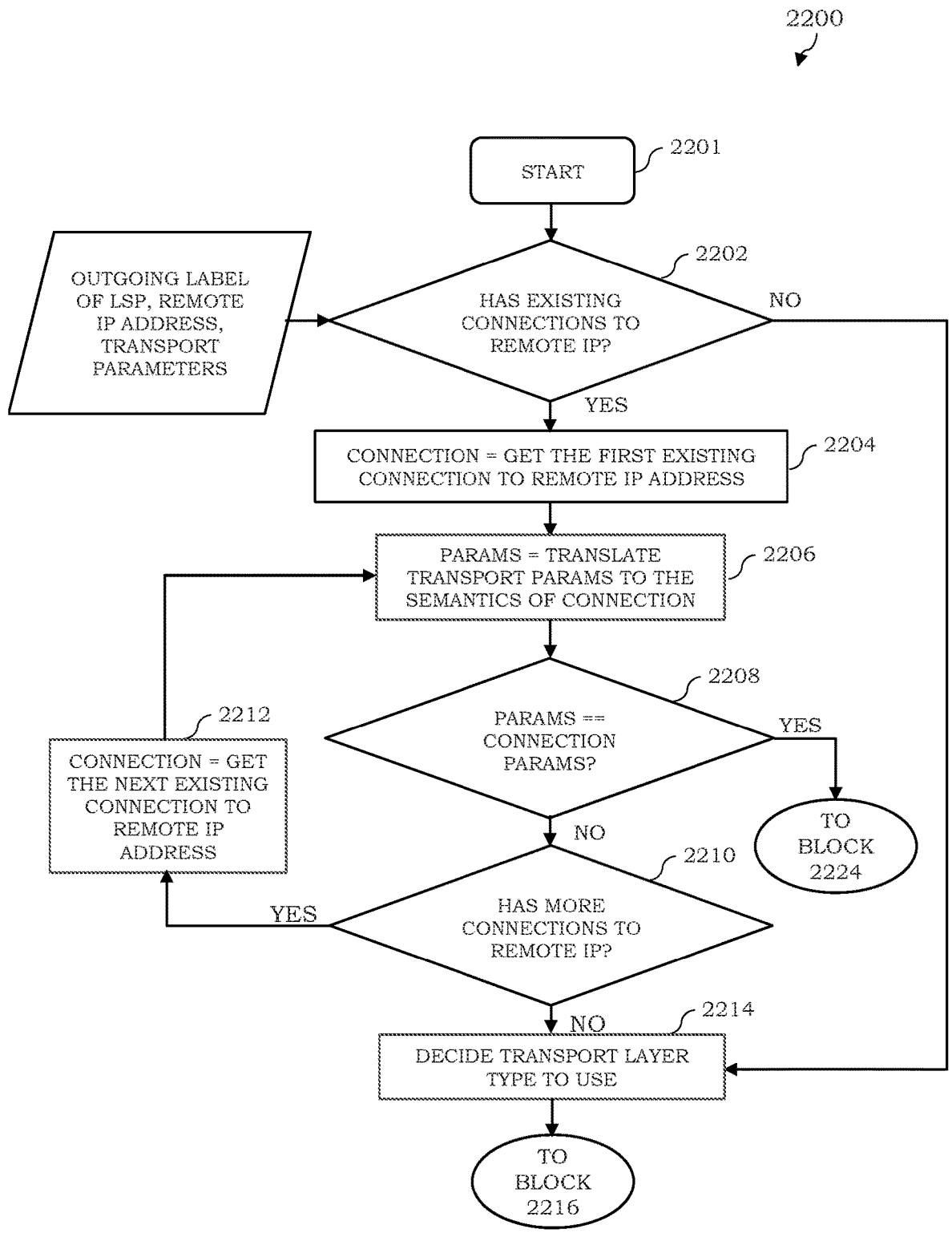
FIGS. 22A-22B depict an example embodiment of a method for configuration of a reliable MPLS overlay.
Figure 22B:
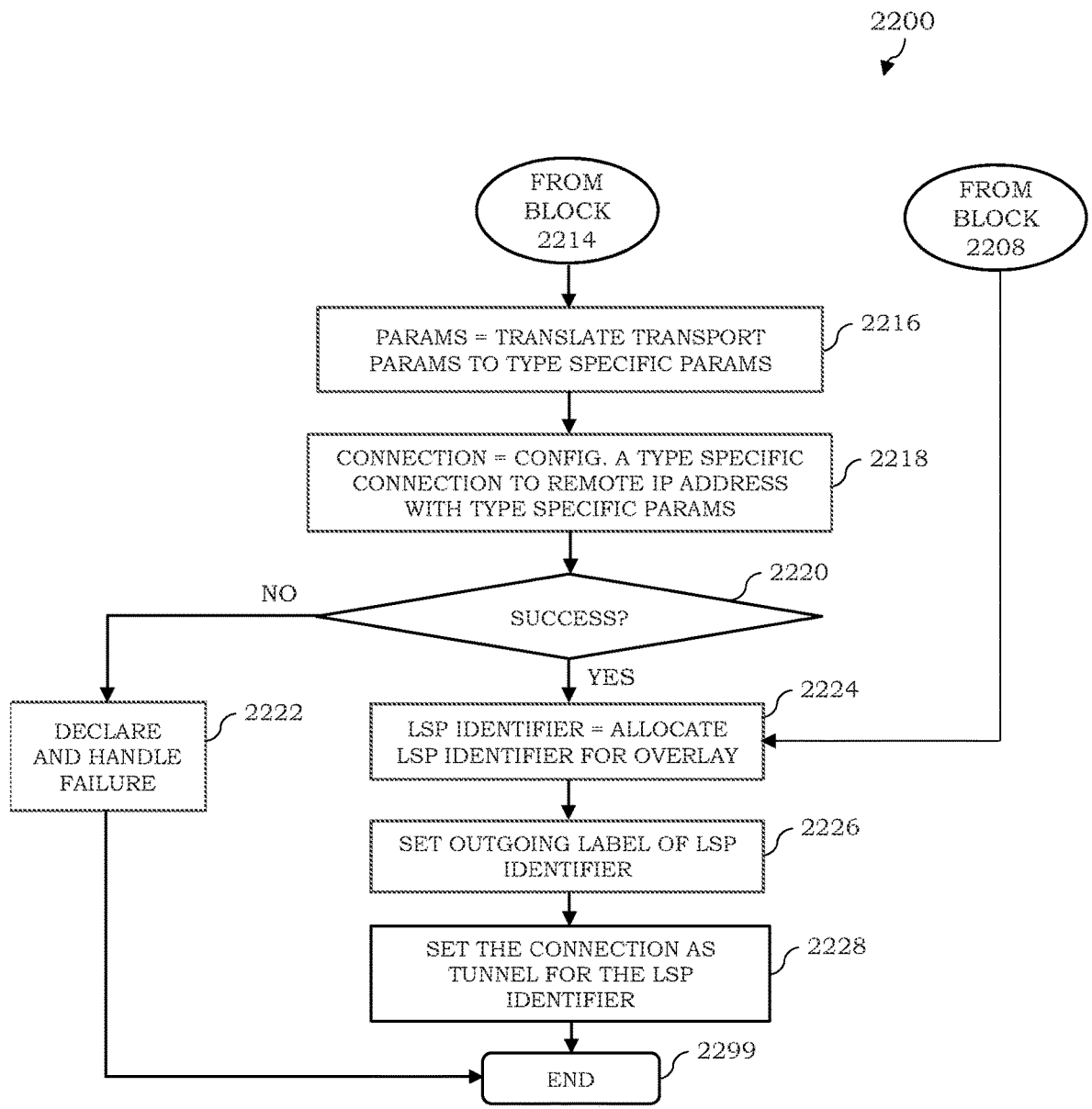

FIGS. 22A-22B depict an example embodiment of a method for configuration of a reliable MPLS overlay. It is noted that method 2200 may be used by an LSR to set up a reliable MPLS overlay to a remote LSR. It will be appreciated that, although primarily presented as being performed serially, at least a portion of the blocks of method 2200 may be performed contemporaneously or in a different order than as presented in FIGS. 22A-22B. The inputs to method 2200 include (1) the outgoing MPLS label of the LSP (MPLS overlay), (2) an IP address in the remote LSR of the LSP, and (3) transport parameters which define a set of parameters for the tunnel as required by the LSP (e.g., related to delay/timeouts, congestion, segmentation and reassembly, and the like). At block 2201, the method 2200 begins. Block 2202 checks if there are existing reliable transport connections to the remote LSR (e.g., which are used by other MPLS overlays). If there are no existing reliable transport connections to the remote LSR, then the method 2200 proceeds to block 2214, otherwise the method 2200 proceeds to block 2204. Block 2204 gets the first reliable transport connection to the remote LSR (e.g., which is used by other MPLS overlays) and the method 2200 then proceeds to block 2206. Block 2206 translates the input transport parameters to the equivalents configured in the connection, and the method 2200 proceeds to block 2208. Block 2208 checks if the parameters requested by the overlay match the parameters of the connection. If the parameters requested by the overlay match the parameters of the connection, then the method 2200 proceeds to block 2224, otherwise the method 2200 proceeds to block 2210. Block 2210 checks if there are more existing reliable transport connections to the remote LSR for MPLS overlays. If there are more connections then the method 2200 proceeds to block 2212, otherwise the method 2200 proceeds to block 2214. Block 2212 gets the next reliable transport connection to remote LSR, and then returns to block 2206 to repeat subsequent blocks for the next connection. Block 2214, which is reached when a new transport connection is required, determines the reliable transport layer type to use. For example, if the LSR supports multiple types of reliable transport layers that support MPLS overlay, then a choice may be made between the multiple types of reliable transport layers. It is noted that various factors may be evaluated for choosing between the multiple types of reliable transport layers. From block 2214, the method 2200 proceeds to block 2216. Block 2216 translates the transport parameters (input) to the semantics of the chosen transport layer (i.e., connection parameters), and the method 2200 then proceeds to block 2218. Block 2218 configures a new reliable transport connection to the remote LSR, to be used for MPLS overlays. The transport connection is configured with the connection parameters. Block 2218 may be implemented by the method 1600 of FIG. 16. From block 2218, the method 2200 proceeds to block 2220. Block 2220 checks if the connection has been set up successfully. If the connection has not been set up successfully then the method 2200 proceeds to block 2222, otherwise the method 2200 proceeds to block 2222. Block 2222 declares and handles the failure to configure the MPLS overlay. Block 2224 allocates an LSP identifier to uniquely identify the MPLS overlay in the LSR. The LSP identifier binds the transport connection, outgoing label(s), and other parameters associated with the MPLS overlay. From block 2224, the method 2200 then proceeds to block 2226. Block 2226 sets the outgoing MPLS label of the LSP as the outgoing label of the LSP identifier, and the method 2200 then proceeds to block 2228. Block 2228 sets the transport connection as the tunnel associated with the LSP identifier, and the method 2200 then proceeds to block 2299 where the method 2200 ends. At block 2299, the method 2200 ends.

Figure 23:
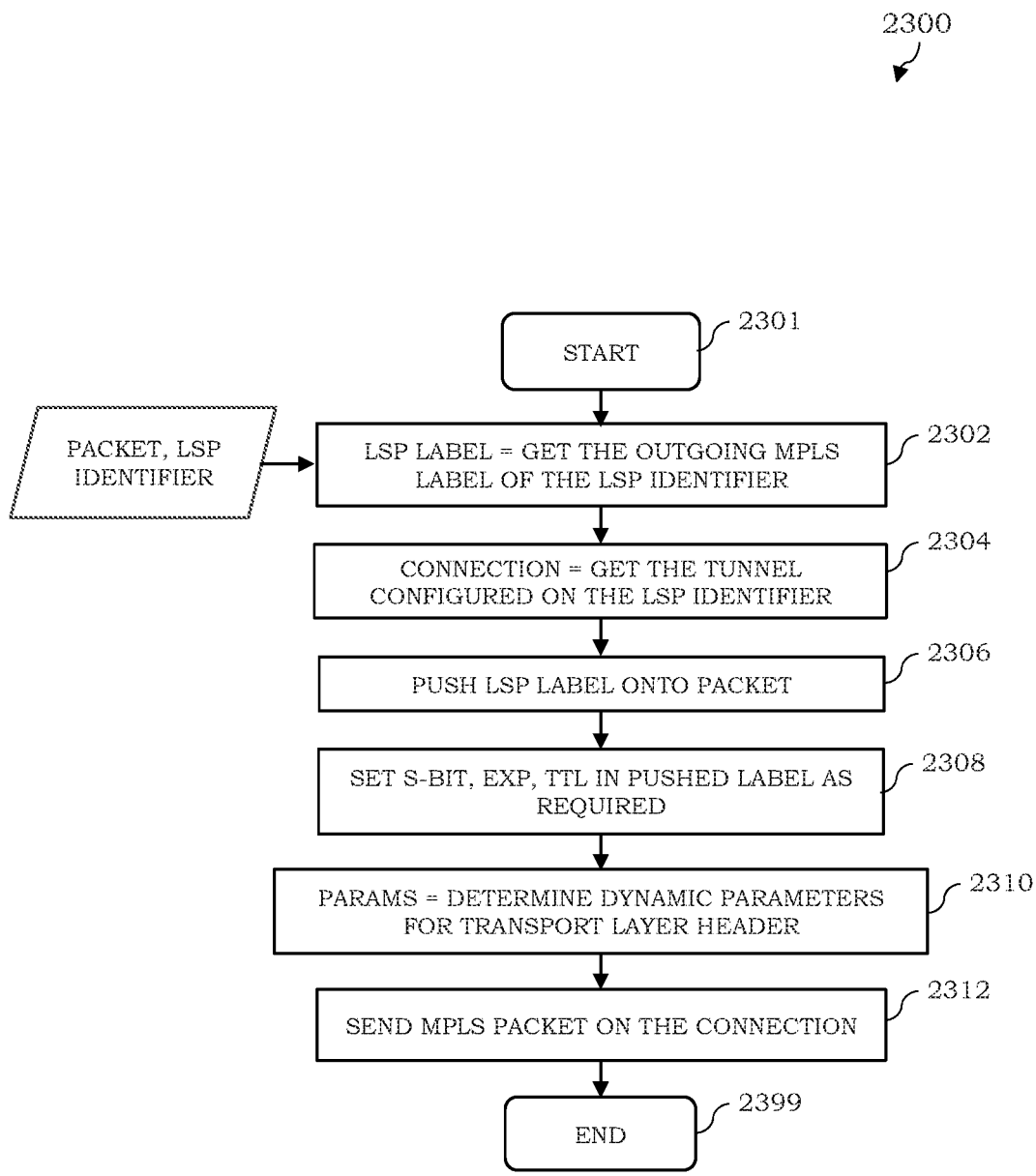
FIG. 23 depicts an example embodiment of a method for transmitting packets on a reliable MPLS overlay.

FIG. 23 depicts an example embodiment of a method for transmitting packets on a reliable MPLS overlay. It is noted that method 2300 may be performed by an LSR to transmit packets on a reliable MPLS overlay. It will be appreciated that, although primarily presented as being performed serially, at least a portion of the blocks of method 2300 may be performed contemporaneously or in a different order than as presented in FIG. 23. The inputs to method 2300 include (1) the packet to be transmitted (e.g., an FC packet, an ICC or Switch Fabric packet as in the example of FIG. 6, or the like) and (2) the LSP identifier that identifies the LSP or the overlay. At block 2301, the method 2300 begins. Block 2302 retrieves the state of the outgoing label of the LSP by the LSP identifier, and the method 2300 then proceeds to block 2304. Block 2304 gets the tunnel configured for the outgoing label, which is the reliable transport layer connection, and the method 2300 then proceeds to block 2306. Block 2306 pushes the outgoing label of the LSP onto the packet, and the method 2300 then proceeds to block 2308. Block 2308 sets the S-bit, EXP, and TTL fields in the pushed label as needed for the packet. For example, if the packet already had another label before pushing the outgoing label of the LSP, then the S-bit is set to 0, otherwise the S-bit is set to 1. The TTL and EXP values may be set by a policy configured for the LSP. For example, if the policy says to use a consistent EXP value for all packets on the LSP, then the configured EXP value is set. If the policy has mapping of the EXP values based on the certain fields in the native header of the packet then the mapped EXP value is set. From block 2308, the method 2300 proceeds to block 2310. Block 2310 determines the dynamic parameters to be used by the connection while the transport header is pushed onto the packet. It is noted that such dynamic parameters can be entropy related fields in the transport header that may be used by transit routers in IP network to compute the hash for load balancing packets on ECMP. From block 2310, the method 2300 proceeds to block 2312. Block 2312 sends the MPLS packet on the connection, with the dynamic parameters for the transport header. From block 2312, the method 2300 proceeds to block 2399 where the method 2300 ends. At block 2399, the method 2300 ends.

Figure 24:
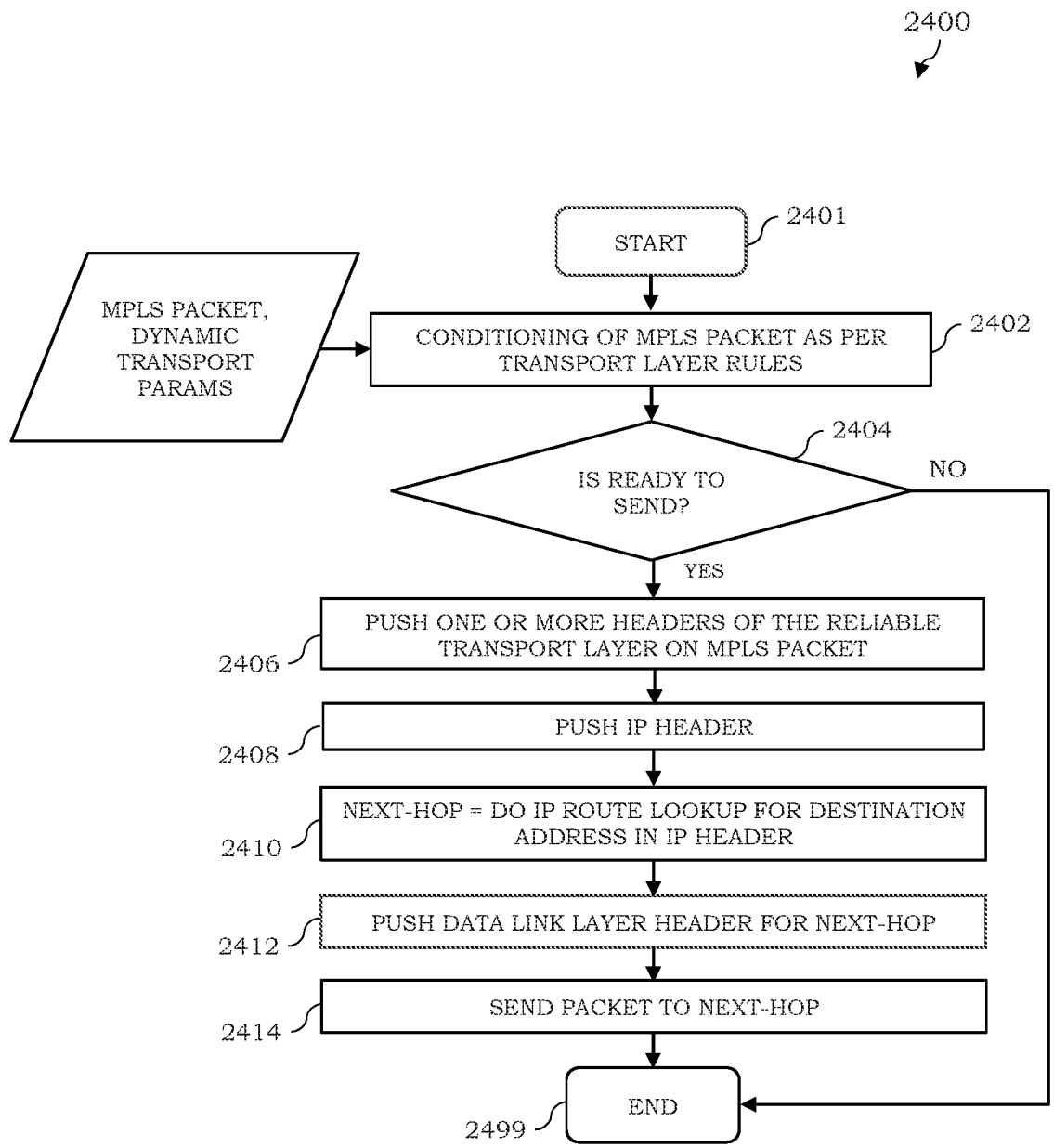
FIG. 24 depicts an example embodiment of a method for transmission of an MPLS packet by a reliable transport connection.

FIG. 24 depicts an example embodiment of a method for transmission of an MPLS packet by a reliable transport connection. It is noted that method 2400 may be used to implement block 2312 of method 2300 of FIG. 23. It will be appreciated that, although primarily presented as being performed serially, at least a portion of the blocks of method 2400 may be performed contemporaneously or in a different order than as presented in FIG. 24. The inputs to method 2400 include (1) the MPLS packet to be transmitted and (2) dynamic parameters for the transport layer header(s). At block 2401, the method 2400 begins. Block 2402 conditions the MPLS packet, which means the reliable transport layer prepares the packet as per the connection status (e.g., segregating the packet into multiple segments if the packet needs to be segmented further, applying congestion control and/or flow control on segments as necessary, or the like, as well as various combinations thereof). From block 2402, the method 2400 proceeds to block 2404. Block 2404 checks if the one or more segments of the packet are ready to be sent. For example, the segments may not be sent due to congestion, flow control, or the like. If the segments are not ready to be sent, then the segments will be sent later when the congestion is cleared and the method 2400 proceeds to block 2499 where the method 2400 ends. If the segments are ready to be sent, then the method 2400 proceeds to block 2406. Block 2406 pushes the one or more headers of the transport layer. The fields in the headers are filled as per the connection parameters, such as the fields that indicate the payload type as MPLS and the identifiers of the connection. The dynamic parameters (input) are populated into the header(s) as required. The method 2400 then proceeds to block 2408. Block 2408 pushes the IP header onto the packet. The source and destination addresses in the IP header are filled as per the local and remote IP addresses of the transport layer connection. The Protocol field (if IPv4 Header) or the Next Header field (if IPv6 Header) is set to indicate the transport layer type. The method 2400 then proceeds to block 2410. Block 2410 performs route lookup for the destination address in the IP Header, which results in the next-hop for the packet, and the method 2400 then proceeds to block 2412. Block 2412 pushes the Data Link Layer Header onto the packet, which is required to send the packet on the link to the next-hop. The method 2400 then proceeds to block 2414. Block 2414 sends the packet to the next-hop, and the method 2400 then proceeds to block 2499 where the method 2400 ends.

FIG. 25 depicts an example embodiment of a method for processing a packet received on a reliable MPLS overlay. It is noted that method 2500 may be used to implement block 2312 of method 2300 of FIG. 23. It will be appreciated that, although primarily presented as being performed serially, at least a portion of the blocks of method 2500 may be performed contemporaneously or in a different order than as presented in FIG. 25. The inputs to method 2500 include (1) a transport layer packet on a connection (e.g., received by the transport layer of the LSR with transport layer specific header(s) at the top) and (2) the connection. At block 2501, the method 2500 begins. Block 2502 checks if MPLS is the user application of the connection. If MPLS is not the user application of the connection, then the method 2500 proceeds to block 2524, otherwise the method 2500 proceeds to block 2504. Block 2524 handles the transport layer packet for non-MPLS applications. Block 2504 performs transport layer processing on the transport layer packet as per the specification of the transport protocol, and the method 2500 then proceeds to block 2506. Block 2506 checks if the transport protocol is stream-oriented. In a stream-oriented protocol, the bytes of a whole MPLS packet may not arrive together in the transport layer packet (i.e., chunks of the packet may arrive on multiple transport packets), otherwise a transport protocol can be datagram-oriented so that the transport layer packet carries the entire MPLS packet. When the method 2500 is implemented for a specific transport protocol, then block 2506 may not be needed since whether the protocol is stream-oriented or datagram-oriented is inherent to the protocol. If the check in block 2506 results in a determination that the transport protocol is stream-oriented, then the method 2500 proceeds to block 2508, otherwise the method 2500 proceeds to block 2514. Block 2508 parses the first 4 octet of the received stream as MCH, and the method 2500 then proceeds to block 2510. Block 2510 checks if the received stream at least has the number of octets specified in the length field in the MCH, i.e., at least has the whole of the next MPLS packet. If the stream does not have whole packet then the method 2500 proceeds to block 2599 where the method 2500 ends, otherwise the method 2500 proceeds to block 2512. Block 2512 pulls from the received stream the number of octets specified in the length field of the MCH plus 4 octets that constitutes the MPLS packet encapsulated by MCH and then removes the MCH to generate the MPLS packet, and the method 2500 then proceeds to block 2514. Block 2514 checks if the MPLS packet is MOIF. If the MPLS packet is MOIF, then the method 2500 proceeds to block 2516, otherwise the method 2500 proceeds to block 2518. Block 2516 handles the MOIF packet. If the LSR was the initiator of the connection then the block 2516 may be implemented by the method 1700 of FIG. 17, otherwise the block 2516 may be implemented by the method 2100 of FIG. 21. From block 2516 the method 2500 proceeds to block 2520. Block 2518 handles the packet as an MPLS packet, and the method 2500 then proceeds to block 2520. Block 2520 checks if the transport protocol is connection-oriented. This check is similar to block 2506. If the transport protocol is connection-oriented, then the method 2500 proceeds to block 2522, otherwise the method 2500 proceeds to block 2599 where the method 2500 ends (because the whole MPLS packet was processed). Block 2522 checks if more bytes are pending to be processed in the payload of transport layer protocol. If more bytes are pending to be processed in the payload of transport layer protocol, then the method 2500 returns to block 2508 to process the next MPLS packet, if any. If no more bytes are pending to be processed in the payload of transport layer protocol, then the method proceeds to block 2599 where the method 2500 ends.

Various example embodiments are configured to use TCP as the reliable transport layer for tunneling of MPLS overlay packets. This provides an implementation of the reliable MPLS overlay as MPLS-in-TCP.

FIG. 26 depicts an example embodiment of an MPLS-in-TCP encapsulation format for implementation of a reliable MPLS overlay as MPLS-in-TCP. The MPLS-in-TCP encapsulation format 2600 includes a payload, an MPLS label stack on top of the payload, an MCH on top of the MPLS label stack, a TCP header on top of the MCH, an IP header on top of the TCP header, and a data link header on top of the IP header. The TCP header, which is the TCP header for the TCP connection used as the tunnel by the MPLS overlay, includes a number of fields (at least some of which are discussed further below).

The TCP header includes a source port field that includes the local identifier of the TCP connection.

The TCP header includes a destination port field that includes a novel port number to indicate that the TCP tunnel payload is an MPLS packet. For example, the value 6637 may be used to indicate that the payload of the TCP tunnel is an MPLS packet. It is noted that, if standardized in IETF, then the value may be reserved in TCP port number registry maintained by IANA. It is noted that an implementation may use any unused alternate port number to indicate the payload as MPLS packet. For example, a port number in TCP may be administratively configured across the LSRs participating in MPLS overlays to indicate the payload as MPLS packet.

The TCP header includes various other fields which will be set per the configuration and dynamic parameters of the TCP connection.

It is noted that, since TCP is a stream-oriented protocol, the MPLS packet (namely, the payload and the MPLS label stack) is encapsulated by the MCH.

Figure 27:
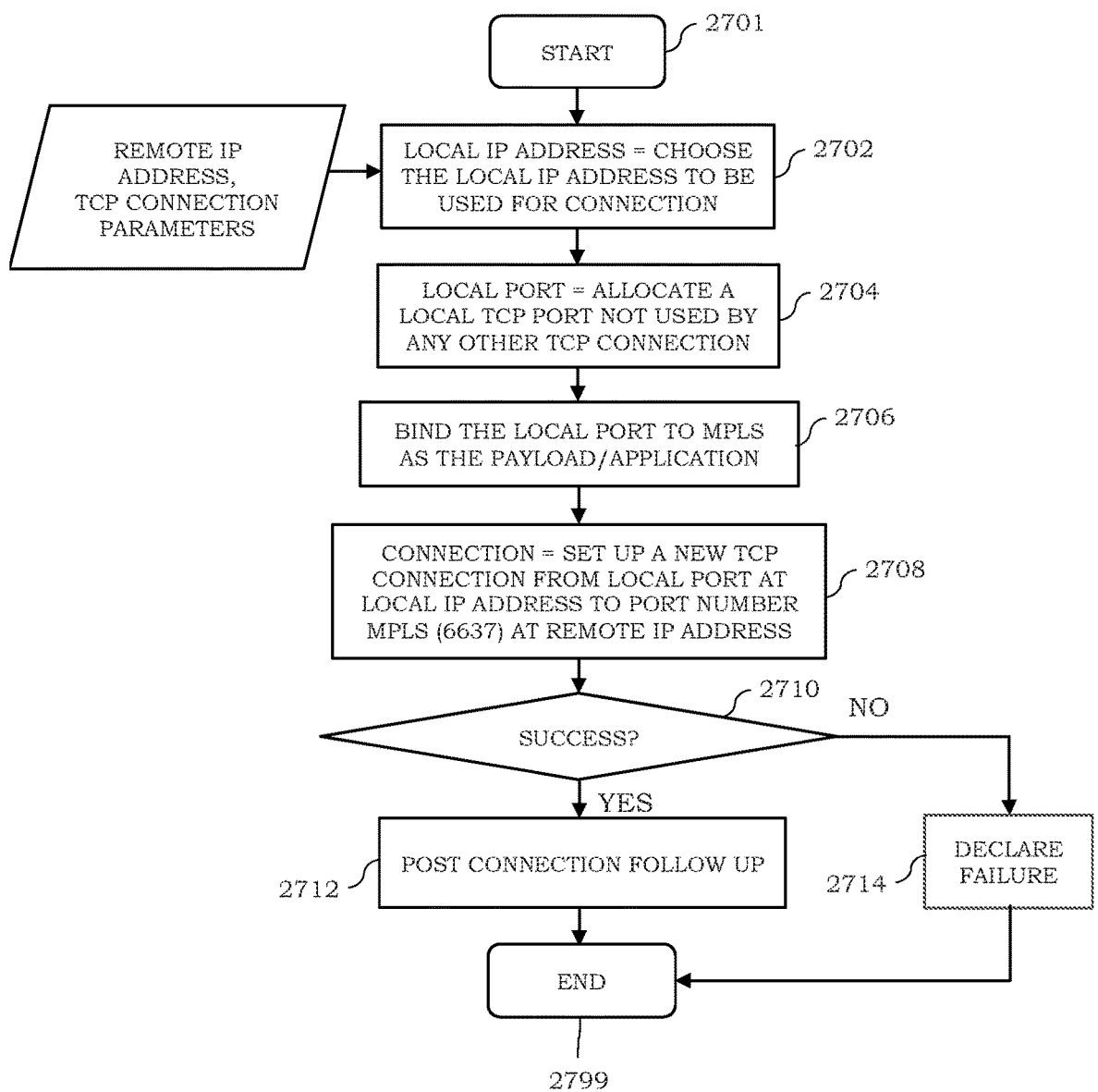
FIG. 27 depicts an example embodiment of a method for configuring a TCP connection for MPLS-in-TCP.

FIG. 27 depicts an example embodiment of a method for configuring a TCP connection for MPLS-in-TCP. The method 2700 may be based on the generic method 1300 presented in FIG. 13. It will be appreciated that, although primarily presented as being performed serially, at least a portion of the blocks of method 2700 may be performed contemporaneously or in a different order than as presented in FIG. 27. The inputs to method 2700 include (1) an IP address of the remote LSR and (2) TCP connection parameters. It is noted that, when an LSR discovers that a new TCP connection needs to be established to tunnel MPLS overlay packets, the LSR determines the IP address of the remote LSR to which the TCP connection is to be made and determines the following information about the new TCP connection (e.g., TCP connection parameters, QoS information, or the like). At block 2701, the method 2700 begins. Block 2702 chooses a configured local IP address that can be used for sending and receiving tunnel traffic and the method 2700 then proceeds to block 2704. Block 2704 allocates a local TCP port number to be used for the new connection, such that the number is not currently used by an existing TCP connection, and the method 2700 then proceeds to block 2706. Block 2706 binds the local TCP port to MPLS as its payload/application, and the method 2700 then proceeds to block 2708. Block 2708 generates a TCP connect request from the local port at the local IP address to port number MPLS (e.g., 6637) at the remote IP address. If the TCP connect request is rejected, then the LSR should act to limit unnecessary repetition of attempts to establish the connection. For example, the LSR might wait 60 seconds before trying to re-establish the connection. From block 2708, the method 2700 proceeds to block 2710. Block 2710 checks if the TCP connect request is accepted by the remote LSR (i.e. success). If the TCP connect request is accepted by the remote LSR then the method 2700 proceeds to block 2712, otherwise the method 2700 proceeds to block 2714. Block 2714 declares failure to configure the connection, and the method 2700 then proceeds to block 2799 where the method 2700 ends. Block 2712 performs post connection follow-ups. It is noted that the block 2712 may be implemented by the method in FIG. 28, which is based upon the framework defined in FIG. 14. From block 2712, the method 2700 proceeds to block 2799 where the method 2700 ends. At block 2799, the method 2700 ends.

Figure 28:
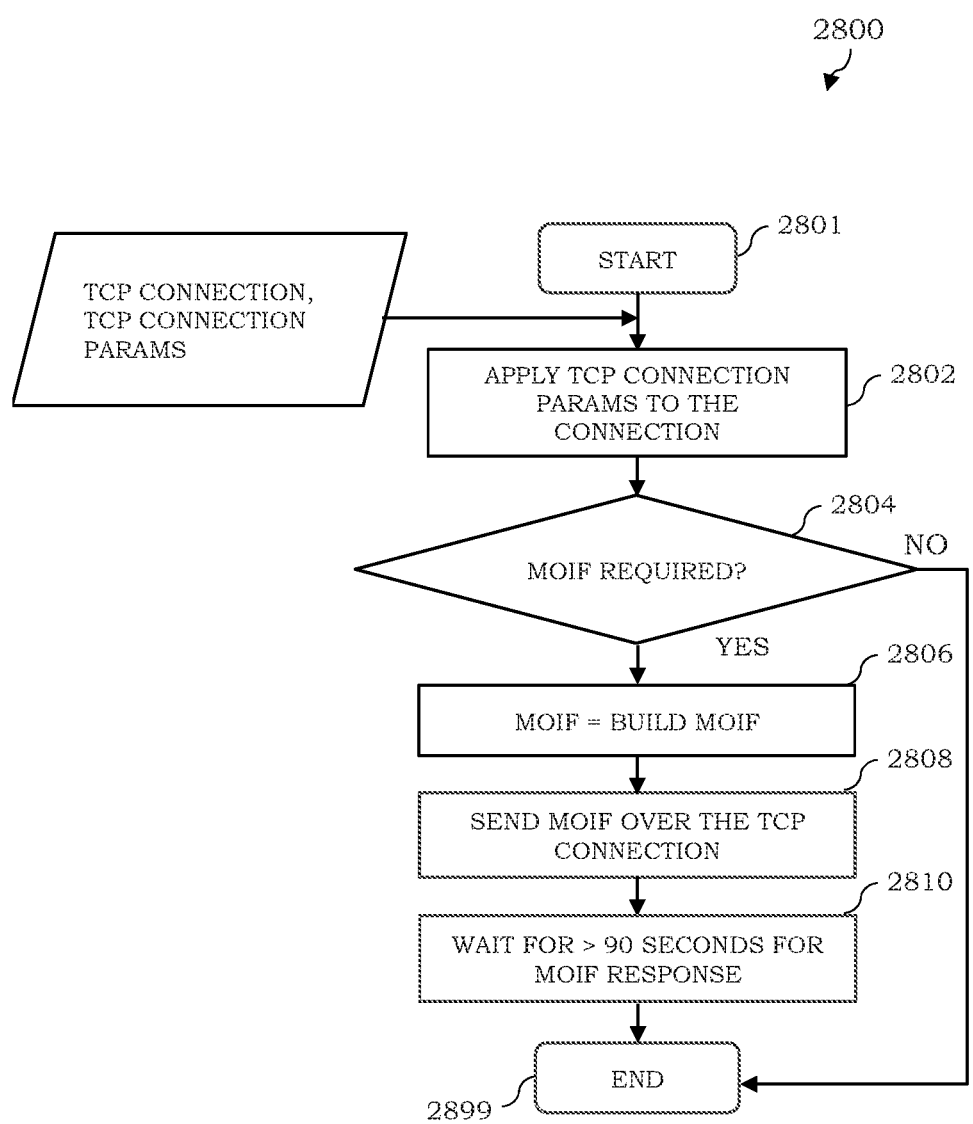
FIG. 28 depicts an example embodiment of a method for performing post connection follow-up for a TCP connection for MPLS-in-TCP.

FIG. 28 depicts an example embodiment of a method for performing post connection follow-up for a TCP connection for MPLS-in-TCP. It is noted that the method 2800 may be performed by the LSR that initiates the TCP connection. The method 2800 may be used to provide block 2712 of method 2700 of FIG. 27. The method 2800 may be based on the framework defined in FIG. 14. It will be appreciated that, although primarily presented as being performed serially, at least a portion of the blocks of method 2800 may be performed contemporaneously or in a different order than as presented in FIG. 28. The inputs to method 2800 include (1) a TCP connection that is operational and (2) TCP connection parameters for the TCP connection. At block 2801, the method 2800 begins. Block 2802 applies the input TCP connection parameters to the new connection and the method 2800 then proceeds to block 2804. Block 2804 checks if requirement of MOIF is configured in the LSR. If the requirement of MOIF is configured in the LSR, then the method 2800 proceeds to block 2806, otherwise the method 2800 proceeds to block 2899 where the method 2800 ends. Block 2806 builds a MOIF and fills the necessary fields. It is noted that block 2806 may be implemented by method 1500 of FIG. 15. From block 2806, the method 2800 proceeds to block 2808. Block 2808 sends the MOIF over the TCP connection and the method 2800 then proceeds to block 2810. Block 2810 waits for a MOIF response from peer LSR. It is noted that an implementation may wait for at least 90 seconds (or any other suitable length of time) for a MOIF response. In order to wait, the LSR may start a timer for a duration within which it expects a MOIF response and associate the timer with the transport connection (although it will be appreciated that other mechanisms are contemplated). From block 2810, the method 2800 proceeds to block 2899 where the method 2800 ends. At block 2899, the method 2800 ends.

Figure 29:
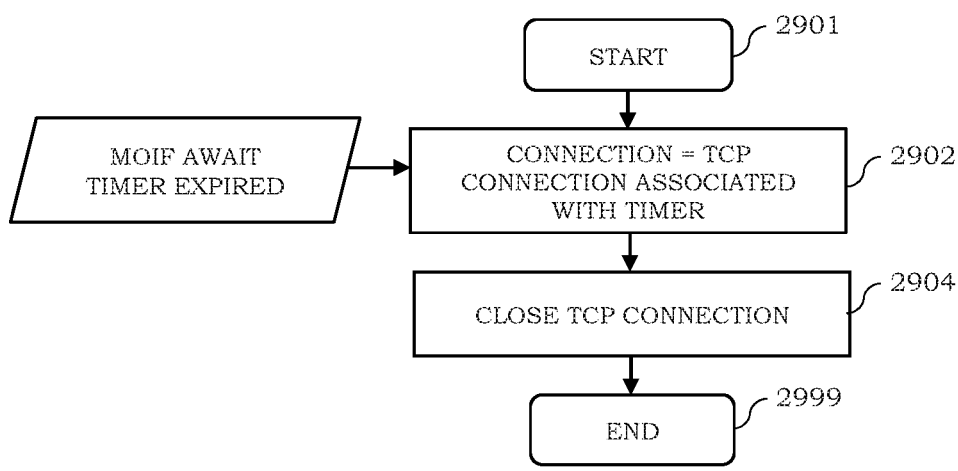
FIG. 29 depicts an example embodiment of a method for use when a MOIF response is not received within a predefined time period for a TCP connection.

FIG. 29 depicts an example embodiment of a method for use when a MOIF response is not received within a predefined time period for a TCP connection. It is noted that the situation in which an initiating LSR fails to receive a MOIF response within a predefined time period may be determined where the timeout set at block 2810 of FIG. 28 expires without the MOIF response being received. It is noted that the determination that a received packet on the TCP connection is a MOIF response may be performed as part of the general processing of FIG. 36. It is noted that, when the initiating LSR receives a MOIF response from the peer LSR, the initiating LSR may execute method 1700 of FIG. 17. It will be appreciated that, although primarily presented as being performed serially, at least a portion of the blocks of method 2900 may be performed contemporaneously or in a different order than as presented in FIG. 29. The input to method 2900 includes a notification that the MOIF await timer expired. At block 2901, the method 2900 begins. Block 2902 retrieves the TCP connection associated with the timer and the method 2900 then proceeds to block 2904. Block 2904 closes the TCP connection, and the method 2900 then proceeds to block 2999. At block 2999, the method 2900 ends.

Figure 30:
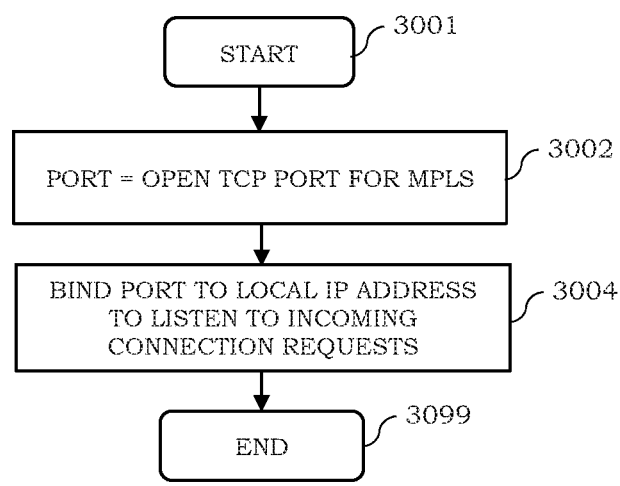
FIG. 30 depicts an example embodiment of a method for configuring a TCP connection listener.

FIG. 30 depicts an example embodiment of a method for configuring a TCP connection listener. It is noted that the method 3000 may be used by an LSR to listen to TCP connection requests for MPLS-in-TCP (e.g., listening for new TCP connection requests for MPLS as the user protocol). It is noted that MPLS-in-TCP connection listeners may be implemented by any LSRs that configure MPLS overlays. The method 3000 may be based on the generic method 1800 presented in FIG. 18. It will be appreciated that, although primarily presented as being performed serially, at least a portion of the blocks of method 3000 may be performed contemporaneously or in a different order than as presented in FIG. 30. At block 3001, the method 3000 begins. Block 3002 opens the TCP port for MPLS (e.g., 6637), and the method 3000 then proceeds to block 3004. Block 3004 binds the port to the local IP address in the LSR and then starts listening to incoming connection requests to the port on the address. From block 3004, the method 3000 proceeds to block 3099 where the method 3000 ends. At block 3099, the method 3000 ends.

Figure 31:
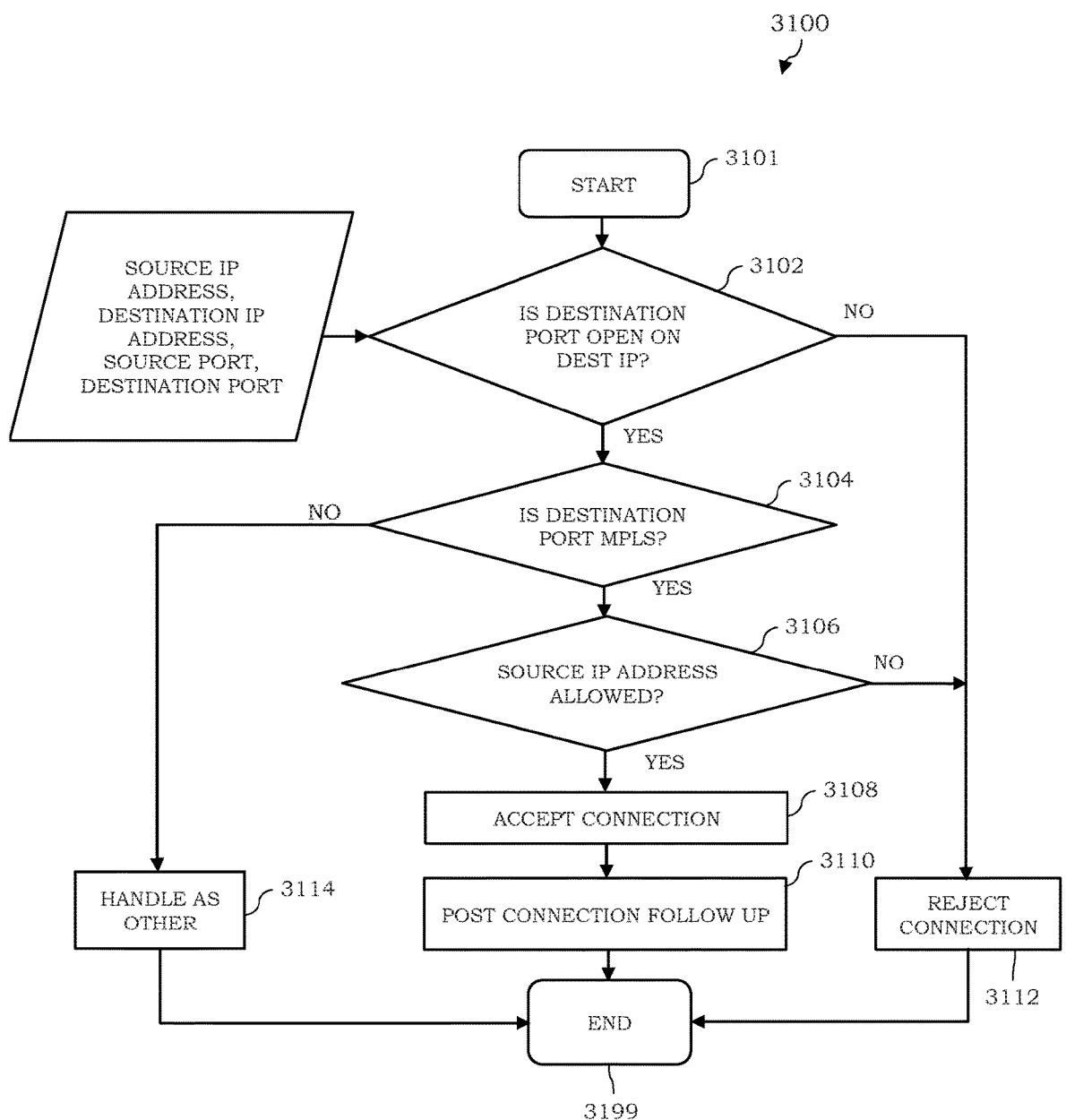
FIG. 31 depicts an example embodiment of a method for processing incoming TCP connection requests.

FIG. 31 depicts an example embodiment of a method for processing incoming TCP connection requests. It is noted that the incoming connection requests may be received on the TCP port for MPLS. The method 3100 may be based on the generic method 1900 presented in FIG. 19. It will be appreciated that, although primarily presented as being performed serially, at least a portion of the blocks of method 3100 may be performed contemporaneously or in a different order than as presented in FIG. 31. The inputs to method 3100 include the connection request with the following associated parameters: (1) source IP address, which is the IP address of the remote LSR that sent the connection request, (2) destination IP address, which is a local IP address of this LSR to which the connection request is sent, (3) source port, which is the TCP port at the remote LSR, and (4) destination port, which is the TCP port at this LSR to which the connection request is sent. At block 3101, the method 3100 begins. Block 3102 checks if the destination port is open in TCP in the LSR. If the destination port is not open, then the method 3100 proceeds to block 3112, otherwise the method 3100 proceeds to block 3104. Block 3112 rejects the connection using appropriate TCP mechanisms (e.g., a rejection notification to the remote LSR as per methods in TCP). From the block 3112, the method 3100 proceeds to block 3199 where the method 3100 ends. Block 3104 checks if the TCP destination port is MPLS (e.g., 6637). If the TCP destination port is not MPLS, then the method 3100 proceeds to block 3114, otherwise the method 3100 proceeds to block 3106. Block 3114 handles the connection request as per the type associated with the port, and the method 3100 then proceeds to block 3199 where the method 3100 ends. Block 3106 checks if a connection is allowed from the remote LSR (e.g., from the source IP address). It will be appreciated that various factors may be used to determine whether an LSR should allow an incoming connection. For example, the LSR may employ a method to discover all potential remote LSRs that may participate in MPLS overlays with the LSR. If a connection is not allowed from the remote LSR, then the method 3100 proceeds to block 3112, otherwise the method 3100 proceeds to block 3108. Block 3112 rejects the connection using appropriate TCP mechanisms (e.g., a rejection notification to remote LSR as per methods in TCP). From block 3112, the method 3100 proceeds to block 3199 where the method 3100 ends. Block 3108 accepts the TCP connection request, which means that the state for the TCP connection is created with the key as the tuple {Source IP Address, Destination IP Address, Source port, Destination port}, and the method 3100 then proceeds to block 3110. Block 3110 performs post-connection follow ups and then the method 3100 proceeds to block 3199 where the method 3100 ends. It is noted that block 3110 may be implemented by method 2000 of FIG. 20, which makes the LSR wait for the MOIF from the peer LSR, if configured to receive a MOIF. It is noted that determination of a received packet on the connection as MOIF is made as part of the general processing of MPLS overlay packets on the TCP connection (e.g., using the blocks 3602-3612 of the method 3600 of FIG. 36). It is noted that, if the LSR fails to receive a MOIF within a predefined time period (e.g., the timeout set at block 2004 in FIG. 20 expires), then the LSR may execute the method 2900 of FIG. 29 (i.e., handling is common in both initiating and receiving LSRs). It is noted that, when a MOIF is received from the peer LSR, then the LSR may execute the method 2100 of FIG. 21.

It will be appreciated that, although primarily presented with respect to example embodiments in which an LSR accepts and establishes TCP connections by listening for new TCP connection requests using a well-known TCP port for MPLS (e.g., 6637 or other suitable port), an LSR also may accept and establish a TCP connection to a TCP port number other than a well-known TCP port for MPLS (e.g., a port number configured by the network administrator for MPLS).

It is noted that simultaneous TCP connection establishment may be supported. If the two peering LSRs send simultaneous TCP connection requests to each other, then two TCP connections are formed. Here, the connection setup proceeds on both connections, thereby resulting in the formation of two TCP tunnels between the LSRs.

Figure 32A:
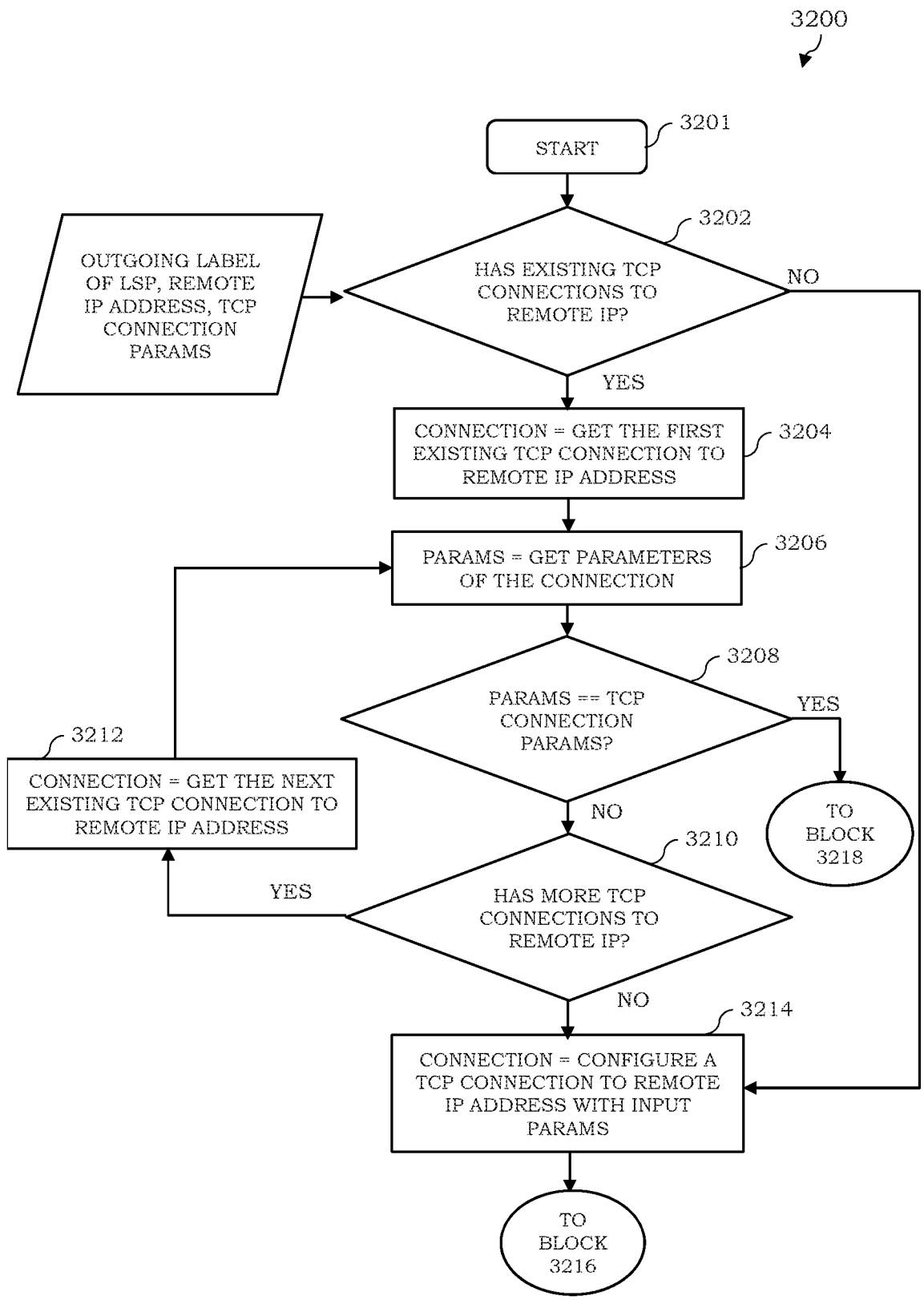
FIGS. 32A-32B depict an example embodiment of a method for configuring an MPLS overlay over a TCP connection to form an MPLS-in-TCP overlay.
Figure 32B:
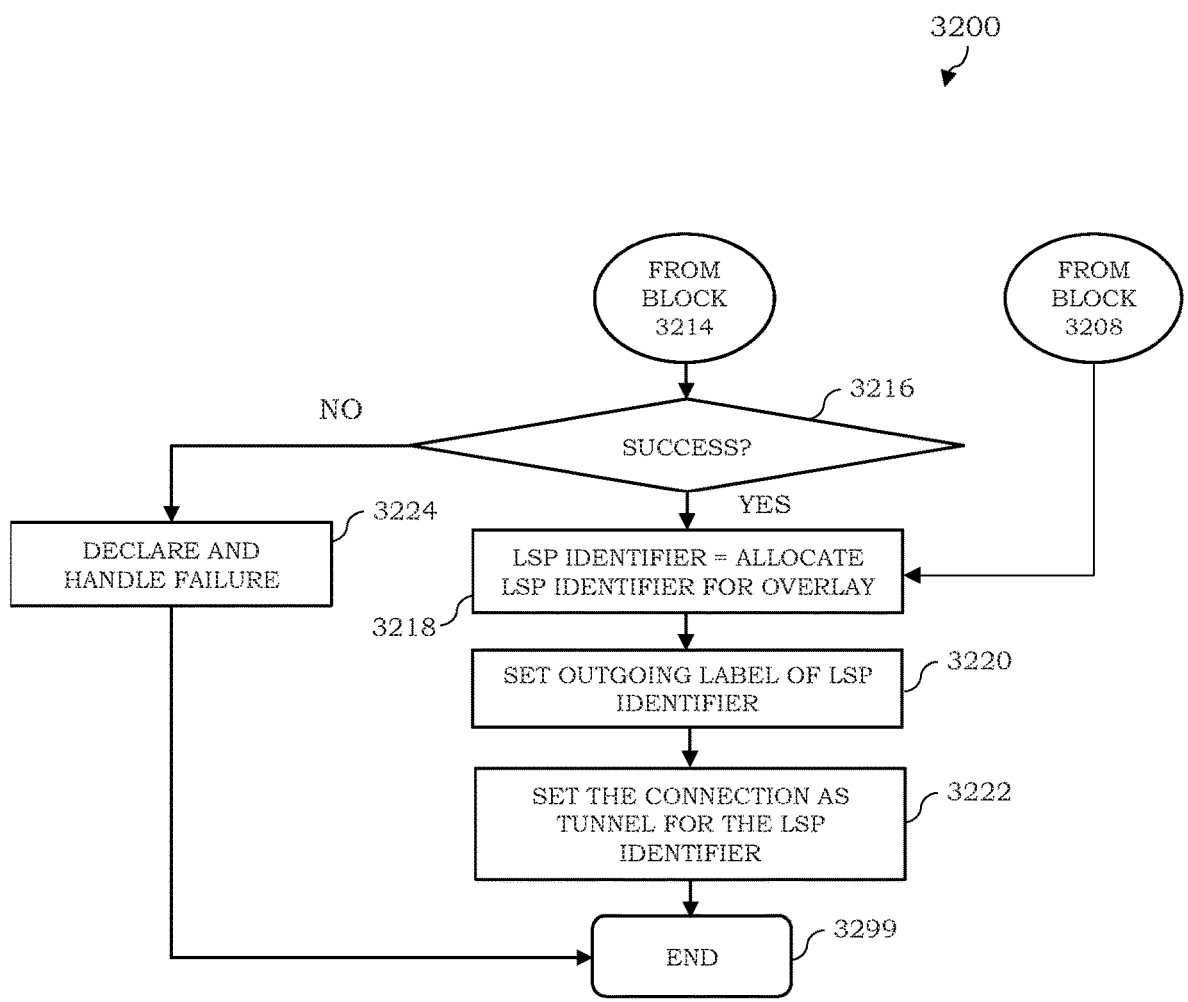

FIGS. 32A-32B depict an example embodiment of a method for configuring an MPLS overlay over a TCP connection to form an MPLS-in-TCP overlay. It is noted that, when an LSR is going to set up an MPLS-in-TCP overlay to a remote LSR, it determines the IP address of the remote LSR to which the TCP connection is to be made and then determines TCP connection parameters and QoS information for the TCP connection. The method 3200 may be based on the generic method 2200 presented in FIGS. 22A-22B. It will be appreciated that, although primarily presented as being performed serially, at least a portion of the blocks of method 3200 may be performed contemporaneously or in a different order than as presented in FIG. 32. The inputs to method 3200 include the outgoing MPLS label of the LSP/overlay, an IP address of the remote LSR of the LSP/overlay, and TCP connection parameters as needed by the overlay. At block 3201, the method 3200 begins. Block 3202 checks if there are existing TCP connections to the remote LSR set up for MPLS overlays. If no existing TCP connections to the remote LSR are set up for MPLS overlays, then the method 3200 proceeds to block 3214, otherwise the method 3200 proceeds to block 3204. Block 3204 gets the TCP connection to the remote LSR, which is set up for MPLS overlays, and the method 3200 then proceeds to block 3206. Block 3206 retrieves the TCP connection parameters of the TCP connection, and the method 3200 then proceeds to block 3208. Block 3208 checks if the parameters requested by the overlay match the parameters of the TCP connection. If the parameters requested by the overlay match the parameters of the TCP connection, then the method 3200 proceeds to block 3218, otherwise the method 3200 proceeds to block 3210. Block 3210 checks if there are more existing TCP connections to the remote LSR for MPLS overlays. If there are more TCP connections then the method 3200 proceeds to block 3212, otherwise the method 3200 proceeds to block 3214. Block 3212 gets the next TCP connection to the remote LSR that has been set up for MPLS overlays, and the method 3200 then returns to block 3206 to repeat subsequent blocks for the next TCP connection. Block 3214 is reached when a new TCP connection is required. Block 3214 configures a new TCP connection to the remote LSR, to be used for MPLS overlays. The TCP connection is configured with the input TCP connection parameters. Block 3214 is implemented by the method in FIG. 27. Then it proceeds to block 3216. Block 3216 checks if the TCP connection has been set up successfully. If the TCP connection has not been successfully set up, then the method 3200 proceeds to block 3224, otherwise the method 3200 proceeds to block 3218. Block 3224 declares and handles the failure to configure the MPLS overlay. Block 3218 allocates an LSP identifier to uniquely identify the MPLS overlay in the LSR. The LSP identifier binds the TCP connection, the outgoing label(s), and the other parameters associated with the MPLS overlay. From block 3218, the method 3200 proceeds to block 3220. Block 3220 sets the outgoing MPLS label of the LSP/overlay as the outgoing label of the LSP identifier, and the method 3200 then proceeds to block 3222. Block 3222 sets the TCP connection as the tunnel associated with the LSP identifier, and the method 3200 then proceeds to block 3299 where the method 3200 ends. At block 3299, the method 3200 ends.

Figure 33:
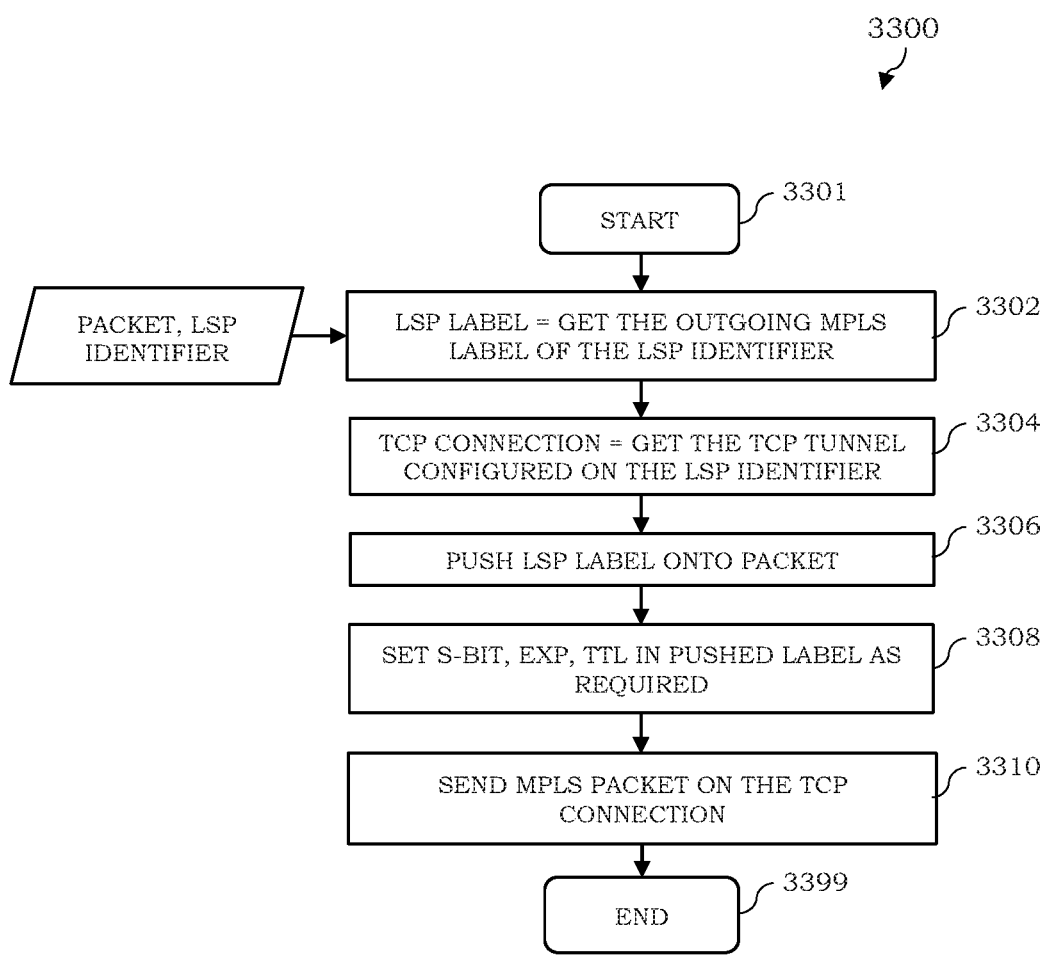
FIG. 33 depicts an example embodiment of a method for transmitting a packet on MPLS-in-TCP.

FIG. 33 depicts an example embodiment of a method for transmitting a packet on MPLS-in-TCP. The method 3300 may be based on the generic method 2300 presented in FIG. 23 (except that block 2310 may not be implemented as there are no dynamic parameters for the TCP headers in MPLS-in-TCP packets). It will be appreciated that, although primarily presented as being performed serially, at least a portion of the blocks of method 3300 may be performed contemporaneously or in a different order than as presented in FIG. 33. The inputs to method 3300 include the packet to be transmitted and the LSP identifier that identifies the LSP or the MPLS overlay. At block 3301, the method 3300 begins. Block 3302 retrieves the state of the outgoing label of the LSP by the LSP identifier, and the method 3300 then proceeds to block 3304. Block 3304 gets the TCP tunnel configured for the LSP identifier, which is the reliable transport layer connection, and the method 3300 then proceeds to block 3306. Block 3306 pushes the outgoing label of the LSP onto the packet, and the method 3300 then proceeds to block 3308. Block 3308 sets the S-bit, EXP, and TTL fields in the pushed label as required for the packet. For example, if the packet already had another label before pushing the outgoing label of the LSP, then the S-bit is set to 0, otherwise the S-bit is set to 1. The TTL and EXP values may be set by a policy configured for the LSP. For example, if the policy says to use a consistent EXP value for all packets on the LSP, then the configured EXP value is set. If the policy has mapping of the EXP values based on the certain fields in the native header of the packet then the mapped EXP value is set. From block 3308, the method 3300 proceeds to block 3310. Block 3310 sends the MPLS packet on the TCP connection. After block 3310, the method terminates.

Figure 34:
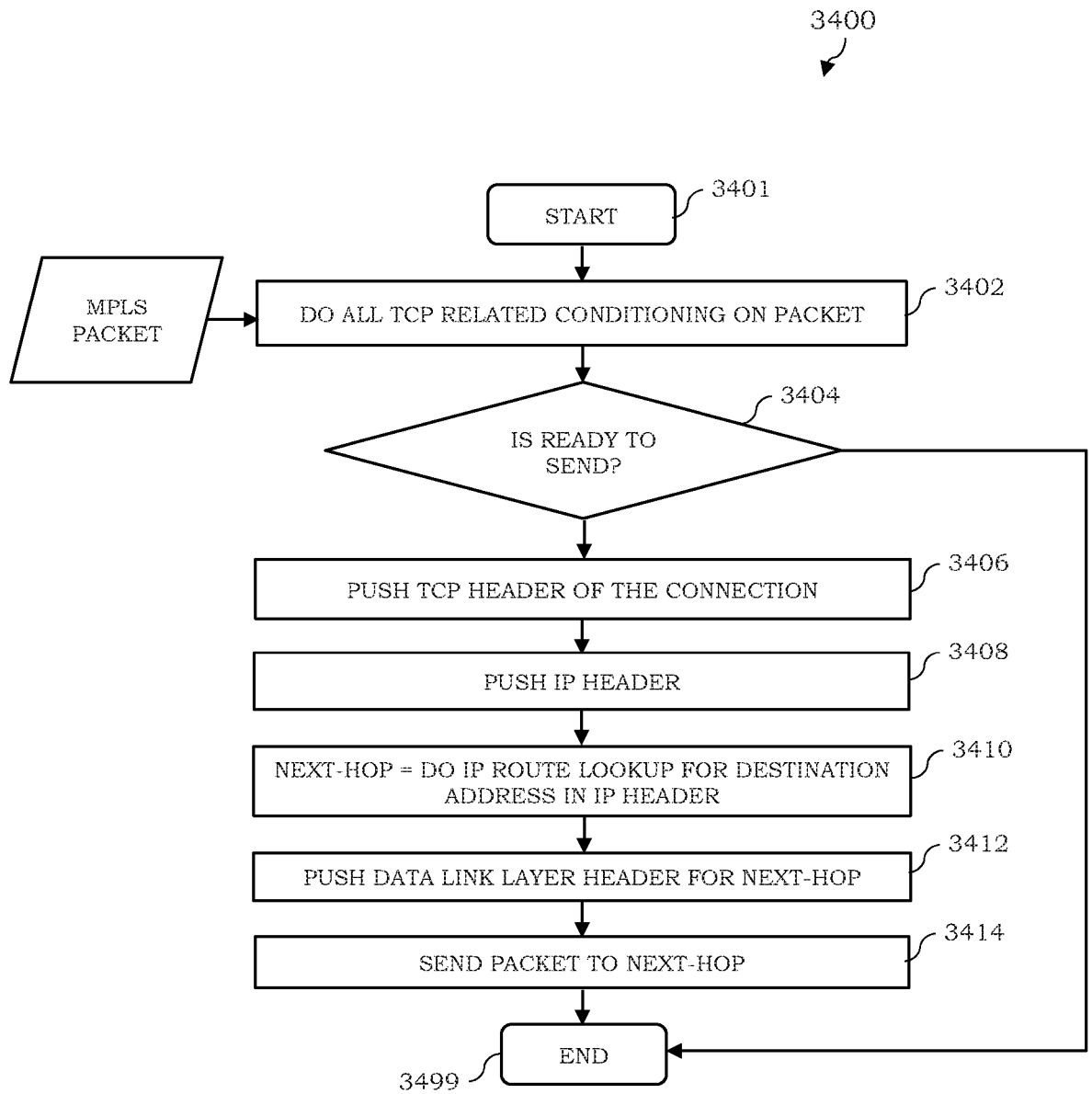
FIG. 34 depicts an example embodiment of a method for transmitting an MPLS packet on a TCP connection.

FIG. 34 depicts an example embodiment of a method for transmitting an MPLS packet on a TCP connection. The method 3400 may be used to provide block 3310 of method 3300 of FIG. 33 and may be based on the generic method 2400 presented in FIG. 24 (except that there are no dynamic parameters for the TCP headers). It will be appreciated that, although primarily presented as being performed serially, at least a portion of the blocks of method 3400 may be performed contemporaneously or in a different order than as presented in FIG. 34. The input to method 3400 includes the MPLS packet to be transmitted. At block 3401, the method 3400 begins. Block 3402 conditions the MPLS packet, which means the TCP layer prepares the packet as per the connection status (e.g., segregating the packet into multiple segments if the packet needs to be segmented further, applying congestion control and/or flow control on segments as necessary, or the like, as well as various combinations thereof). From block 3402, the method 3400 proceeds to block 3404. Block 3404 checks if the one or more TCP segments of the packet are ready to be sent. For example, the TCP segments may not be ready to be sent due to congestion, flow control, or the like. If the TCP segments are not ready to be sent, then the TCP segments will be sent later when the congestion is cleared and the method 3400 proceeds to block 3499 where the method 3400 ends. If the TCP segments are ready to be sent, then the method 3400 proceeds to block 3406. Block 3406 pushes the TCP header to the segment(s). The Source Port and Destination Port fields in the TCP header are filled as per the connection parameters. From block 3406, the method 3400 then proceeds to block 3408. Block 3408 pushes the IP header onto the packet. The source and destination addresses in the IP header are filled as per the local and remote IP addresses of the TCP connection (the addresses are provided by block 3406). The protocol field (if IPv4 Header) or the next header field (if IPv6 Header) is set to a value (e.g., 6 or other suitable value) to indicate the payload as TCP. From block 3408, the method 3400 proceeds to block 3410. Block 3410 performs IP route table lookup for the destination address in the IP Header, which results in the next-hop for the packet, and the method 3410 then proceeds to block 3412. Block 3412 pushes the data link layer header onto the packet, which is required to send the packet on the link to the next-hop, and the method 3400 then proceeds to block 3414.

Block 3414 sends the packet on the wire to the next-hop, and the method 3400 then proceeds to block 3499 where the method 3400 ends.

Figure 35:
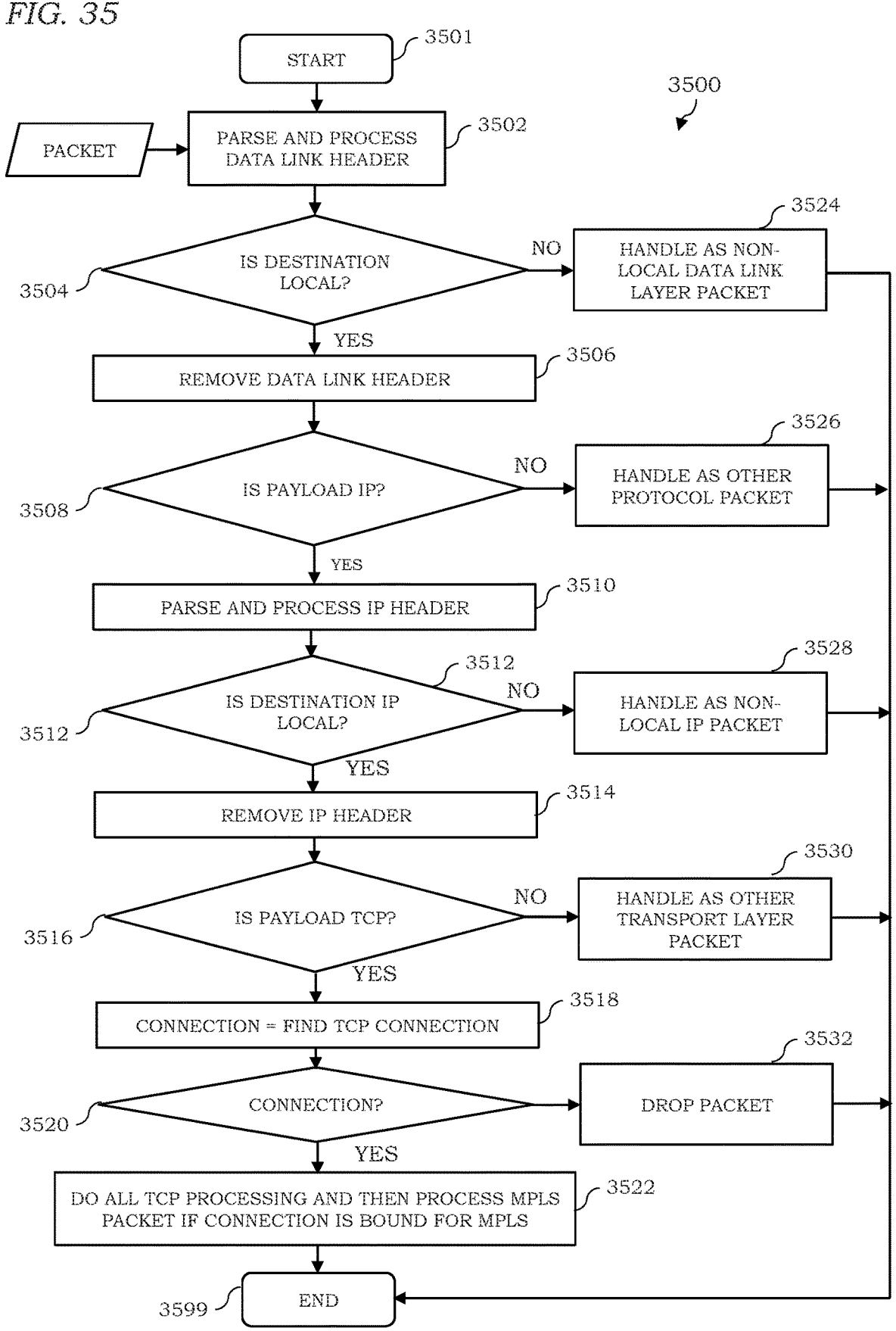
FIG. 35 depicts an example embodiment of a method for receiving and processing of MPLS-in-TCP packets.

FIG. 35 depicts an example embodiment of a method for receiving and processing of MPLS-in-TCP packets. It will be appreciated that, although primarily presented as being performed serially, at least a portion of the blocks of method 3500 may be performed contemporaneously or in a different order than as presented in FIG. 35. The input to method 3500 includes the MPLS-in-TCP packet that is received on the wire.

At block 3501, the method 3500 begins.

Block 3502 parses and processes the data link header at the top of the packet, and the method 3500 then proceeds to block 3504.

Block 3504 checks if the data link layer indicates the packet to be local, meaning that this LSR that is executing the method 3500 is the termination point of the data link on which the packet arrived. For example, if the data link header is an Ethernet header and if the destination MAC address in the Ethernet header is local to the LSR, then the Ethernet link terminates on the LSR. If the packet is local at the data link layer then the method 3500 proceeds to block 3506, otherwise the method 3500 proceeds to block 3524. Block 3524 performs required handling of the packet at the data link layer as a non-local packet, which may result in forwarding of the packet further at the data link layer, and the method 3500 then proceeds to block 3599 where the method 3500 ends.

Block 3506 removes the data link header from the packet as the LSR is the end of the data link, and the method 3500 proceeds to block 3508. Block 3508 checks if the payload indicated by the data link header is IP. For example, if data link header is an Ethernet header, then its Ethertype field indicates the payload type. If the Ethernet header has VLAN tags, then the Ethertype field in the last VLAN tag indicates the payload type. If the payload is IP, then the method 3500 proceeds to block 3510, otherwise the method 3500 proceeds to block 3526. Block 3526 handles the packet as a non-IP packet and the method 3500 then proceeds to block 3599 where the method 3500 ends.

Block 3510 processes the IP packet in the IP layer based on its IP header. For example, the destination address of the IP header is looked up in an IP route table to make a forwarding decision on the IP packet. From block 3510, the method 3500 proceeds to block 3512. Block 3512 checks if the destination address is local (e.g., if the IP route table lookup matched the destination address as a locally configured IP address in LSR). If the destination address is not local, then the method 3500 proceeds to block 3528, otherwise the method 3500 proceeds to block 3514. Block 3528 handles the packet as a non-local IP packet, such as by forwarding the packet to the next-hop associated with the matching route entry from the IP route table lookup, and the method 3500 then proceeds to block 3599 where the method 3500 ends.

Block 3514 removes the IP header from the IP packet, as it is a local packet, and the method 3500 then proceeds to block 3516. Block 3516 checks if the packet is a TCP segment (e.g., if the IP header was IPv4 then it checks if the protocol field in the IPv4 header was set to 6 (TCP) or if the IP header was IPv6 then it checks if the next-header field in the IPv6 header was set to 6 (TCP)). If the packet is not a TCP segment, then the method 3500 proceeds to block 3530, otherwise the method 3500 proceeds to block 3518. Block 3530 handles the packet for the respective IP protocol type and the method 3500 then proceeds to block 3599 where the method 3500 ends.

Block 3518 finds the TCP connection associated with the TCP segment based on source and destination IP addresses in the IP header (e.g., the addresses were passed along the flow since the removal of the IP header in block 3514) and source and destination ports in the TCP header. From block 3518, the method 3500 proceeds to block 3520. Block 3520 checks if a matching TCP connection is found. If no matching TCP connection is found, then the method 3500 proceeds to block 3532, otherwise the method 3500 proceeds to block 3522. Block 3532 drops the packet as an erroneous packet and the method 3500 then proceeds to block 3599 where the method 3500 ends.

Block 3522 performs TCP layer processing on the TCP segment and, if the TCP connection is bound to MPLS, processes MPLS packets from the byte stream received in the connection. From block 3522, the method 3500 proceeds to block 3599, where the method 3500 ends.

At block 3599, the method 3500 ends.

Figure 36:
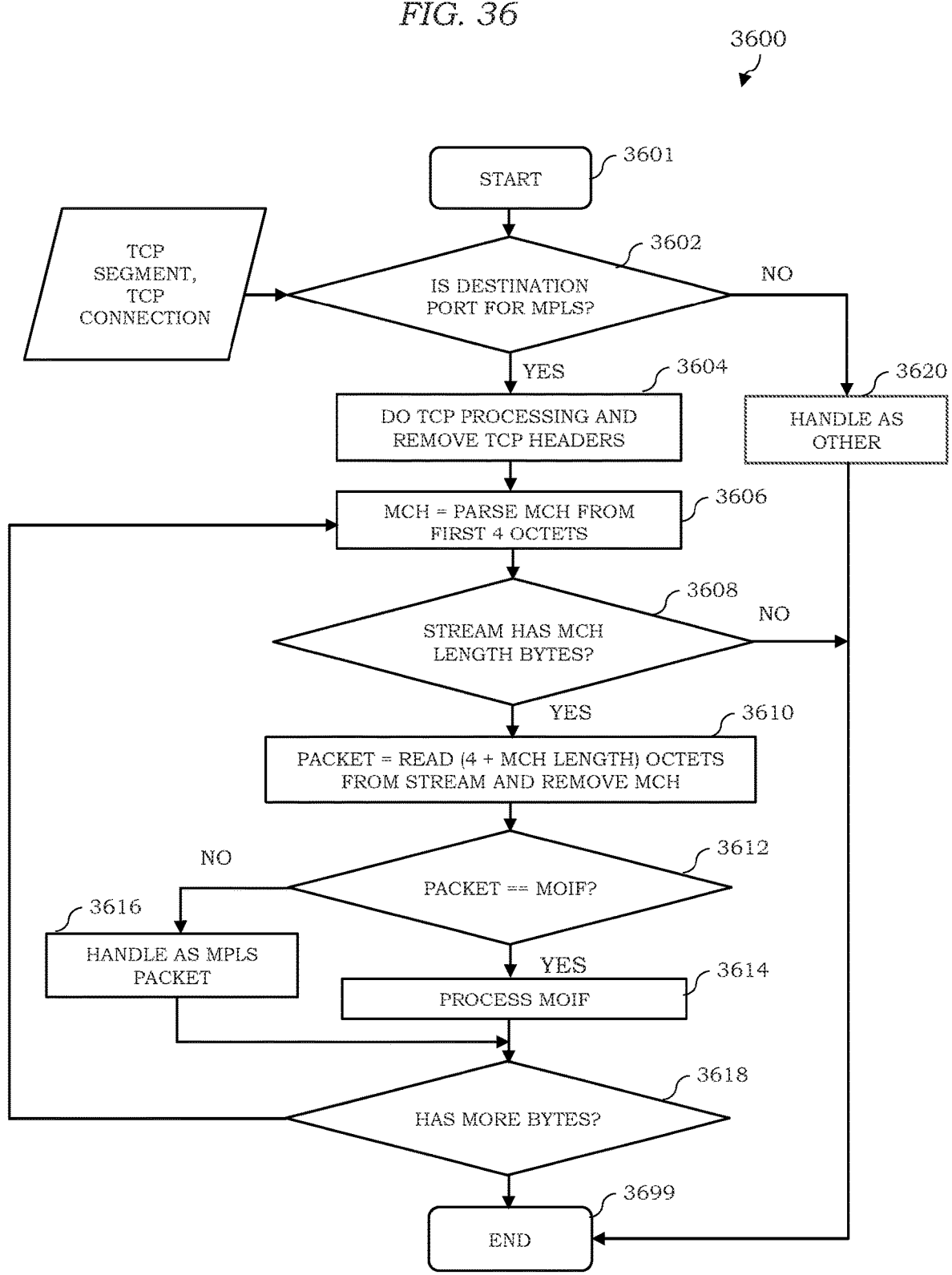
FIG. 36 depicts an example embodiment of a method for processing of MPLS-in-TCP packets from a TCP segment of a TCP connection.

FIG. 36 depicts an example embodiment of a method for processing of MPLS-in-TCP packets from a TCP segment of a TCP connection. The method 3600 may be used to provide block 3522 of method 3500 of FIG. 35 and may be based on the generic method 2500 presented in FIG. 25. It will be appreciated that, although primarily presented as being performed serially, at least a portion of the blocks of method 3600 may be performed contemporaneously or in a different order than as presented in FIG. 36. The inputs to the method 3600 include the TCP segment received on the TCP connection and an indication of the TCP connection. It is noted that the TCP segment received on the TCP connection may be received by the TCP layer of the LSR with the TCP header at the top. It is noted that TCP is a stream-byte oriented protocol, so the bytes of a whole packet may not arrive together in the connection (i.e., chunks of the packet may arrive on multiple TCP segments). It is noted that the TCP Connection may be indicated by the tuple {Source IP Address in IP Header, Destination IP Address in IP Header, Source Port in TCP Header, Destination Port in TCP Header}. At block 3601, the method 3600 begins. Block 3602 checks if the Destination port of the TCP connection is bound to MPLS. If the destination port of the TCP connection is not bound to MPLS then the method 3600 proceeds to block 3620, otherwise the method 3600 proceeds to block 3604. Block 3620 handles the TCP segment for non-MPLS applications, and the method 3600 then proceeds to block 3699 where the method 3600 ends. Block 3604 performs TCP-related processing on the TCP segment. For example, if this is not the next TCP segment expected by the connection, then the TCP segment may be queued internally until all of the preceding TCP segments are received and processed, acknowledgements may be sent for the processed TCP segments, and so forth. Here, for simplicity, it is assumed that the input TCP segment is the next segment expected by the connection, the TCP header is removed from the TCP segment, and the payload of the TCP segment is appended to the received byte stream. From block 3604, the method 3600 proceeds to block 3606. Block 3606 parses the first 4 octet of the received stream as MCH, and the method 3600 then proceeds to block 3608. Block 3608 checks if the received stream at least has the number of octets specified in the length field in the MCH (e.g., at least has the whole of the next MPLS packet). If the stream does not have e whole packet then the method 3600 proceeds to block 3699 where the method 3600 ends, otherwise the method 3600 proceeds to block 3610. Block 3610 pulls from the received stream the number of octets specified in the length field of the MCH plus 4 octets, that constitutes the MPLS packet encapsulated by MCH, and then removes the MCH to generate the MPLS packet. From block 3610, the method 3600 proceeds to block 3612. Block 3612 checks if the packet is MOIF. If the packet is MOIF, then the method 3600 proceeds to block 3614, otherwise the method 3600 proceeds to block 3616. Block 3616 handles the packet as an MPLS packet and the method 3600 then proceeds to block 3618. It is noted that if the LSR was the initiator of the connection then the block 3614 may implemented by the method 1700 of FIG. 17, otherwise the method 3614 may be implemented by the method 2100 of FIG. 21. From block 3614, the method 3600 proceeds to block 3618. Block 3618 checks if there are more bytes to read in the TCP segment. If there are more bytes to read in the TCP segment, then the method 3600 returns to block 3606 to process the next MPLS packet in its payload, otherwise the method 3600 proceeds to block 3699 where the method 3600 terminates.

It is noted that whether the top label of the encapsulated MPLS packet is downstream-assigned or upstream-assigned may be determined according to various criteria. For example, if the tunnel destination IP address is a unicast address, the top label may be downstream-assigned. For example, if the tunnel destination IP address is an IP multicast address, either all encapsulated MPLS packets in the particular tunnel have a downstream-assigned label at the top of the stack or all encapsulated MPLS packets in the particular tunnel have an upstream-assigned label at the top of the stack. The means by which this is determined for a particular tunnel may be performed in various ways. In the absence of any knowledge about a specific tunnel, the label may be presumed to be upstream-assigned.

It is noted that intermediate routers, upon receiving TCP encapsulated packets, may balance these packets based on the hash of the five-tuple (i.e., source IP address, destination IP address, source port, destination port, and protocol) of TCP packets. It is noted that, since the MPLS overlays multiplexed on a TCP tunnel share the same five-tuple, packets across the overlays generally cannot be load balanced. If load balancing is desirable among MPLS overlays, then multi-path TCP (MP-TCP) may be used as the reliable transport layer.

It is noted that, in order to provide efficient exchange of MPLS-in-TCP packets, certain TCP Connection parameters may be used (e.g., the TCP Selective Acknowledgement (SACK) Option, the TCP Window Scale Option, the Protection Against Wrapped Sequence Numbers (PAWS) capability, the TCP NODELAY option, or the like, as well as various combinations thereof). The Selective Acknowledgement option allows the receiver to acknowledge multiple lost packets in a single ACK, thereby enabling faster recovery. An LSR MAY negotiate use of TCP SACK on a TCP connection for MPLS and use it for faster recovery from lost packets and holes in the TCP sequence number space. The TCP Window Scale option allows TCP window sizes larger than 16-bit limits to be advertised by the receiver. It is necessary to allow data in long fat networks to fill the available pipe. This also implies buffering on the TCP sender that matches the (bandwidth*delay) product of the TCP Connection. An LSR uses locally available mechanisms to set a window size that matches the available local buffer resources and the desired throughput. The PAWS capability may be used to ensure that TCP sequence numbers do not wrap within a timeout window. The TCP NODELAY option may be used to disable the Nagle Algorithm. It will be appreciated that various other TCP Connection parameters may be used to provide efficient exchange of MPLS-in-TCP packets.

Various example embodiments are configured to use SCTP as the reliable transport layer for tunneling of MPLS overlay packets. This provides an implementation of the reliable MPLS overlay as MPLS-in-SCTP. In general, SCTP is a computer networking communications protocol, standardized by the IETF, which operates at the transport layer and serves a role similar to TCP. It will be appreciated that SCTP may be characterized as message-oriented, meaning that it transports a sequence of messages (each being a group of bytes), rather than transporting an unbroken stream of bytes as does by TCP. In SCTP, as in UDP, a sender sends a message in one operation, and that exact message is passed to the receiving application process in one operation. In contrast, TCP is a stream-oriented protocol, transporting streams of bytes reliably and in order. SCTP applications submit their data to be transmitted in messages (groups of bytes) to the SCTP transport layer. SCTP places messages and control information into separate chunks (data chunks and control chunks), each identified by a chunk header. SCTP can fragment a message into a number of data chunks, but each data chunk includes data from only one message. SCTP bundles the chunks into SCTP packets. The SCTP packet, which is submitted to the IP layer, includes a packet header, SCTP control chunks (when necessary), followed by SCTP data chunks (when available). In SCTP, a connection between two endpoints is referred to as an "association", so this standard terminology is used herein. The term "stream" in SCTP refers to the capability of SCTP to transmit several independent streams of the application in parallel (e.g., transmitting web page images together with the web page text). In essence, the multi-streaming capability of SCTP involves bundling several independent data streams within an application into a single SCTP connection. Independent streams of chunks can be bundled together in a single SCTP message where the payload of a stream can be packed into on one or more data chunks in the message and where each data chunk is encoded with a Stream Identifier based on which the stream of its payload is identified. It is further noted that, in SCTP, an endpoint can use multiple IP addresses, which enables spraying of SCTP packets across multiple available paths between the endpoints. When SCTP is used for tunneling MPLS overlay packets then the endpoints are LSRs.

Figure 37:
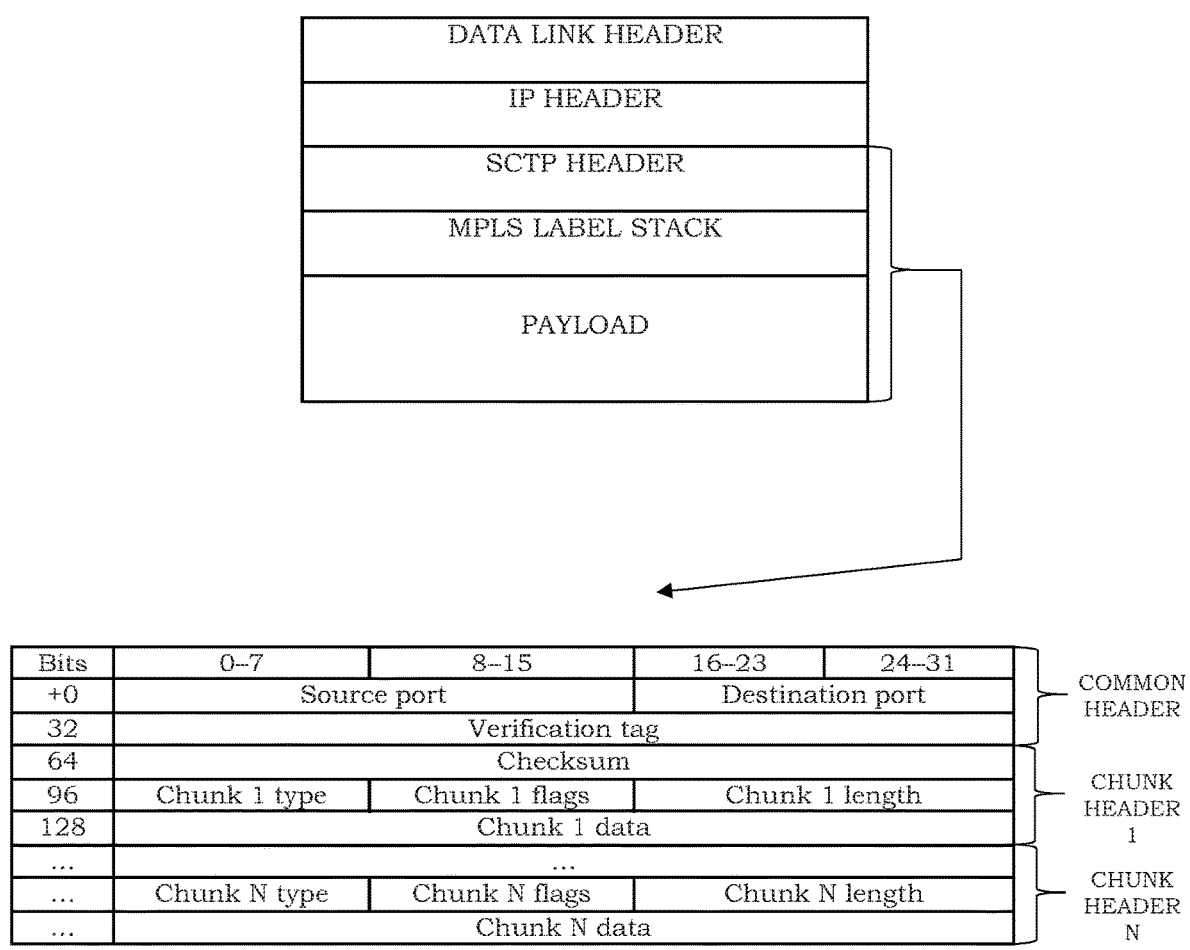
FIG. 37 depicts an example embodiment of an MPLS-in-SCTP encapsulation format for implementation of a reliable MPLS overlay as MPLS-in-SCTP.

FIG. 37 depicts an example embodiment of an MPLS-in-SCTP encapsulation format for implementation of a reliable MPLS overlay as MPLS-in-SCTP.

The MPLS-in-SCTP encapsulation format 3700 includes a payload, an MPLS label stack on top of the payload, an SCTP header on top of the MPLS label stack, an IP header on top of the SCTP header, and a data link header on top of the IP header. It is noted that, since SCTP is a datagram-oriented protocol, there is no need to encapsulate MPLS payloads by MCH so MCH is not part of the stack of the MPLS-in-SCTP encapsulation format 3700. The SCTP header is the header for the SCTP association used by the MPLS overlay as a tunnel. It is noted that, in FIG. 37, the SCTP packet is described in conceptual form only. There is no single SCTP Header, rather there are several SCTP specific headers interspersed within the SCTP packet. In FIG. 37, the payload, the MPLS label stack, and the SCTP header make up the "SCTP Packet" for reliable tunneling of MPLS packets.

In general, a SCTP packet includes two basic sections: the Common Header (which occupies the first 12 bytes) and a stack of chunks (which occupy the remaining portion of the packet). The Common Header includes a Source Port field, a Destination Port field, a Verification Tag field, and a Checksum field. The Source Port is the port number of the sender which is used by the receiver in combination with the source IP address to identify the SCTP association to which this SCTP packet belongs. The Destination Port is the port number of the receiver to de-multiplex the STCP packet to the correct application of SCTP (i.e., the upper layer of SCTP). The Verification Tag is negotiated between the peers during the set-up of SCTP association to validate the sender of the packet. The Checksum uses the CRC32 algorithm on the SCTP packet for data integrity. Each chunk starts with a Chunk Header that includes a one-byte type identifier (with 15 chunk types defined for SCTP, and at least 5 more defined by additional extensions), eight flag bits, and a two-byte length field, and the data compose the remainder of the chunk. The chunk types can be broadly classified into Control Chunks and Data Chunks, and header formats for the Control Chunks and the Data Chunks are presented in FIG. 38 and FIG. 39, respectively.

Figure 38:
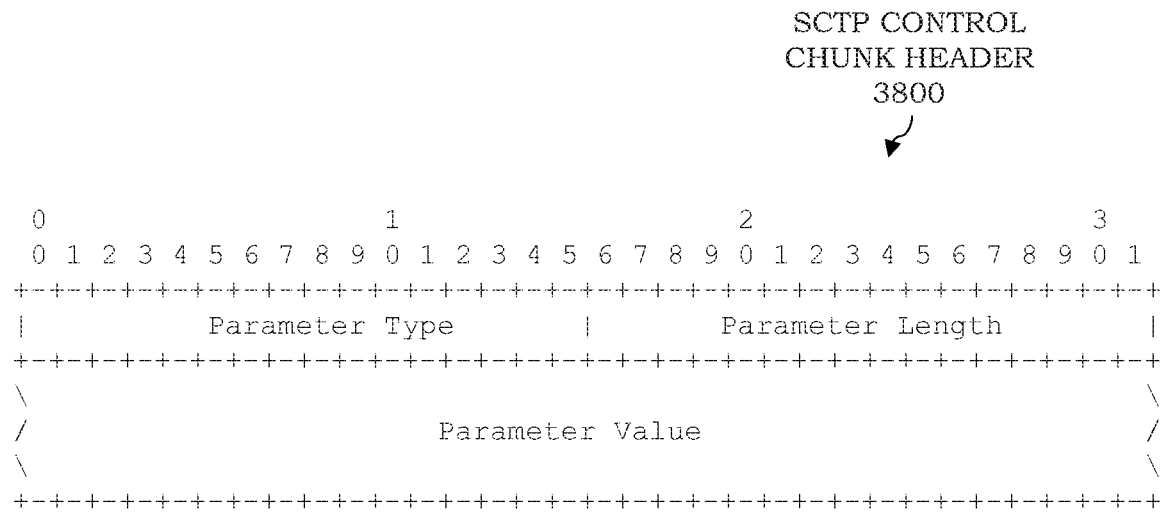
FIG. 38 depicts an example embodiment of an SCTP Control Chunk Header for an SCTP packet.

FIG. 38 depicts an example embodiment of an SCTP Control Chunk Header for an SCTP packet. The SCTP Control Chunk Header 3800 carries the control information related to the SCTP packet and it follows a TLV (Type Length Value) format. The Parameter Type field indicates the type of control information and, accordingly, lengths and values are specified in the SCTP specification.

Figure 39:
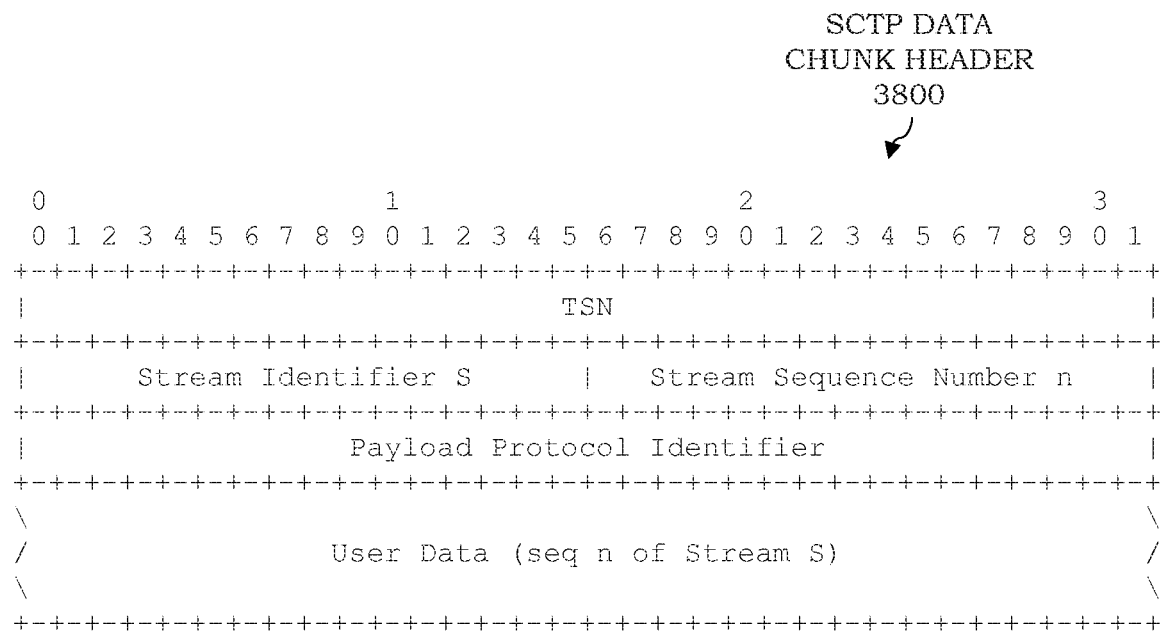
FIG. 39 depicts an example embodiment of an SCTP Data Chunk Header for an SCTP packet.

FIG. 39 depicts an example embodiment of an SCTP Data Chunk Header for an SCTP packet. The SCTP Data Chunk Header carries the actual data from the application (upper layer) that uses the SCTP. The ability to carry multiple chunks in a single SCTP packet enables multiplexing of multiple streams within the user application. The payload from a stream can be sent in one or more chunks in an SCTP packet. The Stream Identifier field in the Data Chunk Header is used to demultiplex the data chunks in an SCTP packet to the streams in the user application.

It is noted that various aspects of SCTP may be configured to support reliable delivery tunneling of MPLS packets on SCTP.

The destination port field in the Common Header includes a novel port number to indicate that the SCTP tunnel payload is an MPLS packet. For example, the value 6640 may be used to indicate that the payload of the SCTP tunnel is an MPLS packet, although it will be appreciated that any other suitable available value may be used). It is noted that the value that is ultimately used to indicate that the payload of the SCTP tunnel is an MPLS packet may be reserved in the Name and Transport Protocol Port Number Registry maintained by IANA. It is noted that, if a standardized value is not used, a port number in SCTP may be administratively configured across the LSRs participating in MPLS overlays to indicate that the payload is an MPLS packet).

The MPLS overlay over an SCTP association may be assigned a unique stream identifier (ID) by an LSR. In that case, an MPLS overlay packet may be sent as an independent data chunk within an SCTP packet. This means that packets from multiple MPLS overlays can be multiplexed on a single SCTP packet. Since the MPLS overlays are independent of each other, configuring each overlay as an independent stream also eliminates head-of-the-line (HOL) blocking among overlays that share the SCTP association.

The Stream ID space may be local to the LSR, so each LSR can independently allocate an unused Stream ID from its local space. The LSR that sends an MPLS overlay packet over the SCTP association uses its assigned Stream ID in corresponding data chunks in the SCTP packet. For a receiving LSR, there is no correlation between the Stream ID of a received data chunk to corresponding MPLS overlay since the LSR identifies the overlay based on the MPLS Label Stack of the MPLS packet in the payload of data chunk. The Stream ID value 0 will not be used to transport MPLS packets for an MPLS overlay and may be reserved by both LSRs for bulk management of the MPLS overlays multiplexed on the SCTP association. One usage of bulk management is the MOIF, which will be sent in a data chunk with Stream ID 0.

It is noted that various other aspects of SCTP may be configured to support reliable delivery tunneling of MPLS packets on SCTP.

Figure 40:
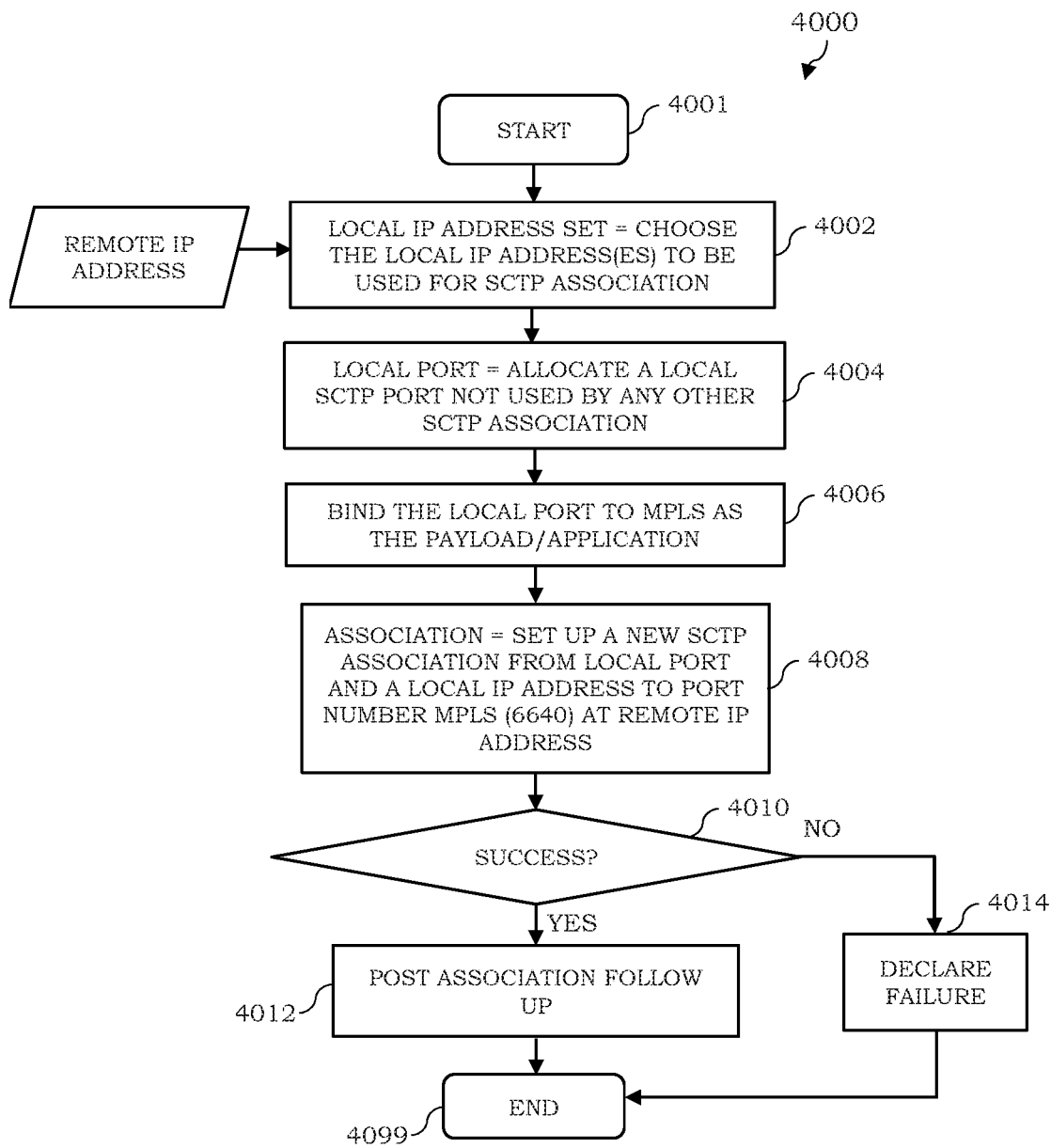
FIG. 40 depicts an example embodiment of a method for configuring an SCTP association for MPLS-in-SCTP.

FIG. 40 depicts an example embodiment of a method for configuring an SCTP association for MPLS-in-SCTP. The method 4000 may be based on the generic method 1300 presented in FIG. 13. It will be appreciated that, although primarily presented as being performed serially, at least a portion of the blocks of method 4000 may be performed contemporaneously or in a different order than as presented in FIG. 40. The inputs to method 4000 include an IP address of the remote LSR. It is noted that, when an LSR discovers that a new SCTP association needs to be established to tunnel MPLS overlay packets, the LSR determines the IP address of the remote LSR to which the SCTP association is to be made and determines information about the new SCTP association (e.g., QoS information, which is used for appropriate QoS markings in the IP header that encapsulates an SCTP packet). At block 4001, the method 4000 begins. Block 4002 chooses one or more configured local IP addresses that can be used for sending and receiving tunnel traffic, and the method 4000 then proceeds to block 4004. Block 4004 allocates a local SCTP port number to be used for the new association, such that the number is not currently used by an existing SCTP association, and the method 4000 then proceeds to block 4006. Block 4006 binds the local SCTP port to MPLS as its payload/application, and the method 4000 then proceeds to block 4008. Block 4008 generates an SCTP association request from the local port and one of the local IP addresses to port number for MPLS (6640) at the remote IP address. The SCTP association request is a message that carries an INIT chunk of SCTP. The INIT chunk primarily includes the information on maximum number of inbound streams and outbound streams allowed for the association, and the list of local IP addresses to be used for the association. The maximum number of inbound or outbound streams may be set to the maximum number of MPLS overlays to be tunneled over the SCTP association. If the maximum number of MPLS overlays to be supported in not known a priori, then both the number of inbound streams field and the number of outbound streams field may be set to the maximum allowable value, i.e., 65535 (because fields are of 16-bits size). It is noted that, if the SCTP association request is rejected by remote LSR, then the LSR should act to limit unnecessary repetition attempts to establish an SCTP association. For example, the LSR might wait 60 seconds before trying to re-establish the association. From block 4008, the method 4000 proceeds to block 4010. Block 4010 checks if the SCTP association request is accepted by the remote LSR (means success). If the SCTP association request is accepted by the remote LSR, this LSR would receive an INIT ACK from the remote LSR. If the SCTP association request is accepted by the remote LSR then the method 4000 proceeds to block 4012, otherwise the method 4000 proceeds to block 4014. Block 4014 declares the failure to configure the SCTP association, and then the method 4000 proceeds to block 4099 where the method 4000 ends. Block 4012 performs post association follow-ups as needed, and then the method 4000 proceeds to block 4099 where the method 4000 ends. At block 4099, the method 4000 ends.

Figure 41:
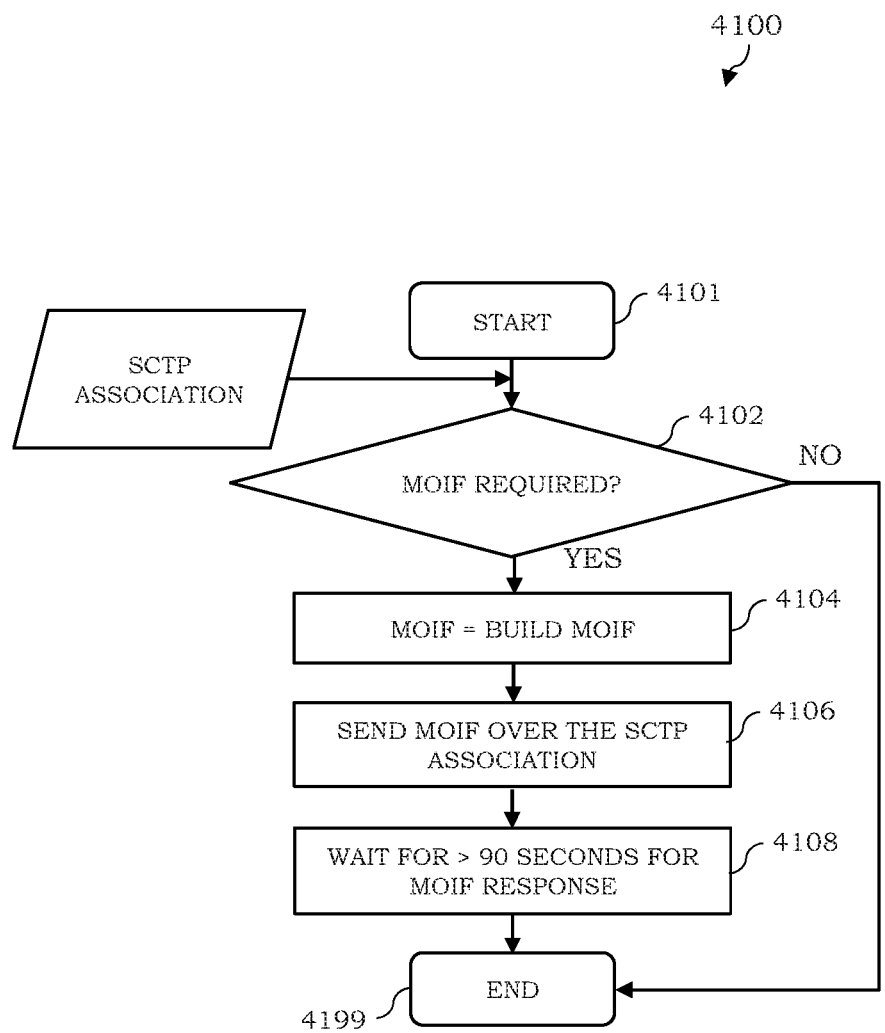
FIG. 41 depicts an example embodiment of a method for performing post connection follow-up for an SCTP association for MPLS-in-SCTP.

FIG. 41 depicts an example embodiment of a method for performing post connection follow-up for an SCTP association for MPLS-in-SCTP. It is noted that the method 4100 may be performed by the LSR that initiates the SCTP association. The method 4100 may be used to provide block 4012 of method 4000 of FIG. 40. The method 4100 may be based on the framework defined in FIG. 14. It will be appreciated that, although primarily presented as being performed serially, at least a portion of the blocks of method 4100 may be performed contemporaneously or in a different order than as presented in FIG. 41. The input to method 4100 includes an SCTP association. At block 4101, the method 4100 begins. Block 4102 checks if the requirement of MOIF is configured in the LSR. If the requirement of MOIF is configured in the LSR then the method 4100 proceeds to block 4104, otherwise the method 4100 proceeds to block 4199 where the method 4100 ends. Block 4104 builds a MOIF and fills the necessary fields. It is noted that this block may be implemented by the method 1500 of FIG. 15. From block 4104, the method 4100 proceeds to block 4106. Block 4106 sends the MOIF over the SCTP association. The MOIF is sent as payload of a data chunk in a SCTP packet, where the data chunk is encoded with Stream ID 0. From block 4106, the method 4100 proceeds to block 4108. Block 4108 waits for a MOIF response from peer LSR. It is noted that an implementation may wait for at least 90 seconds (or any other suitable length of time) for a MOIF response. In order to wait, the LSR may start a timer for a duration within which it expects a MOIF response and associate the timer with the SCTP association (although it will be appreciated that other mechanisms are contemplated). It is noted that, when the initiating LSR receives a MOIF response from the peer LSR, it may execute the method 1700 of FIG. 17. It is noted that determination of a received packet on the connection as MOIF may be made as part of the general processing of MPLS overlay packets on the association (e.g., based on blocks 4902-4914 of method 4900 of FIG. 49). From block 4108, the method 4100 proceeds to block 4199 where the method 4100 ends. At block 4199, the method 4100 ends.

Figure 42:
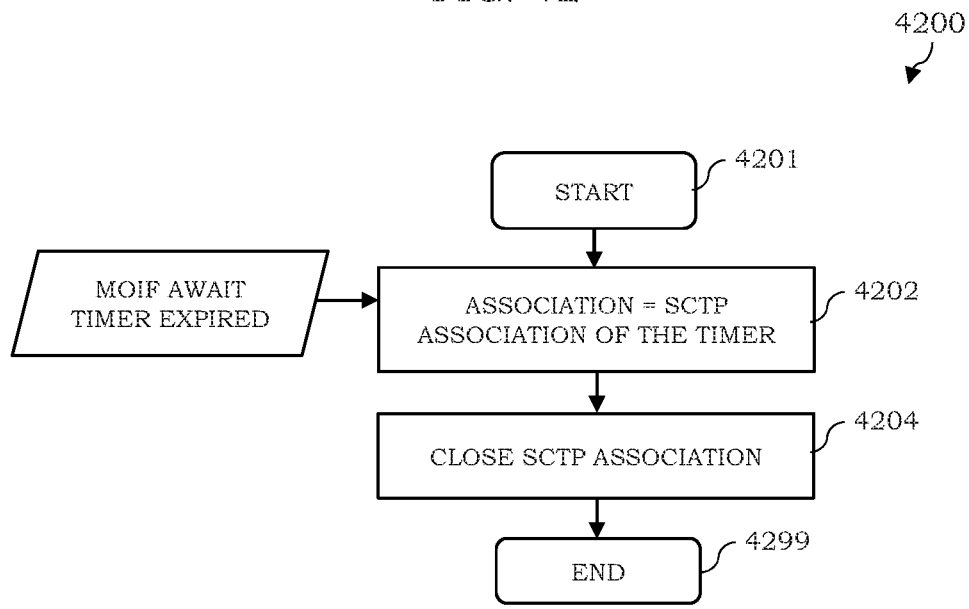
FIG. 42 depicts an example embodiment of a method for use when a MOIF response is not received within a predefined time period for an SCTP association.

FIG. 42 depicts an example embodiment of a method for use when a MOIF response is not received within a predefined time period for an SCTP association. It is noted that the situation in which an initiating LSR fails to receive a MOIF response within a predefined time period may be determined where the timeout set at block 4108 of FIG. 41 expires without the MOIF response being received. It is noted that the determination that a received packet on the SCTP association is a MOIF response may be performed as part of the general processing of MPLS overlay packets received on the association (e.g., based on blocks 4902-4914 of method 4900 of FIG. 49). It is noted that, when the initiating LSR receives a MOIF response from the peer LSR, the initiating LSR may execute method 1700 of FIG. 17. It will be appreciated that, although primarily presented as being performed serially, at least a portion of the blocks of method 4200 may be performed contemporaneously or in a different order than as presented in FIG. 42. The input to method 4200 includes a notification that the MOIF await timer expired. Block 4202 retrieves the SCTP association associated with the timer and the method 4200 then proceeds to block 4204. Block 4204 closes the SCTP association, and then the method 4200 proceeds to block 4299 where the method 4200 ends. At block 4299, the method 4200 ends.

Figure 43:
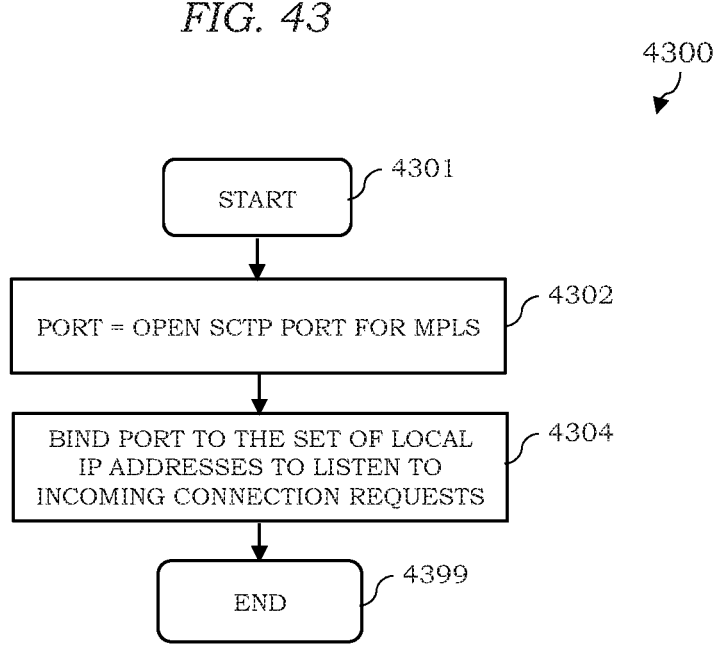
FIG. 43 depicts an example embodiment of a method for configuring a SCTP association listener.

FIG. 43 depicts an example embodiment of a method for configuring an SCTP association listener. It is noted that the method 4300 may be used by an LSR to listen to SCTP association requests for MPLS-in-SCTP (e.g., listening for new SCTP association requests for MPLS as the user protocol, such as by listening on the SCTP port assigned for MPLS (6640)). It is noted that MPLS-in-SCTP association listeners may be implemented by any LSRs that configure MPLS overlays. The method 4300 may be based on the generic method 1800 presented in FIG. 18. It will be appreciated that, although primarily presented as being performed serially, at least a portion of the blocks of method 4300 may be performed contemporaneously or in a different order than as presented in FIG. 43. At block 4301, the method 4300 begins. Block 4302 opens the SCTP port for MPLS (e.g., 6640), and then proceeds to block 4304. Block 4304 binds the port to the set of local IP addresses in the LSR chosen for SCTP association and then starts listening to incoming association requests (e.g., SCTP messages with INIT chunk) to the port on any one of the IP addresses. At block 4399, the method 4300 ends.

Figure 44:
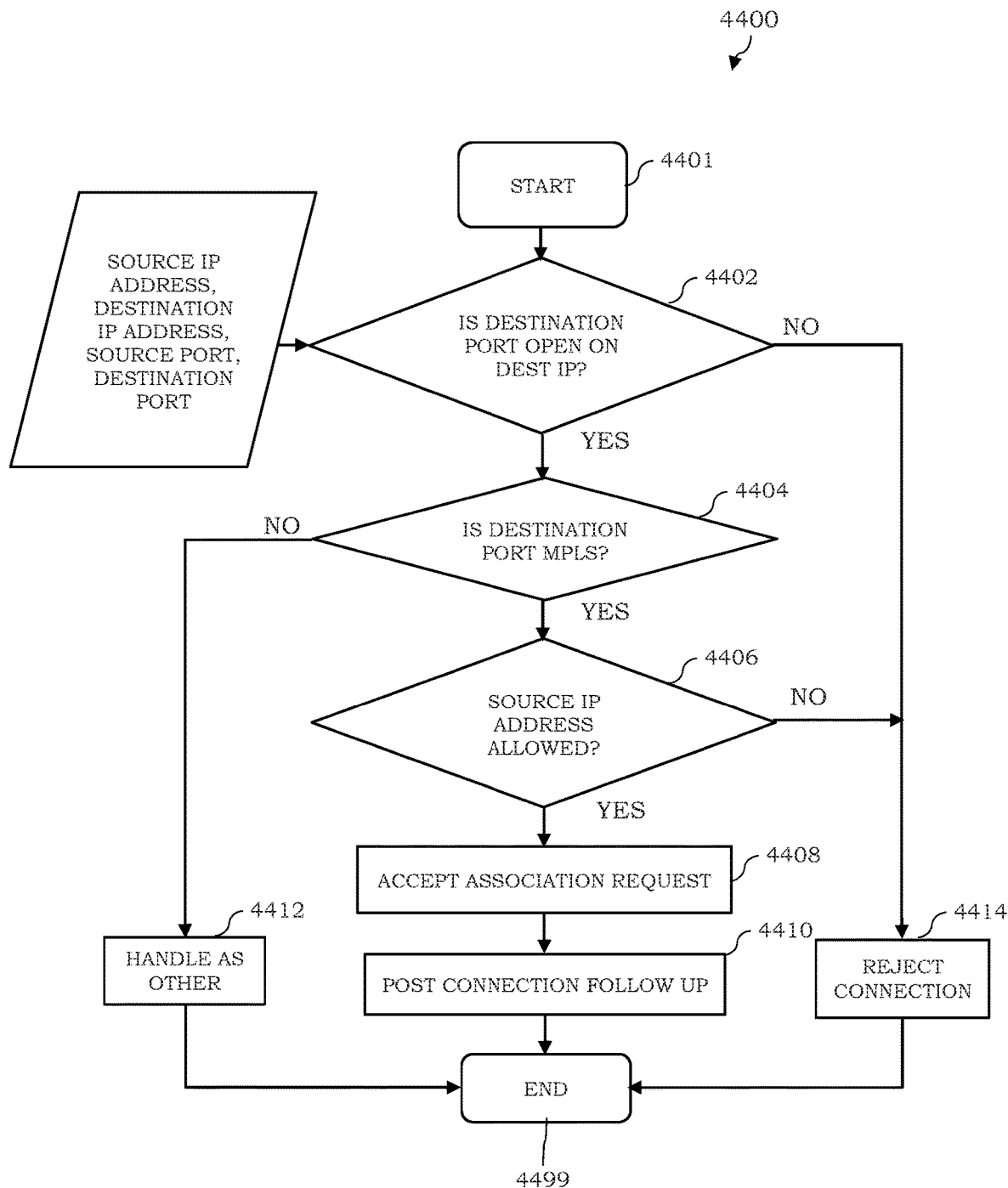
FIG. 44 depicts an example embodiment of a method for processing incoming SCTP association requests.

FIG. 44 depicts an example embodiment of a method for processing incoming SCTP association requests. It is noted that the incoming association requests may be received on the SCTP port for MPLS. The method 4400 may be based on the generic method 1900 presented in FIG. 19. It will be appreciated that, although primarily presented as being performed serially, at least a portion of the blocks of method 4400 may be performed contemporaneously or in a different order than as presented in FIG. 44. The inputs to method 4400 include the association request with the following associated parameters: (1) source IP address, which is the IP address of the remote LSR that sent the association request, (2) destination IP address, which is a local IP address of this LSR to which the association request is sent, (3) source port, which is the SCTP port at the remote LSR, and (4) destination port, which is the SCTP port at this LSR to which the association request is sent. At block 4401, the method 4400 begins. Block 4402 checks if the destination port is open in SCTP in the LSR. If the destination port is not open in SCTP in the LSR, then the method 4400 proceeds to block 4414, otherwise the method 4400 proceeds to block 4404. Block 4414 rejects the association request using appropriate SCTP mechanisms (e.g., using a rejection notification to the remote LSR as per methods in SCTP). For example, the LSR may send an SCTP message back to the sender with an ABORT chunk to reject the SCTP association request. From block 4414, the method 4400 proceeds to block 4499 where the method 4400 ends. Block 4404 checks if the SCTP destination port is MPLS (e.g., 6640). If the SCTP destination port is not MPLS then the method 4400 proceeds to block 4412, otherwise the method 4400 proceeds to block 4406. Block 4412 handles the SCTP association request as per the payload protocol type associated with the port, and then the method proceeds to block 4499 where the method 4400 ends. Block 4406 checks if an SCTP association request is allowed from the remote LSR (e.g., from the source IP address). It is noted that various factors may be used to determine whether an LSR should allow an incoming SCTP association. For example, the LSR may employ a method to discover all potential remote LSRs and sets of their local IP addresses that may participate in an MPLS overlay with the LSR. If an SCTP association request is not allowed then the method 4400 proceeds to block 4414, otherwise the method 4400 proceeds to block 4408. Block 4414 rejects the association request using appropriate SCTP means, i.e. rejection notification to remote LSR as per methods in SCTP such as sending back an SCTP message to sender with ABORT control chunk. The method terminates after block 4414. Block 4408 accepts the SCTP association request, which means that the state for the SCTP association is created with the key as the tuple {Remote IP Address Set, Local IP Address Set. Source port, Destination port}, and the method 4400 then proceeds to block 4410. Block 4410 performs post association follow-ups, if any, and the method 4410 then proceeds to block 4499 where the method 4400 ends. Block 4410 may be implemented by the method 2000 of FIG. 20, which makes the LSR wait for MOIF from the peer LSR, if configured to receive a MOIF. It is noted that the determination that a packet received on the SCTP association is MOIF may be made as part of the general processing of MPLS overlay packets on the association (e.g., using blocks 4902-4914 of the method 4900 of FIG. 49). It is noted that, if the LSR fails to receive a MOIF within a predefined time period (e.g., the timeout set at block 2004 in FIG. 20 expires), then the LSR may execute the method 4200 of FIG. 42 (i.e., handling is common in both initiating and receiving LSRs). It is noted that, when a MOIF is received from the peer LSR, then the LSR may execute the method 2100 of FIG. 21.

Figure 45A:
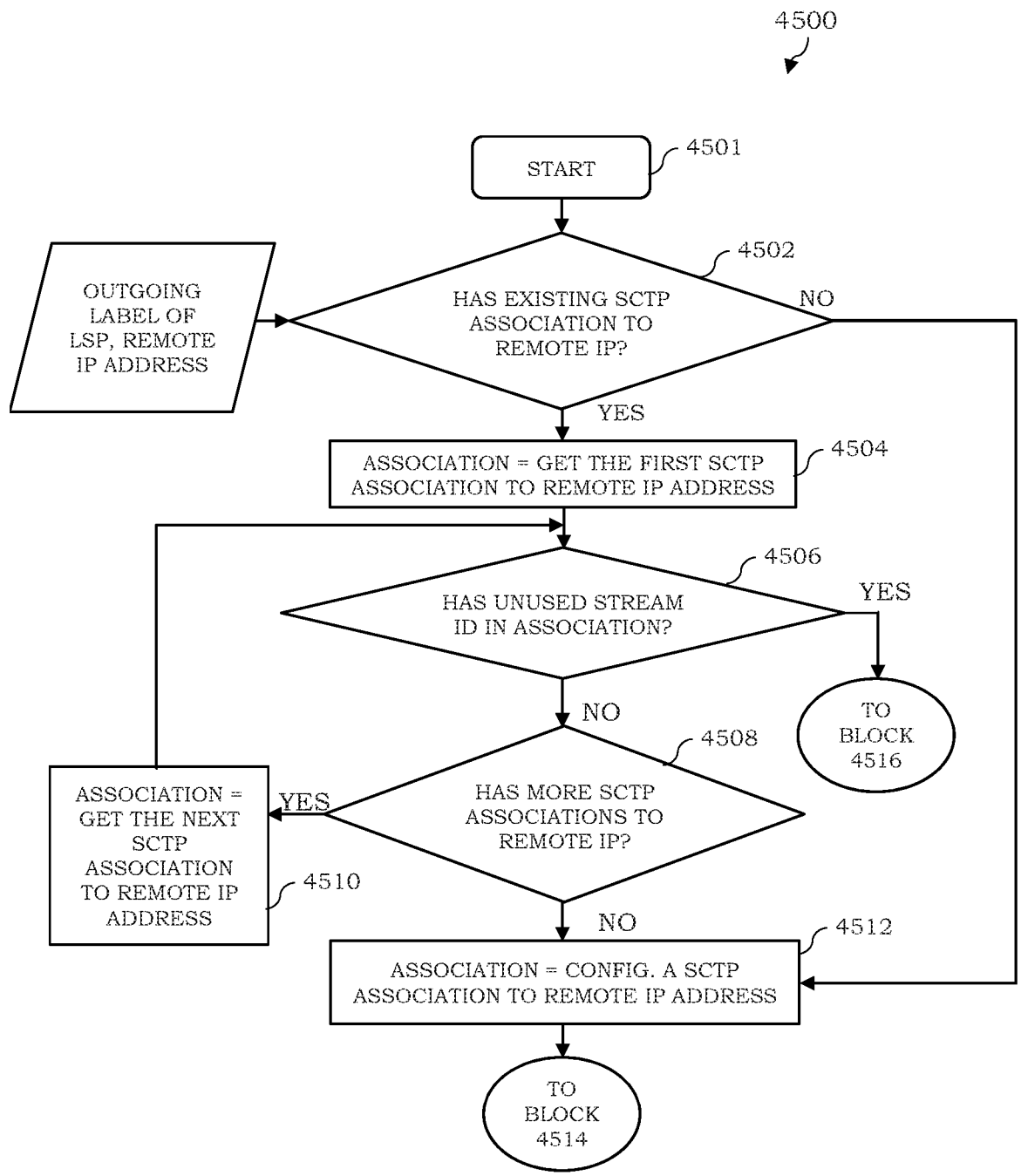
FIGS. 45A-45B depict an example embodiment of a method for configuring an MPLS overlay over a SCTP association to form an MPLS-in-SCTP overlay.
Figure 45B:
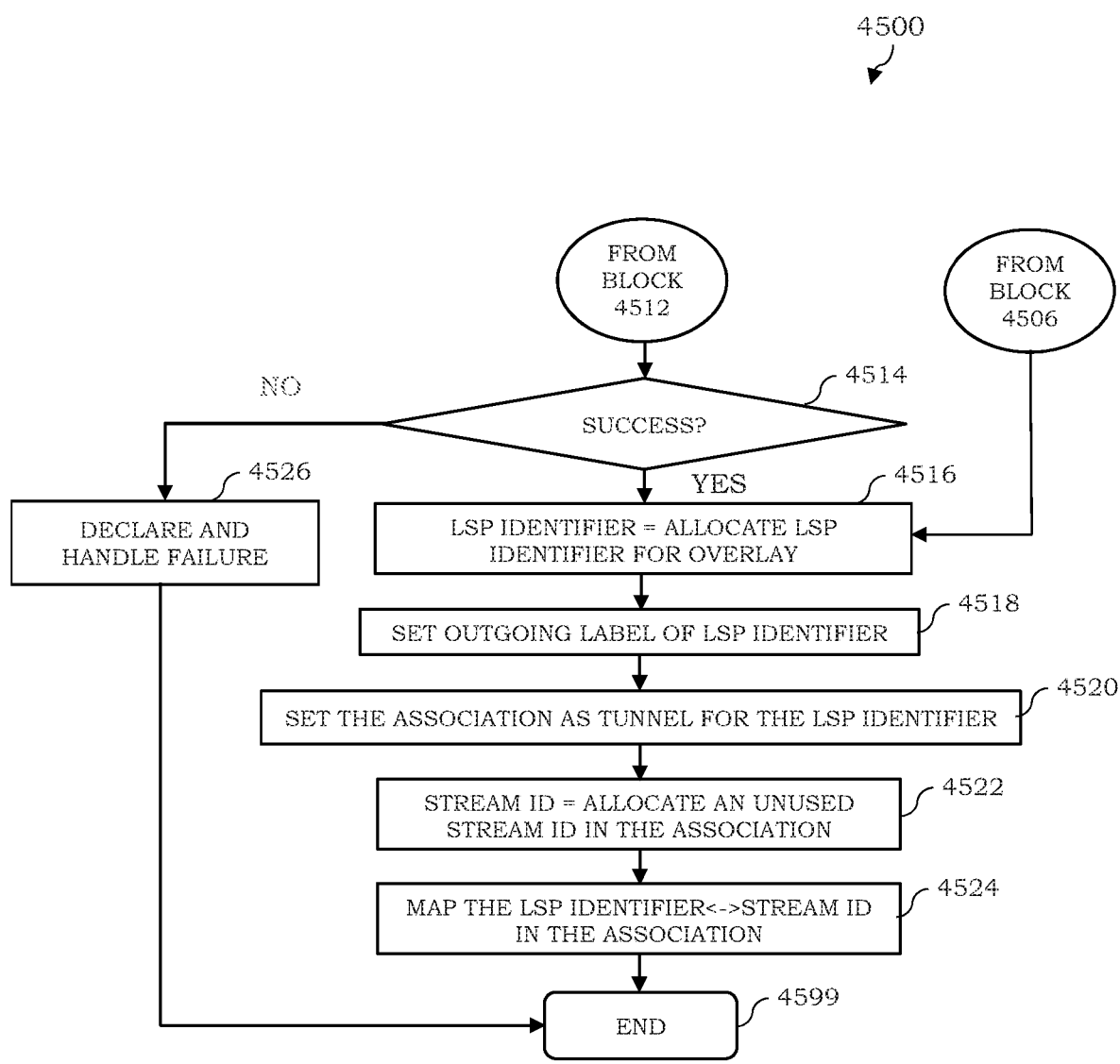

FIGS. 45A-45B depict an example embodiment of a method for configuring an MPLS overlay over an SCTP association to form an MPLS-in-SCTP overlay. It is noted that, to configure an MPLS overlay over an SCTP association, the LSR may assign the MPLS overlay a unique non-zero stream ID on an SCTP association to the remote LSR. For a transmitting LSR, the Stream ID space is local to LSR, so each LSR can independently allocate an unused Stream ID from its local space and an LSR that sends an MPLS overlay packet over the SCTP association uses its assigned Stream ID in corresponding data chunks in SCTP packets. For a receiving/remote LSR, there is no correlation between the Stream ID of a received data chunk to the corresponding MPLS overlay since the LSR identifies the overlay based on the MPLS Label Stack of the MPLS packet in the payload of the data chunk. It will be appreciated that, although primarily presented as being performed serially, at least a portion of the blocks of method 4500 may be performed contemporaneously or in a different order than as presented in FIGS. 45A-45B. The inputs to method 4500 include the outgoing MPLS label of the LSP/overlay and the IP address of the remote LSR of the LSP/overlay. At block 4501, the method 4500 begins. Block 4502 checks if there is an existing SCTP association to the remote LSR for MPLS-in-SCTP. If there is not an existing SCTP association to the remote LSR for MPLS-in-SCTP then the method 4500 proceeds to block 4512, otherwise the method 4500 proceeds to block 4504. Block 4504 retrieves the first SCTP association to the remote LSR for MPLS-in-SCTP, and the method 4500 then proceeds to block 4506. Block 4506 checks if there is at least one unused non-zero Stream ID available in the SCTP association. If there is at least one unused non-zero Stream ID available in the SCTP association, then this SCTP association can be used for the overlay and the method 4500 proceeds to block 4516. If there is not at least one unused non-zero Stream ID available in the SCTP association, then this SCTP association cannot be used for the overlay and the method 4500 proceeds to block 4508. Block 4508 checks if there are more SCTP connections to the remote LSR for MPLS-in-SCTP. If there are more SCTP connections to the remote LSR for MPLS-in-SCTP then the method 4500 proceeds to block 4510, otherwise the method 4500 proceeds to block 4512. Block 4512 retrieves the next SCTP association to the remote LSR for MPLS-in-SCTP, and the method 4500 then returns to block 4506 to evaluate the feasibility of the next SCTP association as a tunnel for the overlay. Block 4512 configures a new SCTP association to the remote LSR for MPLS-in-SCTP. It is noted that block 4512 may be implemented by the method 3300 of FIG. 33. From block 4512, the method 4500 proceeds to block 4514. Block 4514 checks if the SCTP association has been set-up successfully. If the SCTP association has not been set up successfully then the method 4500 proceeds to block 4526, otherwise the method 4500 proceeds to block 4516. Block 4526 declares and handles a failure to configure the MPLS overlay and then proceeds to block 4599, where the method 4500 ends. Block 4516 allocates an LSP identifier to uniquely identify the MPLS overlay in the LSR. The LSP identifier binds the SCTP association, outgoing label(s), and other parameters associated with the MPLS overlay. From block 4516, the method 4500 proceeds to block 4518. Block 4518 sets the outgoing MPLS label of the LSP/overlay as the outgoing label of the LSP identifier, and the method 4500 then proceeds to block 4520. Block 4520 sets the SCTP association as the tunnel associated with the LSP identifier, and the method 4500 then proceeds to block 4522. Block 4522 allocates an unused Stream ID in the SCTP association as the identifier for the stream to be used to exchange packets for the overlay, and the method 4522 then proceeds to block 4524. Block 4524 creates a mapping between the LSP identifier and the Stream ID of the overlay, and the method 4500 then proceeds to block 4599 where the method 4500 ends. At block 4599, the method 4500 ends.

Figure 46:
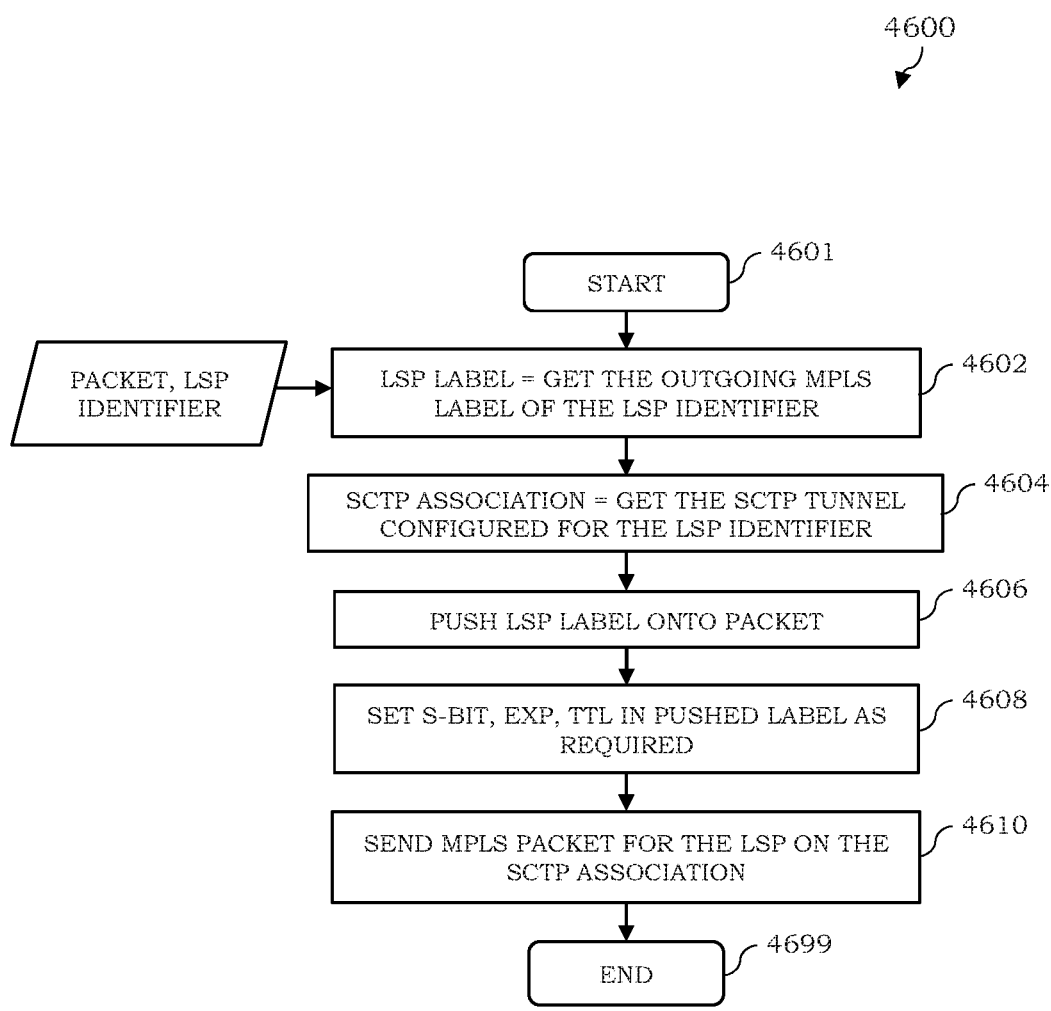
FIG. 46 depicts an example embodiment of a method for transmitting a packet on MPLS-in-SCTP.

FIG. 46 depicts an example embodiment of a method for transmitting a packet on MPLS-in-SCTP. The method 4600 may be based on the generic method 2300 presented in FIG. 23 (except that block 2310 may not be implemented as there are no dynamic parameters for the SCTP headers in MPLS-in-SCTP packets). It will be appreciated that, although primarily presented as being performed serially, at least a portion of the blocks of method 4600 may be performed contemporaneously or in a different order than as presented in FIG. 46. The inputs to method 4600 include the packet to be transmitted and the LSP identifier that identifies the LSP or the MPLS overlay. At block 4601, the method 4600 begins. Block 4602 retrieves the state of the outgoing label of the LSP by the LSP identifier, and the method 4600 then proceeds to block 4604. Block 4604 gets the SCTP tunnel configured for the LSP identifier, and the method 4600 then proceeds to block 4606. Block 4606 pushes the outgoing label of the LSP onto the packet, and the method 4600 then proceeds to block 4608. Block 4608 sets the S-bit, EXP, and TTL fields in the pushed label as needed for the packet. For example, if the packet already had another label before pushing the outgoing label of the LSP, then the S-bit is set to 0, otherwise the S-bit is set to 1. The TTL and EXP values may be set by a policy configured for the LSP. For example, if the policy says to use a consistent EXP value for all packets on the LSP, then the configured EXP value is set. If the policy has mapping of the EXP values based on the certain fields in the native header of the packet then the mapped EXP value is set. From block 4608, the method 4600 proceeds to block 4610. Block 4610 sends the MPLS packet in the context of the LSP identifier on the SCTP association. From block 4610, the method 4600 proceeds to block 4699 where the method 4600 ends. At block 4699, the method 4600 ends.

Figure 47:
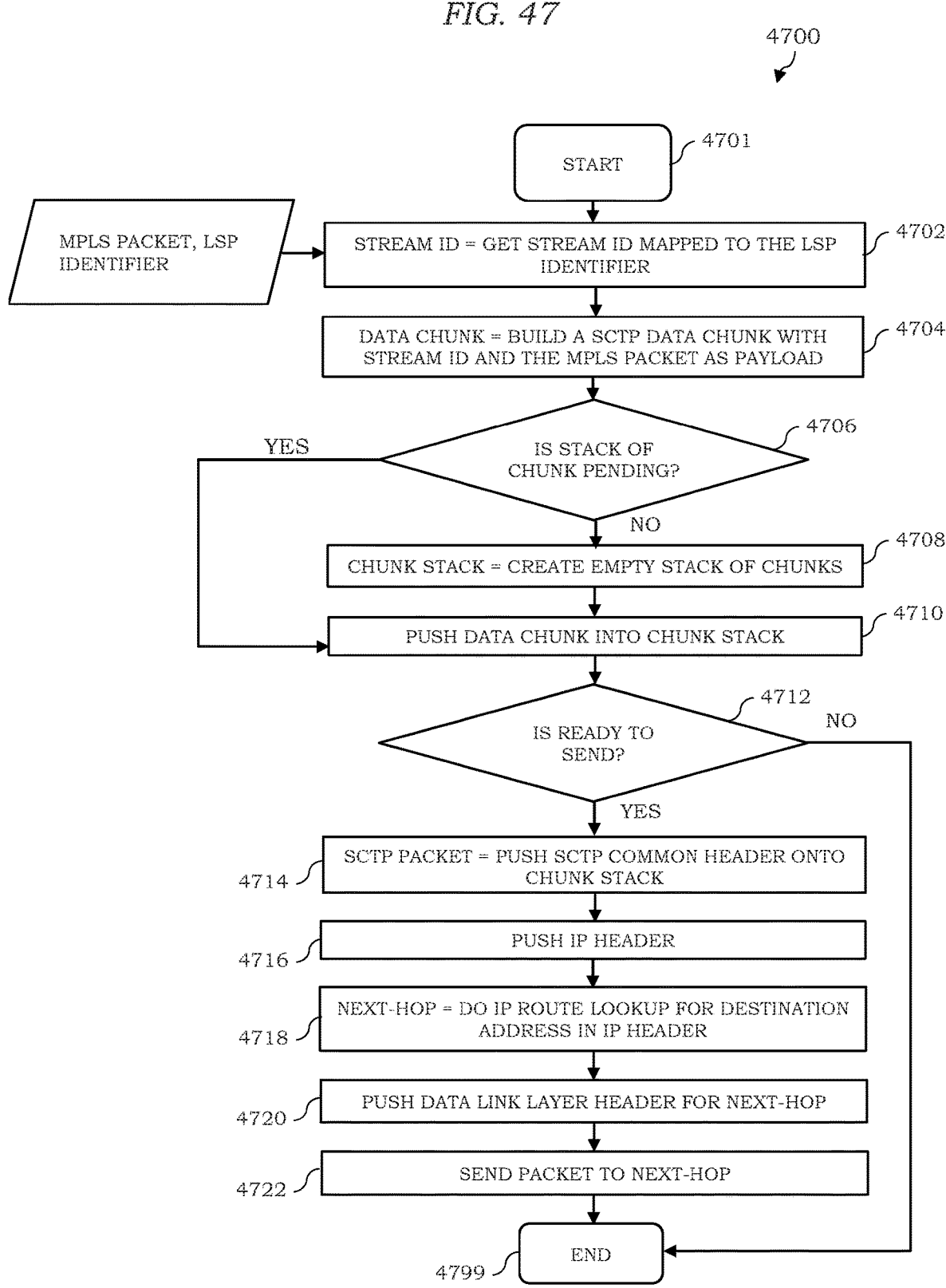
FIG. 47 depicts an example embodiment of a method for transmitting an MPLS packet on an SCTP association.

FIG. 47 depicts an example embodiment of a method for transmitting an MPLS packet on an SCTP association. The method 4700 may be used to provide block 4610 of method 4600 of FIG. 46. The method 4700 may be based on the generic method 2400 presented in FIG. 24 (except that block 2410 may not be implemented as there are no dynamic parameters for the SCTP headers in MPLS-in-SCTP packets). It will be appreciated that, although primarily presented as being performed serially, at least a portion of the blocks of method 4700 may be performed contemporaneously or in a different order than as presented in FIG. 47. The inputs to method 4700 include the MPLS packet to be transmitted and the LSP identifier that identifies the LSP or the MPLS overlay. At block 4701, the method 4700 begins. Block 4702 gets the Stream ID mapped to the LSP identifier, and the method 4700 then proceeds to block 4704. Block 4704 builds an SCTP data chunk for the Stream ID with the MPLS packet as its payload and the method 4700 then proceeds to block 4706. Block 4706 checks if the one or more chunks are pending to be sent on the SCTP association. Since SCTP may bundle multiple chunks on a single SCTP packet, it is possible that previous chunks may have been queued up and yet to be sent. Secondly, previous frames may also be pending due to congestion, flow control, or the like. If no frames are pending then the method 4700 proceeds to block 4708, otherwise the method 4700 proceeds to block 4710. Block 4708 creates an empty stack of SCTP chunks and the method 4700 then proceeds to block 4710. Block 4710 pushes the data chunk (including the MPLS packet) into the stack of SCTP chunks, and the method 4700 then proceeds to block 4712. Block 4712 checks if the stack of SCTP chunks is ready to be sent over the SCTP association. It is possible that the stack of SCTP chunks may not be sent immediately due to congestion, flow control, or the like, or the LSR could be waiting for more frames within a time window to send an optimally-sized SCTP packet. If the stack of SCTP chunks is not yet ready to be sent then the stack of SCTP chunks will be sent later when ready, so the method 4700 proceeds to block 4799 where the method 4700 ends (e.g., until a later time when method 4700 may be re-executed). If the stack of SCTP chunks is ready to be sent, then the method 4700 proceeds to block 4714. Block 4714 pushes the SCTP Common Header for the association onto the stack of SCTP chunks. This results in a complete SCTP packet. The Source Port and Destination Port fields in the SCTP Common Header are filled as per the corresponding parameters in the SCTP association. It is noted that blocks 4704-4714 may be performed by the SCTP layer in the LSR. From block 4714, the method 4700 proceeds to block 4716. Block 4716 pushes the IP header onto the packet. The source and destination address in the IP header are filled as per a pair of local and remote IP addresses in the SCTP association (the addresses are provided by block 4714). Protocol field (if IPv4 Header) or the Next Header field (if IPv6 Header) is set to 132 to indicate the payload as SCTP. From block 4716, the method 4700 proceeds to block 4718. Block 4718 performs an IP route table lookup for the destination address in the IP Header, which results in the next-hop for the packet. It is noted that blocks 4716-4718 may be performed by the IP layer in the LSR. From block 4718, the method 4700 proceeds to block 4720. Block 4720 pushes the Data Link Layer Header onto the packet, to send the packet on the link to the next-hop, and the method 4700 then proceeds to block 4722. Block 4722 sends the packet on the wire to the next-hop, and then the method then proceeds to block 4700 where the method 4700 ends. At block 4799, the method 4700 ends.

Figure 48:
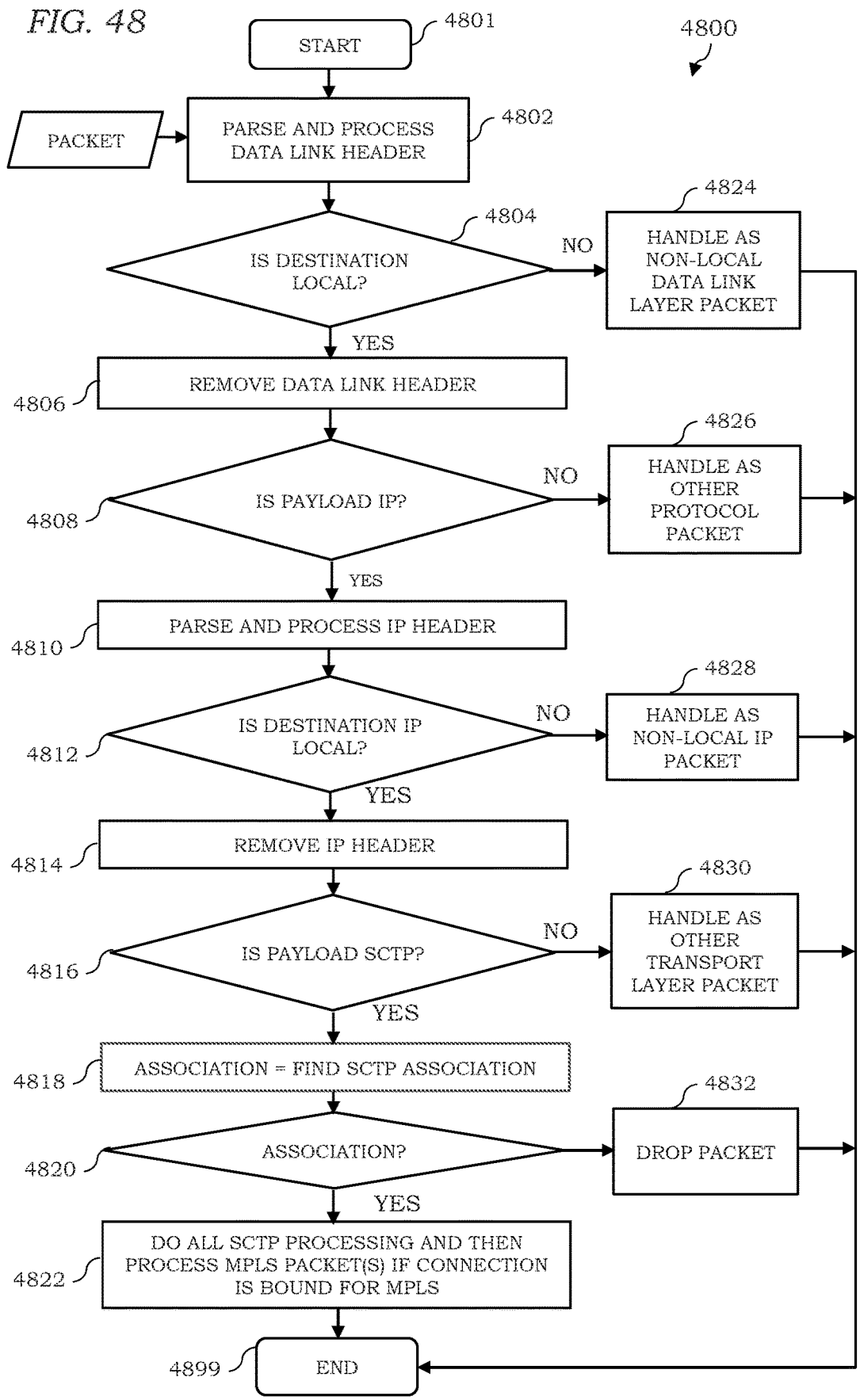
FIG. 48 depicts an example embodiment of a method for receiving and processing of MPLS-in-SCTP packets.

FIG. 48 depicts an example embodiment of a method for receiving and processing of MPLS-in-SCTP packets. It will be appreciated that, although primarily presented as being performed serially, at least a portion of the blocks of method 4800 may be performed contemporaneously or in a different order than as presented in FIG. 48. The input to method 4800 includes the MPLS-in-SCTP packet that is received on the wire.

At block 4801, the method 4800 begins.

Block 4802 parses and processes the data link header at the top of the packet, and the method 4800 then proceeds to block 4804. Block 4804 checks if the data link layer indicates the packet to be local, meaning that this LSR that is executing the method 4800 is the termination point of the data link on which the packet arrived. For example, if the data link header is an Ethernet header and if the destination MAC address in the Ethernet header is local to the LSR, then the Ethernet link terminates on the LSR. If the packet is local at the data link layer then the method 4800 proceeds to block 4806, otherwise the method 4800 proceeds to block 4824. Block 4824 performs required handling of the packet at the data link layer as a non-local packet, which may result in forwarding of the packet further at the data link layer, and the method 4800 then proceeds to block 4899 where the method 4800 ends. It is noted that blocks 4802-4804 and block 4824 may be performed by the data link layer of the LSR.

Block 4806 removes the data link header from the packet as the LSR is the end of the data link, and the method 4800 then proceeds to block 4808. Block 4808 checks if the payload indicated by the data link header is IP. For example, if data link header is an Ethernet header then its Ethertype field indicates the payload type. If the Ethernet header has VLAN tags, then the Ethertype field in the last VLAN tag indicates the payload type. If the payload is IP then the method 4800 proceeds to block 4810, otherwise the method 4800 proceeds to block 4826. Block 4826 handles the packet as non-IP packet, and the method 4800 then proceeds to block 4899 where the method 4800 ends. It is noted that blocks 4806-4808 may be performed by the data link layer of the LSR.

Block 4810 processes the IP packet in the IP layer based on its IP header. For example, the destination address of the IP header may be looked up in IP route table to make a forwarding decision on the IP packet. From block 4810, the method 4800 proceeds to block 4812. Block 4812 checks if the destination address is local (e.g., if the IP route table lookup matched the destination address as a locally configured IP address in LSR). If the destination address is not local, then the method 4800 proceeds to block 4828, otherwise the method 4800 proceeds to block 4814. Block 4828 handles the packet as a non-local IP packet, such as by forwarding the packet to the next-hop associated with the matching route entry from the IP route table lookup, and the method 4800 then proceeds to block 4899 where the method 4800 ends. It is noted that blocks 4810-4812 and 4828 may be performed by the IP layer of the LSR.

Block 4814 removes the IP header from the IP packet, as it is a local packet, and the method 4800 then proceeds to block 4816. Block 4816 checks if the packet is a SCTP packet (e.g., if the IP header was IPv4 then it checks if the protocol field in the IPv4 header was set to 132 (SCTP) or if the IP header was IPv6 then it checks if the next-header field in the IPv6 header was set to 132 (SCTP)). If the packet is not an SCTP packet then the method 4800 proceeds to block 4830, otherwise the method 4800 proceeds to block 4818. Block 4830 handles the packet for the respective IP protocol type and the method 4800 then proceeds to block 4899 where the method 4800 ends. It is noted that blocks 4814-4816 may be performed by the IP layer of the LSR.

Block 4818 finds the SCTP association of the SCTP packet based on source and destination IP addresses in the IP header (e.g., the addresses were passed along the flow since the removal of the IP header in block 4814) and based on the source and destination ports in the SCTP Common Header. From block 4818, the method 4800 proceeds to block 4820. Block 4820 checks if a matching SCTP association is found. If no matching SCTP association is found then the method 4800 proceeds to block 4832, otherwise the method 4800 proceeds to block 4822. Block 4832 drops the packet as erroneous packet and then the method 4800 proceeds to block 4899 where the method 4800 ends.

Block 4822 performs SCTP layer processing on the SCTP packet and, if the SCTP association is bound to MPLS, then the MPLS packets from the data chunks received in the SCTP packet are processed. From block 4822, the method 4800 proceeds to block 4899 where the method 4800 ends.

At block 4899, the method 4800 ends.

Figure 49:
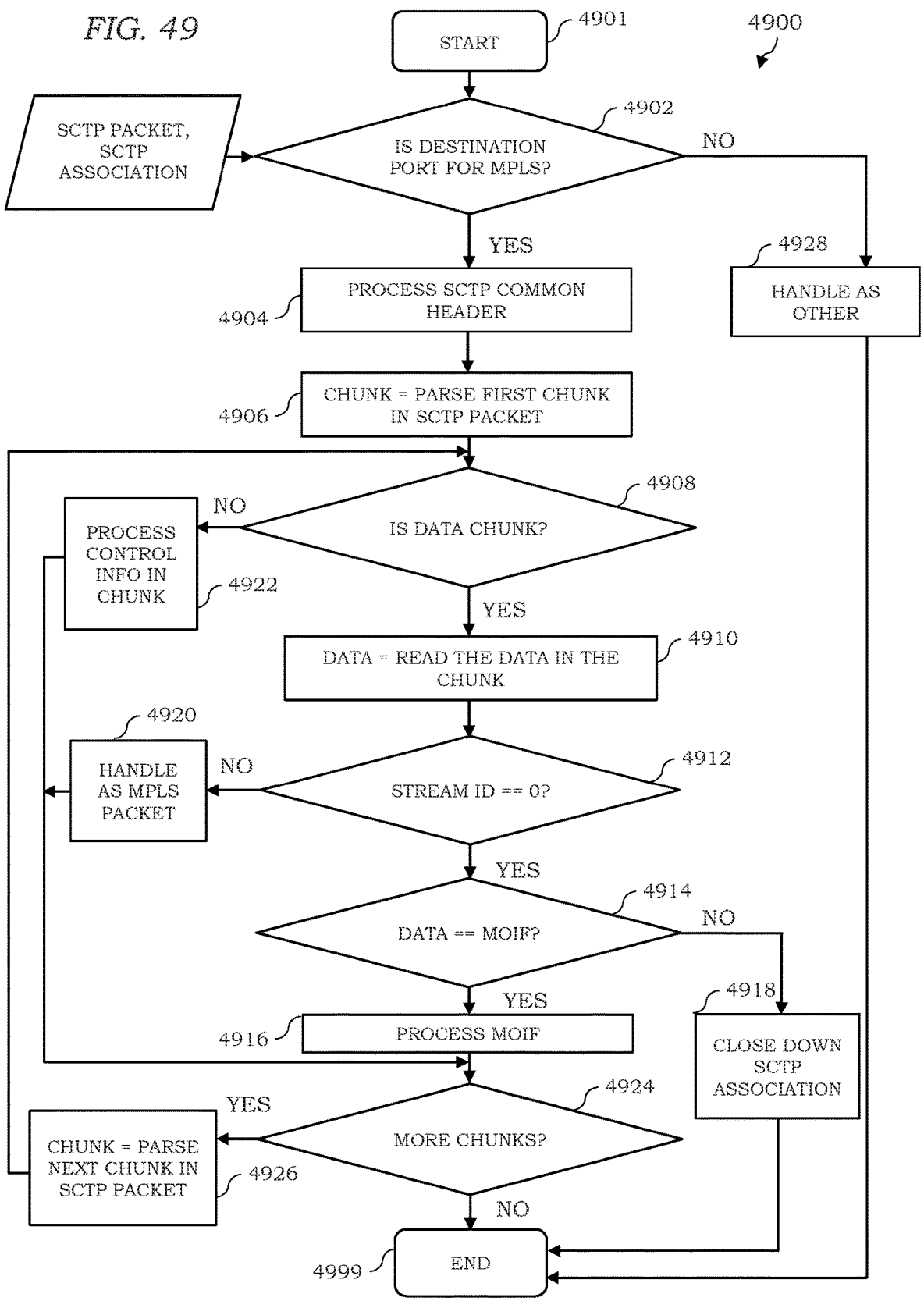
FIG. 49 depicts an example embodiment of a method for processing of MPLS-in-STCP packets from an SCTP packet of an SCTP association.

FIG. 49 depicts an example embodiment of a method for processing of MPLS-in-SCTP packets from an SCTP packet of an SCTP association. The method 4900 may be used to provide block 4822 of method 4800 of FIG. 48 and may be based on the generic method 2500 presented in FIG. 25. It will be appreciated that, although primarily presented as being performed serially, at least a portion of the blocks of method 4900 may be performed contemporaneously or in a different order than as presented in FIG. 49. The inputs to the method 4900 include the SCTP packet received on the SCTP association and an indication of the SCTP association. It is noted that the SCTP packet received on the SCTP association may be received by the SCTP layer of the LSR with the SCTP Common Header at the top. It is noted that the SCTP Association may be indicated by the tuple {Source IP Address in IP Header, Destination IP Address in IP Header, Source Port in SCTP Common Header, Destination Port in SCTP Common Header}. At block 4901, the method 4900 begins. Block 4902 checks if the Destination port in the SCTP Common Header is bound to MPLS. If the Destination port in the SCTP Common Header is not bound to MPLS then the method 4900 proceeds to block 4928, otherwise the method 4900 proceeds to block 4904. Block 4928 handles the SCTP packet for non-MPLS applications. Block 4904 processes the SCTP Common Header and the method 4900 proceeds to block 4906. Block 4906 parses the first chunk in the SCTP packet and the method 4900 then proceeds to block 4908. Block 4908 checks if the chunk is a data chunk. If the chunk is not a data chunk (which means that it is a control chunk) then the method 4900 proceeds to block 4922, otherwise the method 4900 proceeds to block 4910. Block 4922 processes the control chunk using SCTP and the method 4900 then proceeds to block 4924. Block 4910 reads the data chunk and hands over the data to the MPLS overlay layer, and the method 4900 then proceeds to block 4912. Block 4912 checks if the Stream ID of the data chunk is 0. If the Stream ID of the data chunk is not 0 then the method 4900 proceeds to block 4920, otherwise the method 4900 proceeds to block 4914. Block 4920 handles the data as an MPLS packet at the MPLS overlay layer. The MPLS Label Stack of an MPLS Packet in the payload identifies the MPLS overlay to which the MPLS payload belongs. From block 4920, the method 4900 proceeds to block 4924. Block 4914 checks if the data is a MOIF packet. If the data is not a MOIF packet then this packet is not expected (i.e., the MOIF packet is expected with Stream ID 0) and the method 4900 proceeds to block 4918, otherwise the method 4900 proceeds to block 4916. Block 4918 closes down the SCTP association using appropriate SCTP methods (which notifies the remote LSR with reason for closure, such as by sending a SHUTDOWN control chunk in an SCTP packet), and then the method 4900 proceeds to block 4999 where the method 4900 ends. Block 4916 processes the MOIF packet. If the LSR was the initiator of the connection then the block 4916 may be implemented by the method 1700 of FIG. 17, otherwise the block 4916 may be implemented by the method 2100 of FIG. 21. From block 4916, the method 4900 proceeds to block 4924. It is noted that blocks 4914-4920 may be performed by the MPLS overlay layer, which is the application of the SCTP association. Block 4924 checks if there are more chunks in the SCTP packet. If there are no more chunks in the SCTP packet the method 4900 proceeds to block 4999 where the method 4900 ends, otherwise the method proceeds to block 4926. Block 4926 parses the next chunk in the SCTP packet and returns to block 4908 to repeat the subsequent blocks for the next chunk. At block 4999, the method 4900 ends.

It is noted that whether the top label of the encapsulated MPLS packet is downstream-assigned or upstream-assigned may be determined according various criteria. For example, if the tunnel destination IP address is a unicast address, the top label may be downstream-assigned. For example, if the tunnel destination IP address is an IP multicast address, either all encapsulated MPLS packets in the particular tunnel have a downstream-assigned label at the top of the stack or all encapsulated MPLS packets in the particular tunnel have an upstream-assigned label at the top of the stack. The means by which this is determined for a particular tunnel may be performed in various ways. In the absence of any knowledge about a specific tunnel, the label may be presumed to be upstream-assigned.

It is noted that intermediate routers, upon receiving SCTP encapsulated packets, may balance these packets based on the hash of the five-tuple (i.e., source IP address in IP Header, destination IP address in IP Header, source port in the SCTP Common Header, destination port in the SCTP Common Header, and protocol/next-header field in IP Header) of SCTP packets. If load balancing is desirable among MPLS overlays, then a pool of IP addresses may be used at both LSRs in the SCTP association and then assigned to send MPLS overlay packets across the pool of IP addresses.

Various example embodiments are configured to use QUIC as the reliable transport layer for tunneling of MPLS overlay packets. This provides an implementation of the reliable MPLS overlay as MPLS-in-QUIC.

QUIC is a computer networking communications protocol which operates at the transport layer and serves a role similar to TCP and SCTP. QUIC was designed as a high-performance reliable transport protocol and takes a few fundamental deviations from its predecessors TCP, SCTP, and so forth. QUIC improves performance of connection-oriented applications by establishing a number of multiplexed connections (called streams) between two endpoints over UDP. The concept of streams in QUIC is similar to SCTP, which allows multiple streams of data to reach an endpoint independently and, hence, independent of packet losses involving other streams. This solves the head-of-the-line blocking delays as experienced in TCP, if any of the TCP packets are delayed or lost. QUIC also reduces connection and transport latency, and bandwidth estimation in each direction to avoid congestion. It is noted that a fundamental difference between QUIC and TCP or SCTP is that QUIC is a user space transport protocol, which allows rapid protocol revision without having to wait for system upgrades. Within a QUIC connection, streams can be started at any time. Either endpoint can start at stream, which can be either bidirectional or unidirectional. QUIC inherits the TCP byte stream data model so, from the perspective of the application, it is a stream-oriented protocol. Traditional transport layer protocols such as TCP and SCTP identifies a connection based on the tuple {Source IP Address, Destination IP Address, Source Port Number, Destination Port Number}; however, in QUIC, each connection is identified with a numeric connection identifier (ID). Each endpoint independently selects the connection ID and advertises it during connection set-up. When an endpoint sends a QUIC packet to the peer, the endpoint encodes the QUIC header with the connection ID advertised by peer. The primary function of a connection ID is to ensure that changes in addressing at lower protocol layers (UDP, IP) do not cause packets for a QUIC connection to be delivered to the wrong endpoint. Each endpoint selects connection IDs using an implementation-specific (and perhaps deployment-specific) method which will allow packets with that connection ID to be routed back to the endpoint and identified by the endpoint upon receipt. Additionally, QUIC provides encryption and authentication of payloads, which makes MPLS-in-QUIC suitable for secured and reliable MPLS overlays. QUIC basically embeds TLS (Transport Layer Security) methods within its procedures. During connection set-up, QUIC includes the TLS handshake procedures to negotiate the security keys for encryption and authentication of the payload in QUIC packets and then, with these keys, the payload of each QUIC packet on the connection is encrypted, authenticated by using TLS procedures. When QUIC is used for tunneling MPLS overlay packets then the endpoints are LSRs.

Figure 50:
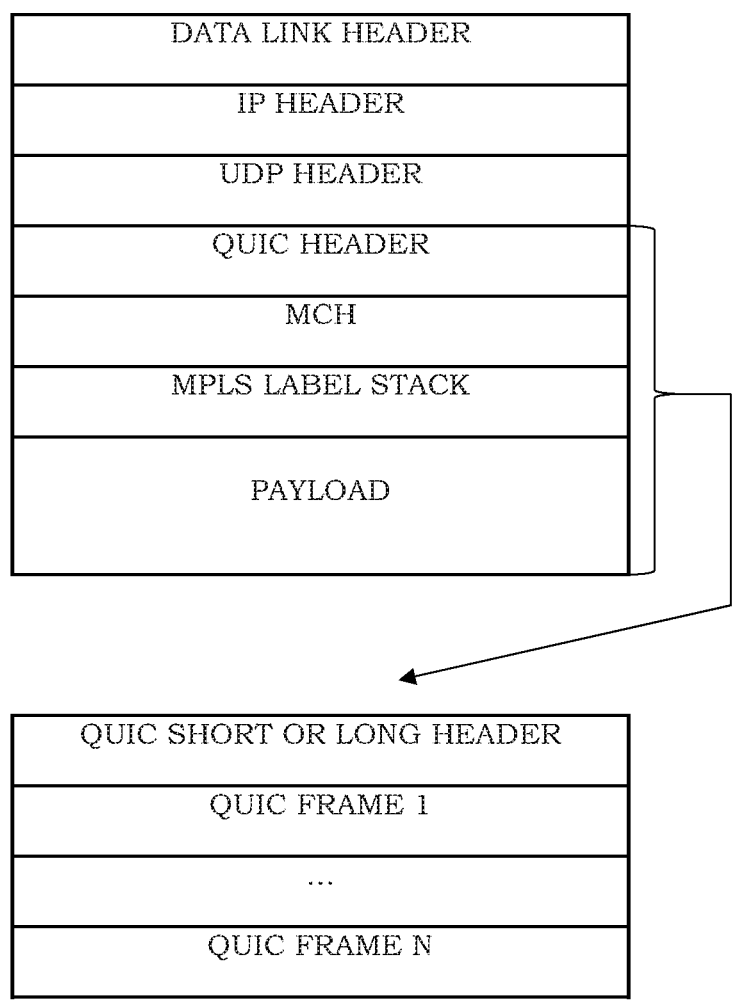
FIG. 50 depicts an example embodiment of an MPLS-in-QUIC encapsulation format for implementation of a reliable MPLS overlay as MPLS-in-QUIC.

FIG. 50 depicts an example embodiment of an MPLS-in-QUIC encapsulation format for implementation of a reliable MPLS overlay as MPLS-in-QUIC.

The MPLS-in-QUIC encapsulation format 5000 includes a payload, an MPLS label stack on top of the payload, an MCH on top of the MPLS label stack, a QUIC header on top of the MPLS label stack, a UDP header on top of the QUIC header an IP header on top of the UDP header, and a data link header on top of the IP header. With respect to the reference model of a reliable MPLS overlay packet, the UDP header and the QUIC header belong to the reliable delivery layer, because QUIC runs atop UDP. The reliability is built into QUIC and the UDP Header just provides the basic transport service. The destination port number field in the UDP header is set to 80, which is the assigned port number by IANA for QUIC. It is noted that, unless indicated otherwise, references to "QUIC Packet" are references to a packet in which the UDP header is not included in the packet. In FIG. 50, the payload, the MPLS label stack, the MCH, and the QUIC header make up the "QUIC Packet" for reliable tunneling of MPLS packets. The QUIC header is the header for the QUIC association used by the MPLS overlay as the tunnel. In FIG. 50, the QUIC Header is described in conceptual form as it is not a single header, but a set of headers interspersed across the QUIC packet. It is noted that there are several streams of the tuple {MPLS Label Stack, Payload} interspersed across the QUIC packet.

In general, a QUIC packet includes three basic sections including a QUIC Long Header (an example format of which is presented in FIG. 51) or a QUIC Short Header (an example format of which is presented in FIG. 52), and a stack of QUIC frames (an example format of which is presented in FIG. 53).

FIG. 51 depicts an example embodiment of a QUIC Long Header for a QUIC packet for implementation of a reliable MPLS overlay as MPLS-in-QUIC. The QUIC Long Header 5100 is used for packets that are sent during the initial few phases of QUIC connection set-up. Once the initial phases are complete, a sender switches to sending packets using the QUIC Short Header. The QUIC Long Header 5100 includes a Header Form field, a Fixed Bit field, a Long Packet Type field, a Type Specific Bits field, a Version field, a DCID Length (Len) field, a Destination Connection ID field, an SCID Length (Len) field, and a Source Connection ID field. The Header Form field is the most significant bit (0x80) of byte 0 (the first byte) and is set to 1 for long headers. The Fixed Bit field is the next bit (0x40) of byte 0 and is set to 1. Packets containing a zero value for this bit are not valid packets in this version and are discarded. The Long Packet Type (T) field is the next two bits (those with a mask of 0x30) of byte 0 and includes a packet type. The currently defined packet types include: (a) 0x0=Initial, (b) 0x01=0-RTT, (c) 0x2=Handshake, and (d) 0x3=Retry. The Type-Specific Bits (X) field includes the lower four bits (those with a mask of 0x0f) of byte 0 and are type-specific. The Version field is a 32-bit field that follows the first byte. This field indicates which version of QUIC is in use and determines how the rest of the protocol fields are interpreted. The DCID Len field is the byte following the version and includes the length in bytes of the Destination Connection ID field that follows it. This length is encoded as an 8-bit unsigned integer. In QUIC version 1, this value does not exceed 20. Endpoints that receive a version 1 long header with a value larger than 20 will drop the packet. Servers may be able to read longer connection IDs from other QUIC versions in order to properly form a version negotiation packet. The Destination Connection ID field follows the DCID Len and is between 0 and 20 bytes in length. The SCID Len field is the byte following the Destination Connection ID and includes the length in bytes of the Source Connection ID field that follows it. This length is encoded as an 8-bit unsigned integer. In QUIC version 1, this value does not exceed 20 bytes. Endpoints that receive a version 1 long header with a value larger than 20 will drop the packet. Servers may be able to read longer connection IDs from other QUIC versions in order to properly form a version negotiation packet. The Source Connection ID field follows the SCID Len and is between 0 and 20 bytes in length.

FIG. 52 depicts an example embodiment of a QUIC Short Header for a QUIC packet for implementation of a reliable MPLS overlay as MPLS-in-QUIC. The QUIC Short Header 5200 is used after the initial few phases of connection negotiation. The QUIC Short Header includes a Header Form field, a Fixed Bit field, a Spin Bit field, a Reserved Bit field, a Key Phase field, a Packet Number Length field, a Destination Connection ID field, a Packet Number field, and a Protected Payload field. The Header Form field is the most significant bit (0x80) of byte 0 and is set to 0 for the short header. The Fixed Bit field is the next bit (0x40) of byte 0 and is set to 1. Packets including a zero value for this bit are not valid packets in this version and will be discarded. The Spin Bit field is the third most significant bit (0x20) of byte 0 and is the latency spin bit. The Reserved Bits (R) field is the next two bits (those with a mask of 0x18) of byte 0 and are reserved. These bits are protected using header protection. The value included prior to protection is set to 0. An endpoint treats receipt of a packet that has a non-zero value for these bits, after removing both packet and header protection, as a connection error of type PROTOCOL_VIOLATION. Discarding such a packet after only removing header protection can expose the endpoint to attacks. The Key Phase (K) field is the next bit (0x04) of byte 0 and indicates the key phase, which allows a recipient of a packet to identify the packet protection keys that are used to protect the packet. The Packet Number Length (P) field is the least significant two bits (those with a mask of 0x03) of byte 0 and includes the length of the packet number, encoded as an unsigned, two-bit integer that is one less than the length of the packet number field in bytes. That is, the length of the packet number field is the value of this field, plus one. The Destination Connection ID field includes a connection ID that is chosen by the intended recipient of the packet. The Packet Number field is 1 to 4 bytes long. The packet number has confidentiality protection separate from packet protection. The length of the packet number field is encoded in Packet Number Length field. The Protected Payload field is configured such that packets with a QUIC Short Header always include a 1-RTT protected payload. It is noted that the Header Form Bit field and the Connection ID field of a short header packet are version-independent. The remaining fields are specific to the selected QUIC version.

FIG. 53 depicts an example embodiment of a stack of QUIC frames for a QUIC packet for implementation of a reliable MPLS overlay as MPLS-in-QUIC. The payload of QUIC packets, after removing the QUIC Long or Short header, includes a sequence of complete frames. It is noted that, not all packet types include frames. The payload of a packet that includes frames will include at least one frame, and may include multiple frames and multiple frame types. It is noted that frames fit within a single QUIC packet and generally do not span multiple packets. As depicted in FIG. 53, each frame begins with a Frame Type, indicating its type, followed by additional type-dependent fields. QUIC defines several frame types, one of which is the STREAM frame (Type 8) which carries the data of a stream in the QUIC connection. The format of the STREAM frame is presented in FIG. 54.

FIG. 54 depicts an example embodiment of a STREAM frame for a QUIC packet for implementation of a reliable MPLS overlay as MPLS-in-QUIC. The STREAM frame 5400 includes a Stream ID field, an Offset field, a Length field, and a Stream Data field. The Stream ID field includes a variable-length integer indicating the stream ID of the stream. The Offset field includes a variable-length integer specifying the byte offset in the stream for the data in this STREAM frame. This field is present when the OFF bit is set to 1. When the Offset field is absent, the offset is 0. The Length field includes a variable-length integer specifying the length of the Stream Data field in this STREAM frame. The Stream Data field includes the bytes from the designated stream to be delivered. When a Stream Data field has a length of 0, the offset in the STREAM frame is the offset of the next byte that would be sent. The first byte in the stream has an offset of 0. The largest offset delivered on a stream—the sum of the offset and data length—does not exceed $2^{(62-1)}$, as it is not possible to provide flow control credit for that data. Receipt of a frame that exceeds this limit is treated as a connection error of type FRAME_ENCODING_ERROR or FLOW_CONTROL_ERROR.

It is noted that, during QUIC connection set-up, the endpoints negotiate the application protocol that would be transported atop QUIC.

In at least some embodiments, QUIC performs application negotiation by using the Application Layer Protocol Negotiation (ALPN) of TLS (since QUIC embeds TLS handshake during connection setup). As the name implies, ALPN is a TLS extension that introduces support for application protocol negotiation into the TLS handshake. For instances in which multiple application protocols are supported over QUIC, this extension allows the application layer to negotiate which application protocol will be used over the QUIC connection. In TLS, the ALPN extension type ("application_layer_protocol_negotiation(16)") may be defined as follows:

```
enum {
        application_layer_protocol_negotiation(16), (65535)
} ExtensionType;
opaque ProtocolName<1..2^8-1>;
struct {
        ProtocolName protocol_name_list<2..2^16-1>
} ProtocolNameList;
```

The "extension_data" field of the ("application_layer_protocol_negotiation(16)") extension includes a "ProtocolNameList" value. The "ProtocolNameList" includes the list of protocols advertised by the client, in descending order of preference. Protocols are named by IANA-registered, opaque, non-empty byte strings. The process is as follows: (1) the client appends a new ProtocolNameList field, including the list of supported application protocols, in the connection set-up message, (2) the server inspects the ProtocolNameList field and returns a ProtocolName field indicating the selected protocol as part of its response, and (3) the server may respond with only a single protocol name, and if it does not support any that the client requests, then it may choose to abort the connection. As a result, once the connection is complete, both the secure tunnel is established, and the client and server are in agreement as to which application protocol will be used, they can begin communicating immediately. The currently supported application protocol names are as follows: (a) HTTP/1.1 [HTTP]=>"http/1.1", (2) SPDY/1 [SPDY/1]=>"spdy/1", (3) SPDY/2 [SPDY/2]=>"spdy/2", and (4) SPDY/3 [SPDY/3]=>"spdy/3".

In at least some embodiments, QUIC performs application negotiation by using Multi-Layer Protocol Negotiation (MLPN). During connection set-up, negotiation between endpoints for multiplexing multiple user protocols over a QUIC connection, irrespective of their network layers. This negotiation is performed by the MLPN mechanism introduced into TLS, since QUIC embeds TLS handshake during connection set-up. The negotiated protocols can be transported in QUIC packets as payloads of novel GENERIC_STREAM frames. It is noted that the MLPN mechanism may be defined as follows. A new extension type ("multi_layer_protocol_negotiation(20)") is defined for TLS which may be included by endpoints to negotiate multi-protocol support during connection set-up.

```
enum {
     multi_layer_protocol_negotiation(20), (65535)
} ExtensionType;
opaque LayerName<1..2^8-1>;
struct {
     uint_16                protocol_list<2..2^16-1>;
} ProtocolList;
struct {
    LayerName            layer_name;
    ProtocolList         protocols;
} LayerProtocolList;
```

```
struct {
    LayerProtocolList layer_protocol_list <2..2^16-1>
} MultiLayerProtocolList;
```

The "extension_data" field of the ("multi_layer_protocol_negotiation(16)") extension contains a "MultiLayerProtocolList" value. The "LayerName" includes the name of the protocol layer. Protocol layers are named by opaque, non-empty byte strings. Empty strings are not included and byte strings are not truncated. The following layer names may be used: (1) Data Link Layer="dlink", (2) Network Layer="network". (3) Transport Layer="transport", (4) application layer protocols with standardized TCP ports="app/tcp", (5) application layer protocols with standardized SCTP ports="app/sctp", and (6) Application layer protocols with standardized UDP ports="app/udp". The "ProtocolList" includes a list of 16-bit values, wherein each value identifies a protocol. The value of the protocols is dependent on the layer for which the ProtocolList is applicable. The following layer-wise values of protocols may be used. For "dlink", the following protocol values may be used: (a) Ethernet=1, (b) PPP (Point-to-Point Protocol)=2, (c) HDLC (High-Level Data Link Control)=3, (d) IEEE 802.11 wireless LAN=4, (e) LLDP (Link Layer Discovery Protocol)=5, and (f) Frame Relay=6. For "network", the standardized Ethertype values may be used (such that all existing network layer protocols are automatically applicable in this extension). For "transport", the standardized Protocol Type values may be used (such that all existing transport layer protocols, as well as other user protocols of the network layer, are automatically applicable in this extension). For "app/tcp", the standardized TCP port numbers of the application protocols may be used. For "app/udp", the standardized UDP port numbers of the application protocols may be used. For "app/sctp", the standardized SCTP port numbers of the application protocols may be used. The usage of MLPN during QUIC connection set-up may be performed as follows: (1) in the connection set-up message, the client sends a MultiLayerProtocolList including the list of protocols it intends to transport over the QUIC connection, (2) the server inspects the MultiLayerProtocolList, resets the protocols that the server does not intend to support in the connection, and returns an updated MultiLayerProtocolList indicating the selected protocols as part of its response, and (3) if the server does not support any protocol that the client requests, then it may choose to abort the connection. As a result, once the connection is complete, both the secure tunnel is established, and the client and server are in agreement as to which protocols will be used, they can begin communicating immediately.

FIG. 55 depicts an example embodiment of a generic stream frame format for a QUIC packet. The generic stream frame format 5500 includes a Type field, a Flags field, a Layer field, a Protocol ID field, a Stream ID field, an Offset field, a Length field, and a Stream Data field. The Type field is an 8-bit field that is the common field for any QUIC frame that indicates the type of the frame. The current QUIC specification defines frame types with values from 0x00-0x1e. It will be appreciated that any available value (e.g., 0x20 or the like) may be allocated to indicate a GENERIC_STREAM frame. It is noted that, if standardized in IETF, then the value used to indicate a GENERIC_STREAM frame may be reserved in the QUIC protocol registry in IANA.

The Flags field is a 4-bit field that can carry a number of flags, including a HEADER bit, an OFF (Offset) bit, a LEN (Length) bit, and a FIN bit.

The HEADER bit (0x8) field is applicable when the payload (Stream Data field) is datagram oriented (e.g., Ethernet, IP, or the like). When set, it means that Stream Data starts with the beginning of a datagram (i.e., header of the protocol packet). If the HEADER bit is no set, then it means the Stream Data carries a fragment of a protocol packet. This also means multiple datagrams cannot be packed on a single frame. Since the streams in QUIC deliver the frames sequentially, it is not required to indicate offset of a fragment with respect to the original packet.

The OFF bit (0x4) field is set to indicate that there is an Offset field present. When the OFF bit is set to 1, the Offset field is present. When the OFF bit is set to 0, the Offset field is absent and the Stream Data starts at an offset of 0 (that is, the frame includes the first bytes of the stream, or the end of a stream that includes no data).

The LEN bit (0x2) field is set to indicate that there is a Length field present. If the LEN bit is set to 0, the Length field is absent, and the Stream Data field extends to the end of the packet. If the LEN bit is set to 1, the Length field is present.

The FIN bit (0x1) field is set on frames that include the final size of the stream. Setting this bit indicates that the frame marks the end of the stream.

The Layer Type field is a 4-bit field that indicates the layer of the protocol packet carried in the frame. It is noted that the following values may be defined: (1) 0x01=Data Link Layer, (2) 0x02=Network Layer, (3) 0x03=Transport Layer (it is noted that this also includes any non-transport protocols that run over Network Layer, (4) 0x04=Application Layer with TCP ports, which means it includes any application protocols that have standardized TCP port numbers, (5) 0x05=Application Layer with UDP ports, which means it includes any application protocols that have standardized TCP port numbers, and (6) 0x06=Application Layer with SCTP ports, which means that it includes any application protocols that have standardized TCP port numbers. It will be appreciated that any other suitable values may be used.

The Protocol ID field is a 16-bit field that indicates the protocol within the Layer Type. The values are dependent on the Layer Type field.

For example, when Layer Type is Data Link Layer (0x01) then values in this field may defined as follows: (a) Ethernet=1, (b) PPP (Point-to-Point Protocol)=2, (c) HDLC (High-Level Data Link Control)=3, (d) IEEE 802.11 wireless LAN=4, (e) LLDP (Link Layer Discovery Protocol)=5, and (f) Frame Relay=6. It will be appreciated that other data link layer protocols not included in the above list may be assigned values in the range 7-65535. It will be appreciated that other suitable values may be used.

For example, when the Layer Type is Network Layer (0x02) then values in this field may be set according to the standardized values for Ethertypes as defined in IANA. It will be appreciated that other suitable values may be used.

For example, when the Layer Type is Transport Layer (0x03) then values in this field may be set according to the standardized values for IP Numbers. It will be appreciated that other suitable values may be used.

The Stream ID field that includes a variable-length integer indicating the stream ID of the stream.

The Offset field is a variable-length integer specifying the byte offset in the stream for the data in this GENERIC_STREAM frame. This field is present when the OFF bit is set to 1. When the Offset field is absent, the offset is 0.

The Length field is a variable-length integer specifying the length of the Stream Data field in this GENERIC_STREAM frame. This field is present when the LEN bit is set to 1. When the LEN bit is set to 0, the Stream Data field consumes the remaining bytes in the packet.

The Stream Data field is a variable length field that includes the bytes from the designated stream to be delivered. If the HEADER bit is set then, in the case of Ethernet Packet it starts with the Ethernet Header, in the case of IPv4 packet it starts with the IP Header, and so forth.

Various example embodiments may be configured to support the following methods for MPLS-in-QUIC.

Various example embodiments for supporting MPLS-in-QUIC may be configured such that, during connection set-up, the LSR acting as the client uses MLPN to negotiate MPLS-in-QUIC by including at least the following protocol in MultiLayerProtocolList: a LayerProtocolList entry with LayerProtocolList→layer_name "network" and LayerProtocolList→protocols including the Ethertype value for MPLS (e.g., 0x8847).

Various example embodiments for supporting MPLS-in-QUIC may be configured such that each MPLS overlay is transported as an independent stream in the QUIC connection. A packet from an MPLS overlay is carried as the payload of a GENERIC_STREAM frame, wherein the "Layer" field in the frame is encode with the value 0x02 (network layer) and Protocol ID field is encoded with the Ethertype value for MPLS (e.g., 0x8847). The "Stream ID" field is encoded with the Stream ID assigned to the MPLS overlay. The Header bit in the Flags field may be set to 0 to indicate the payload as stream-oriented since MCH is included in the stream that demarcates a MPLS packet in the payload; however, an implementation also may exclude MCH in case in which the Header bit is set according to the defined rules to demarcate a MPLS packet in the payload. With this method, multiple MPLS overlays between two LSRs may be multiplexed over a QUIC connection between the two LSRs. It is note that the Stream ID space is local to the LSR, so each LSR can independently allocate an unused Stream ID from its local space. The LSR that sends an MPLS overlay packet over the QUIC connection uses its assigned Stream ID in corresponding data chunks in QUIC packet. It is noted that, for a receiving LSR, there is no correlation between the Stream ID of a received data chunk to the corresponding MPLS overlay since the LSR identifies the overlay based on the MPLS Label Stack of the MPLS packet in the payload of data chunk. It is further noted that a Stream ID value 0 is not expected to be used to transport MPLS packets for an MPLS overlay as it may be reserved by both LSRs for bulk management of all MPLS overlays multiplexed on the QUIC connection (e.g., for management of the MOIF or to perform other management functions).

Figure 56:
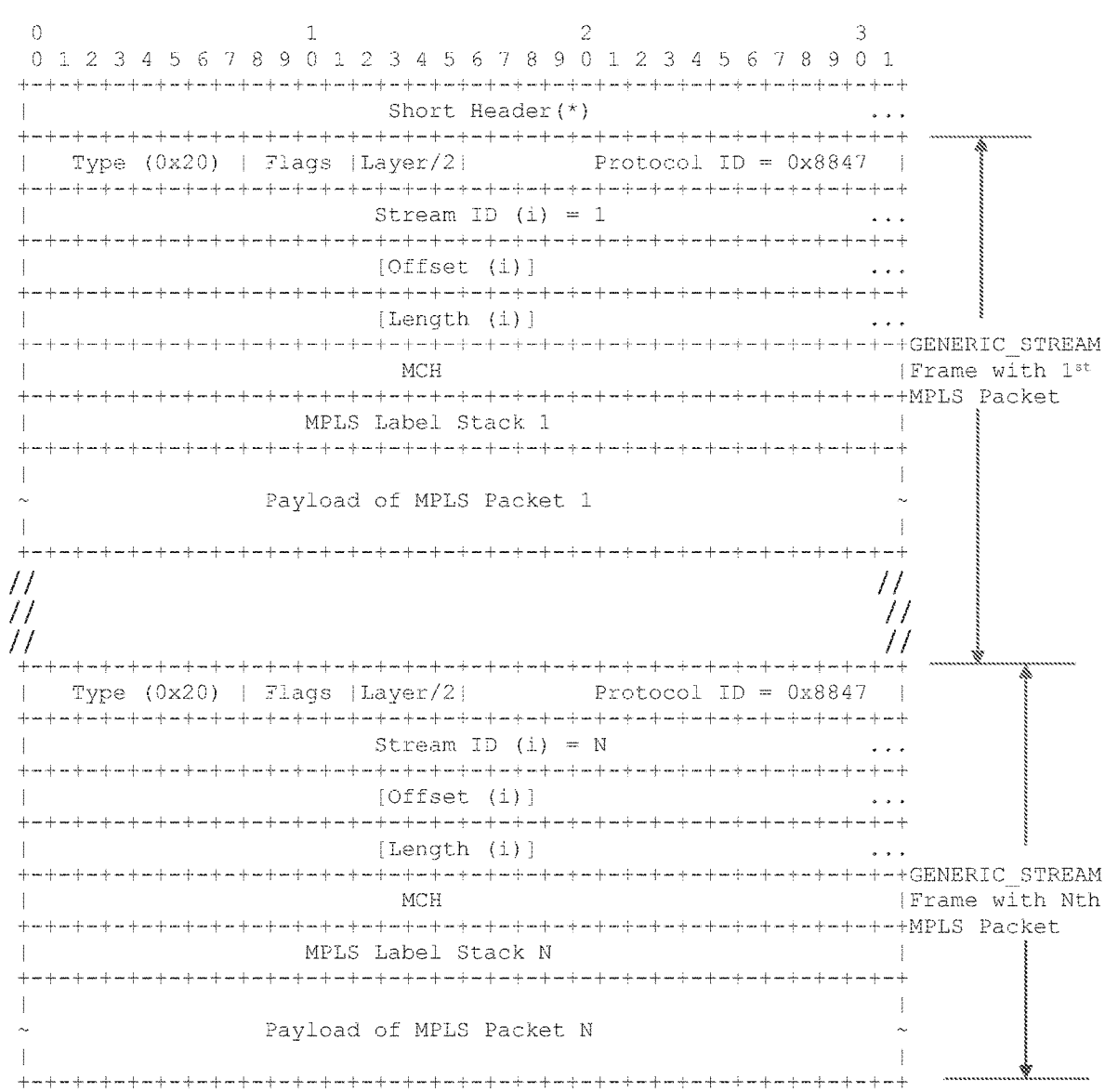
FIG. 56 depicts an example embodiment of a QUIC packet that multiplexes N MPLS overlay packets.

FIG. 56 depicts an example embodiment of a QUIC packet that multiplexes N MPLS overlay packets. It is noted that the QUIC packet 5600 of FIG. 56 implements the conceptual format of FIG. 50. In FIG. 56, Stream IDs are assigned integer values 1 to N, respectively.

Various example embodiments include methods to configure a QUIC connection for MPLS-in-QUIC. When an LSR discovers that a new QUIC connection needs to be established to a remote LSR for tunneling of MPLS overlay packets, the LSR (1) determines at least one IP address of the remote LSR to which the QUIC connection is to be made (it is noted that, during the lifetime of a QUIC connection, QUIC packets may be exchanged between any pair of IP addresses within a pool of IP addresses at the LSRs) and (2)

determines QoS information which may be used for appropriate QoS markings in the IP header that encapsulates an QUIC packet.

Figure 57:
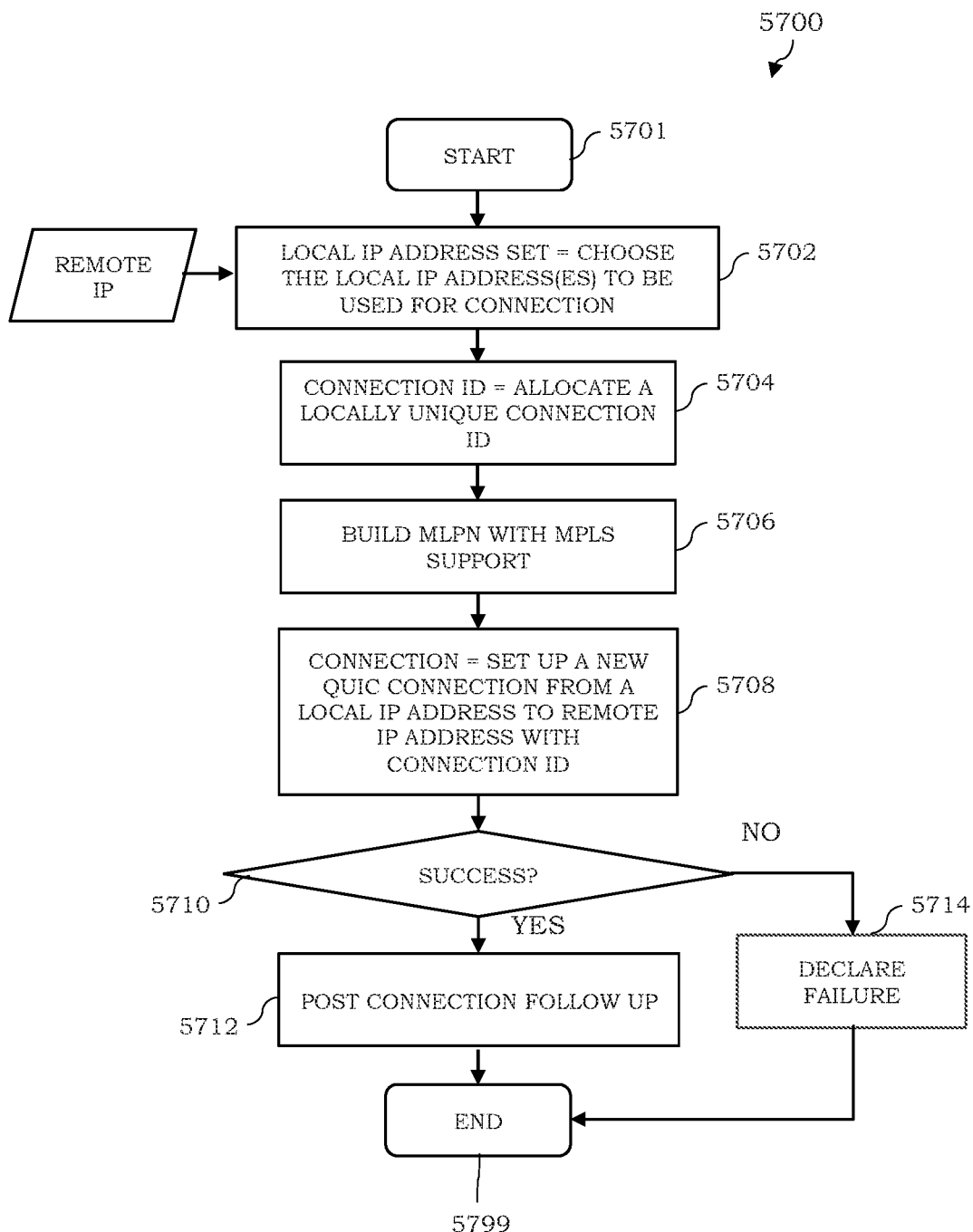
FIG. 57 depicts an example embodiment of a method for configuring a QUIC connection for MPLS-in-QUIC.

FIG. 57 depicts an example embodiment of a method for configuring a QUIC connection for MPLS-in-QUIC. The method 5700 may be based on the generic method 1600 presented in FIG. 16. It will be appreciated that, although primarily presented as being performed serially, at least a portion of the blocks of method 5700 may be performed contemporaneously or in a different order than as presented in FIG. 57. At block 5701, the method 5700 begins. Block 5702 chooses one or more configured local IP addresses that can be used for sending and receiving tunnel traffic and the method 5700 then proceeds to block 5704. Block 5704 allocates a local Connection ID to be used for the new connection, such that the number is not currently used by another existing QUIC connection, and the method 5700 then proceeds to block 5706. Block 5706 builds the MLPN to be included in the TLS message embedded in the connection request. The MLPN includes the support for protocol ID MPLS(=0x8847) in layer "network" and the method 5700 then proceeds to block 5708. Block 5708 generates a QUIC connect request with a Connection ID from one of the local IP addresses to the remote IP address. The QUIC connection request is a QUIC packet that carries data for cryptographic handshake and MLPN. The QUIC connection request is sent over a UDP packet. In the UDP packet, the local port number is set to any random value and the destination port number is set to 80, 443, or a value administratively chosen for the entire network to identify QUIC as the user protocol. It is noted that, if the QUIC connect request is rejected by the remote LSR, then the LSR should act to limit unnecessary repetition attempts to establish the connection. For example, the LSR might wait 60 seconds before trying to re-establish the connection. From block 5708, the method 5700 proceeds to block 5710. Block 5710 checks if the QUIC connect request is accepted by the remote LSR (means success). If the QUIC connect request is accepted by the remote LSR (success), this LSR will receive a handshake from the remote LSR that includes the Connection ID allocated by the remote LSR for the connection. If the QUIC connect request is accepted by the remote LSR (success) then the method 5700 proceeds to block 5712, otherwise the method 5700 proceeds to block 5714. Block 5714 declares failure to configure the connection, and then the method 5700 proceeds to block 5799 where the method 5700 ends. Block 5712 performs post connection follow-ups, if any, and the method 5700 then proceeds to block 5799 where the method 5700 ends. At block 5799, the method 5700 ends.

Figure 58:
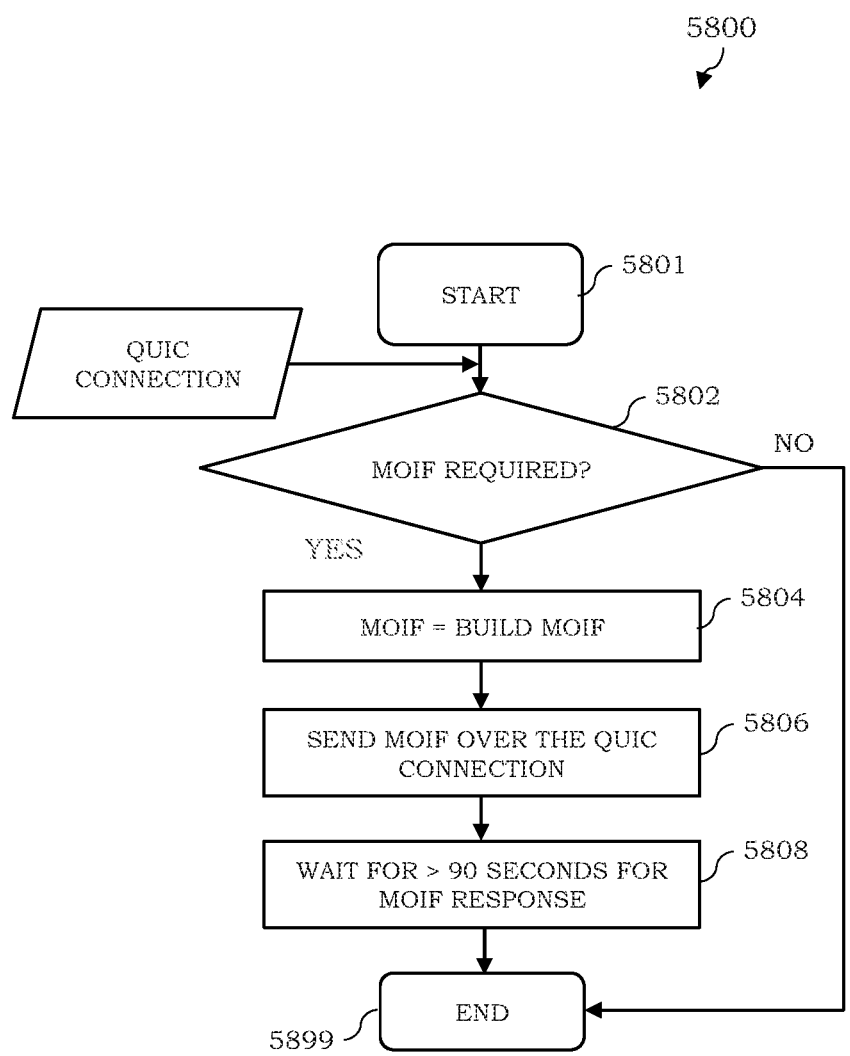
FIG. 58 depicts an example embodiment of a method for performing post connection follow-up for a QUIC connection for MPLS-in-QUIC.

FIG. 58 depicts an example embodiment of a method for performing post connection follow-up for a QUIC connection for MPLS-in-QUIC. It is noted that the method 5800 may be performed by the LSR that initiates the QUIC connection. The method 5800 may be used to provide block 5712 of method 5700 of FIG. 57. The method 5800 may be based on the generic method 1400 presented in FIG. 14. It will be appreciated that, although primarily presented as being performed serially, at least a portion of the blocks of method 5800 may be performed contemporaneously or in a different order than as presented in FIG. 58. The input to method 5800 includes the QUIC connection that has become operational. At block 5801, the method 5800 begins. Block 5802 checks if the requirement of MOIF is configured in the LSR. If the requirement of MOIF is configured in the LSR, then the method 5804 proceeds to block 5804, otherwise the method 5800 proceeds to block 5899 where the method 5800 ends. Block 5804 builds a MOIF and fills the necessary fields. It is noted that block 5804 may be implemented by the method 6000 of FIG. 60. From block 5804, the method 5800 proceeds to block 5806. Block 5806 sends the MOIF over the QUIC connection. The MOIF is sent as payload of a GENERIC_STREAM frame in a QUIC packet, wherein the value in the Stream ID field is encoded as 0. The Layer Type field is encoded with the value 0x02 for network layer and the Protocol ID is encoded with the value 0x8847 for MPLS. From block 5806, the method 5800 then proceeds to block 5808. Block 5808 waits for a MOIF response from peer LSR. For example, the LSR may wait for a MOIF response for at least 90 seconds or for any other suitable length of time. In order to wait, the LSR may start a timer for a duration within which it expects a MOIF response, and associate the timer with the QUIC connection. From block 5808, the method 5800 then proceeds to block 5899 where the method 5800 ends. It is noted that, when the initiating LSR receives a MOIF response from the peer LSR, it may execute the method 1700 of FIG. 17. It is noted that determination of a received packet on the connection as MOIF may be made as part of the general processing of MPLS overlay packets on the QUIC connection, which is described in blocks 6602-6618 of method 6600 of FIG. 66. At block 5899, the method 5800 ends.

Figure 59:
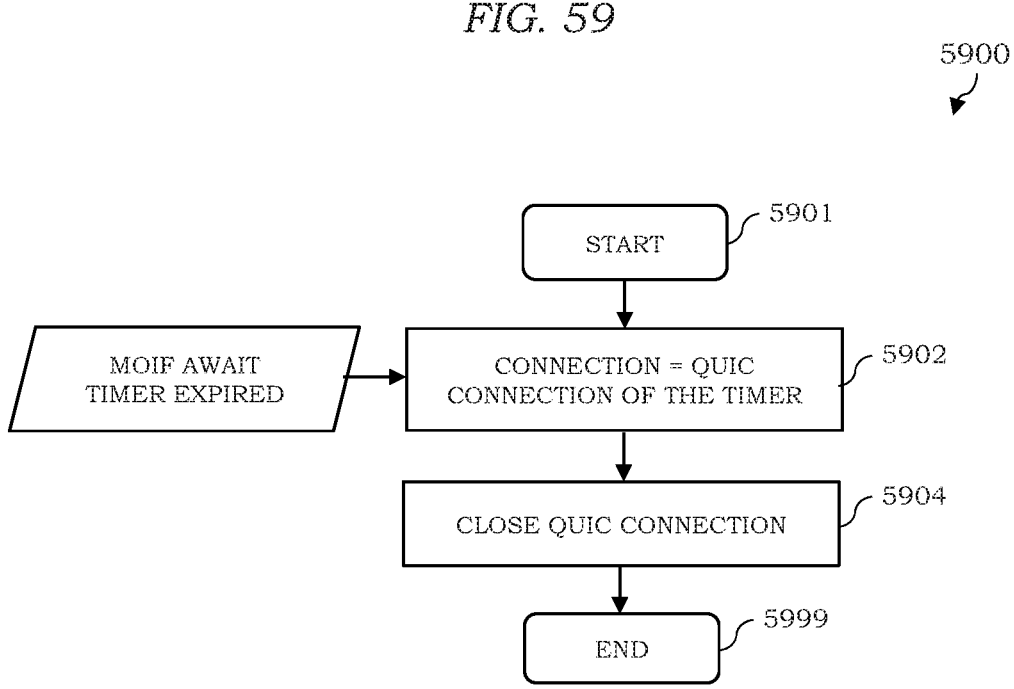
FIG. 59 depicts an example embodiment of a method for use when a MOIF response is not received within a predefined time period for a QUIC connection.

FIG. 59 depicts an example embodiment of a method for use when a MOIF response is not received within a predefined time period for a QUIC connection. It is noted that the situation in which an initiating LSR fails to receive a MOIF response within a predefined time period may be determined where the timeout set at block 5808 of FIG. 58 expires without the MOIF response being received. It will be appreciated that, although primarily presented as being performed serially, at least a portion of the blocks of method 5900 may be performed contemporaneously or in a different order than as presented in FIG. 59. The input to method 5900 includes a notification that the MOIF await timer has expired. At block 5901, the method 5900 begins. Block 5902 retrieves the QUIC connection with the timer and the method 5900 then proceeds to block 5904. Block 5904 closes the QUIC connection, and the method 5900 then proceeds to block 5999 where the method 5900 ends. At block 5999, the method 5900 ends.

Figure 60:
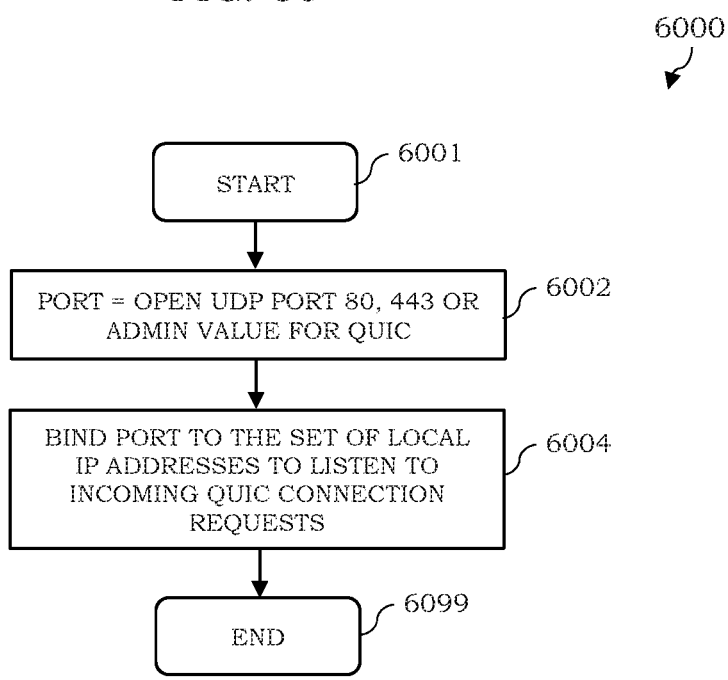
FIG. 60 depicts an example embodiment of a method for configuring a QUIC connection listener.

FIG. 60 depicts an example embodiment of a method for configuring a QUIC connection listener. It is noted that the method 6000 may be used by an LSR to listen to QUIC connection requests for MPLS-in-QUIC (e.g., listening for new QUIC connection requests for MPLS as the user protocol). It is noted that MPLS-in-QUIC connection listeners may be implemented by any LSRs that configure MPLS overlays. The method 6000 may be based on the generic method 1800 presented in FIG. 18. It will be appreciated that, although primarily presented as being performed serially, at least a portion of the blocks of method 6000 may be performed contemporaneously or in a different order than as presented in FIG. 60. At block 6001, the method 6100 begins. Block 6002 opens the UDP port 80, 443 or a network wide administratively configured value to identify QUIC as the user protocol, and the method 6000 then proceeds to block 6004. Block 6004 binds the port to the set of local IP addresses in the LSR chosen for QUIC connections and then starts listening to incoming QUIC connection requests to the port on any one of the IP addresses. From block 6004, the method 6000 proceeds to block 6099 where the method 6000 ends. At block 6099, the method 6000 ends.

Figure 61:
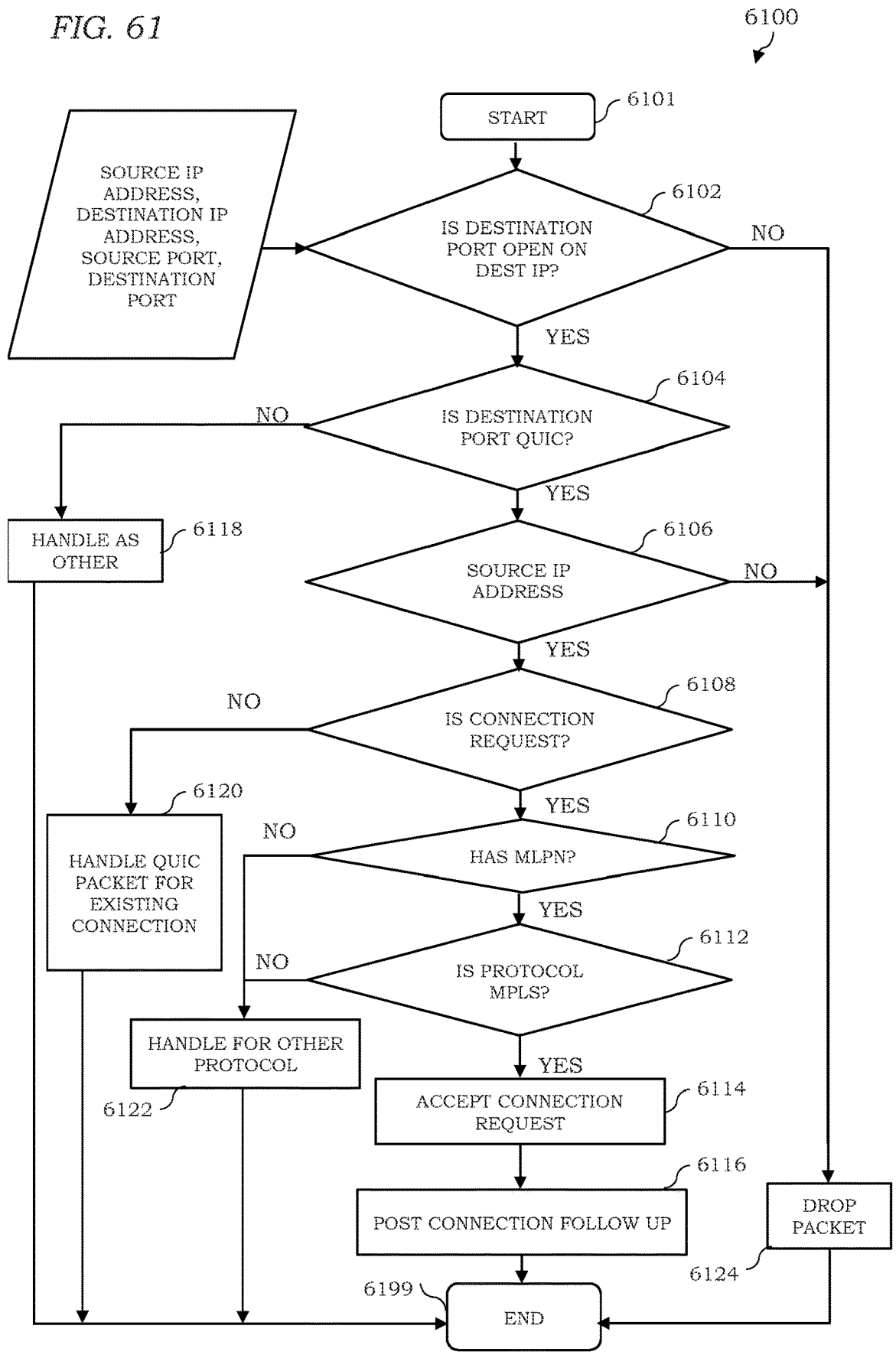
FIG. 61 depicts an example embodiment of a method for processing incoming QUIC connection requests.

FIG. 61 depicts an example embodiment of a method for processing incoming QUIC connection requests. It is noted that the incoming connection requests may be received on the UDP port for QUIC. The method 6100 may be based on the generic method 1900 presented in FIG. 19. It will be appreciated that, although primarily presented as being performed serially, at least a portion of the blocks of method 6100 may be performed contemporaneously or in a different order than as presented in FIG. 61. The inputs to method 6100 include the UDP packet with the following associated parameters: (1) source IP address, which is the IP address of the remote LSR that sent the request, (2) destination IP address, which is a local IP address of this LSR to which the packet is sent, (3) source port, which is the UDP port at the remote LSR, and (4) destination port, which is the UDP port at this LSR to which the packet is sent. At block 6101, the method 6100 begins. Block 6102 checks if UDP in the LSR is ready to receive packets on the destination port at the Destination IP address. If UDP in the LSR is not ready to receive packets on the destination port at the Destination IP address the method 6100 proceeds to block 6124, otherwise the method 6100 proceeds to block 6104. Block 6124 drops the packet, and the method 6100 then proceeds to block 6199 where the method 6100 ends. Block 6104 checks if the UDP destination port indicates the user protocol as QUIC (e.g., the port is 80, 443, or an administratively configured value (if any)). If the UDP destination port does not indicate the user protocol as QUIC then the method 6100 proceeds to block 6118, otherwise the method 6100 proceeds to block 6106. Block 6118 handles the payload of the UDP packet as per the user protocol associated with the port. From block 6118, the method proceeds to block 6199 where the method 6100 ends. Block 6106 checks if a QUIC Packet is allowed from the remote LSR (e.g., from the source IP address). It is noted that various factors may be used to determine whether an LSR should allow a QUIC Packet from an IP address. For example, the LSR may employ a method to discover all potential remote LSRs and sets of their local IP addresses that may participate in QUIC connection for MPLS overlays with the LSR. If a QUIC packet is not allowed from the remote LSR then the method 6100 proceeds to block 6124, otherwise the method 6100 proceeds to block 6108. Block 6124 drops the QUIC packet, and the method 6100 then proceeds to block 6199 where the method 6100 ends. Block 6108 checks if the QUIC packet carries a connection request (e.g., this determination may be made as per the QUIC specification). If the QUIC packet carries a connection request then the method 6100 proceeds to block 6110, otherwise the method 6100 proceeds to block 6120. Block 6120 handles the packet as QUIC packet for an existing connection, and the method 6100 then proceeds to block 6199 where the method 6100 ends. Block 6110 checks if the connection request includes MLPN, which will be the case if the connection request is made by remote LSR as per various embodiments presented herein (e.g., by the method 5700 of FIG. 57 implemented by the LSR making a connection request). If the connection request does not include MLPN, then the method 6100 proceeds to block 6122, otherwise the method 6100 proceeds to block 6112. Block 6122 handles the connection request. Block 6112 checks if MLPN includes the support for MPLS (e.g., layer type "network" and protocol 0x8847). It is noted that MPLS will be supported, if the connection request is made by remote LSR as per various embodiments presented herein (e.g., by the method 5700 of FIG. 57 implemented by the LSR making a connection request). If MPLS is not supported in MLPN then the method 6100 proceeds to block 6122, otherwise the method 6100 proceeds to block 6114. Block 6122 handles the connection request. Block 6114 accepts the request for a new QUIC connection. It is noted that block 6114 may be implemented as per the server procedures for new connections in the QUIC specification, such as where a local connection ID is allocated for the connection, state of the connection is created with the tuple {local connection ID, remote connection ID received in the QUIC packet of the connection request}, and the LSR sends a response to remote LSR with the negotiated encryption, authentication keys, and other connection parameters. From block 6114, the method 6100 proceeds to block 6116. At block 6116, the post connection follow-ups, if any, are performed. It is noted that 6116 may be implemented by the method 2000 of FIG. 20, which makes the LSR wait for MOIF from the per LSR, if configured to receive a MOIF. It is noted that the determination of a received packet on the connection as MOIF may be made as part of the general processing of MPLS overlay packets on the association (e.g., using blocks 6602-6616 of method 6600 of FIG. 66). It is noted that, if the LSR fails to receive a MOIF within a predefined time period (e.g., the timeout set at block 2004 in method 2000 of FIG. 20 expires), then the LSR may executes the method 5900 of FIG. 59 (e.g., then handling is common in both the initiating and receiving LSRs). It is noted that, when MOIF is received from the peer LSR, the LSR may execute the method 2100 of FIG. 21. From block 6116, the method 6100 proceeds to block 6199 where the method 6100 ends. At block 6199, the method 6100 ends.

Various example embodiments include methods to configure an MPLS-in-QUIC overlay by an LSR to a remote LSR. The LSR, to configure an MPLS-in-QUIC overlay, assigns to the overlay a unique, non-zero stream ID on the QUIC connection to the remote LSR. It is noted that the stream ID space is local to LSR, so each LSR can independently allocate an unused stream ID from its local space. The LSR that plays the role of client in the QUIC connection allocates even-numbered stream IDs and the LSR that plays the role of server in the QUIC connection allocates odd-numbered stream IDs. The LSR that sends an MPLS overlay packet over the QUIC connection uses its locally assigned stream ID in corresponding GENERIC_STREAM frames in the QUIC packet. For a receiving/remote LSR, there is no correlation between the stream ID of a received GENERIC_STREAM frame to the corresponding MPLS overlay since the LSR identifies the overlay based on the MPLS label stack of the MPLS packet in the payload of data chunk.

Figure 62:
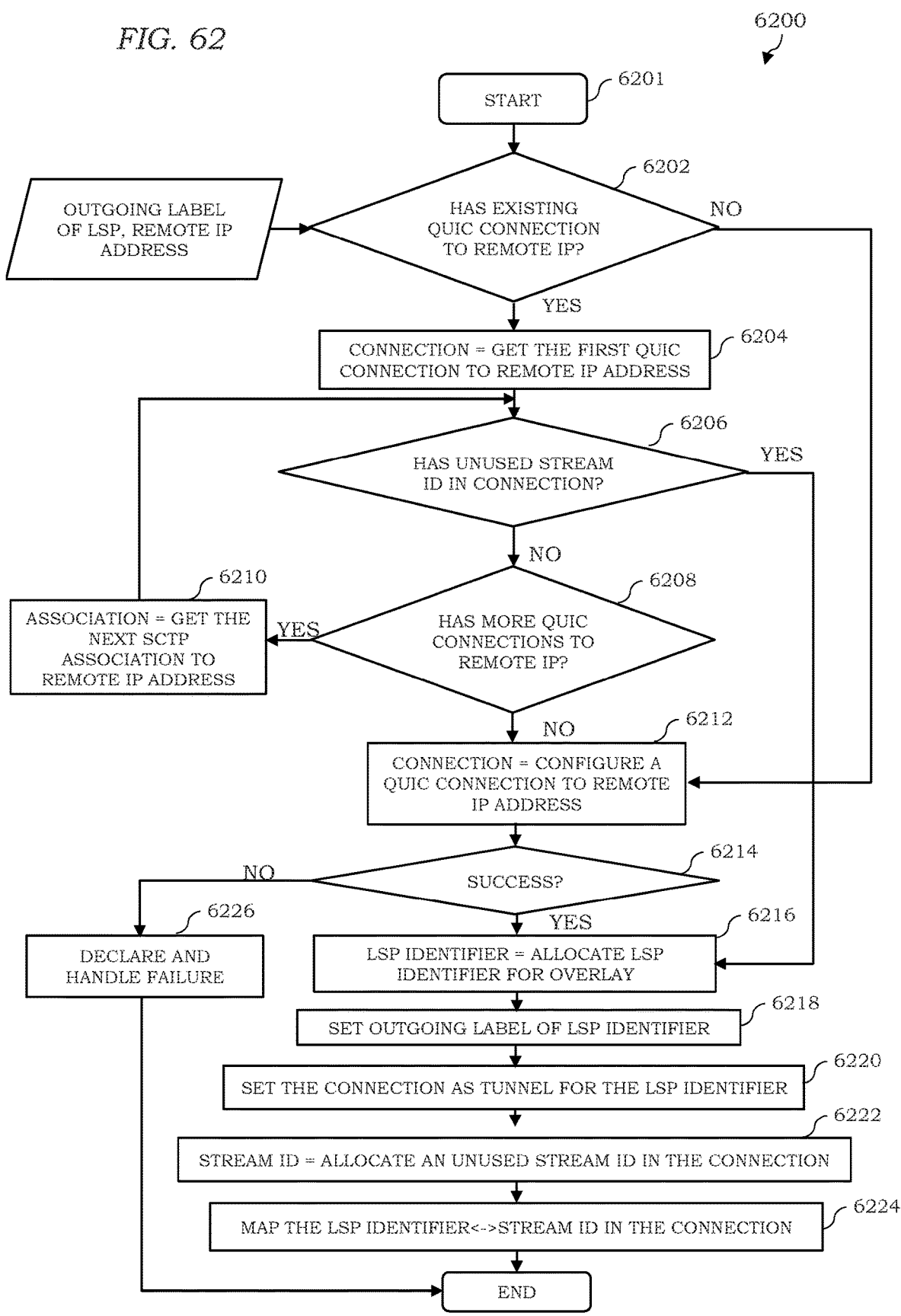
FIG. 62 depicts an example embodiment of a method for configuring an MPLS overlay over a QUIC connection to form an MPLS-in-QUIC overlay.

FIG. 62 depicts an example embodiment of a method for configuring an MPLS overlay over a QUIC connection to form an MPLS-in-QUIC overlay. It is noted that, when an LSR is going to set up an MPLS-in-QUIC overlay to a remote LSR, it determines the IP address of the remote LSR to which the QUIC connection is to be made and then determines QUIC connection parameters and QoS information for the QUIC connection. The method 6200 may be based on the generic method 2200 presented in FIGS. 22A-22B. It will be appreciated that, although primarily presented as being performed serially, at least a portion of the blocks of method 6200 may be performed contemporaneously or in a different order than as presented in FIG. 62. The inputs to method 6200 include the outgoing MPLS label of the LSP/overlay and an IP address of the remote LSR of the LSP/overlay. At block 6201, the method 6200 begins. Block 6202 checks if there is an existing QUIC connection to the remote LSR for MPLS-in-QUIC. If there is no existing QUIC connection to the remote LSR for MPLS-in-QUIC, then the method 6200 proceeds to block 6212, otherwise the method 6200 proceeds to block 6204. Block 6204 retrieves the first QUIC connection to the remote LSR for MPLS-in-QUIC, and the method 6200 then proceeds to block 6206. Block 6206 checks if there is at least one unused non-zero Stream ID available in the connection. If at least one unused non-zero Stream ID is available, then this connection can be used for the overlay and the method 6200 proceeds to block 6216, otherwise this connection cannot be used for the overlay and the method 6200 proceeds to block 6208. Block 6208 checks if there are more QUIC connections to the remote LSR for MPLS-in-QUIC. If there are more QUIC connections to the remote LSR for MPLS-in-QUIC, then the method 6200 proceeds to block 6210, otherwise the method 6200 proceeds to block 6212. Block 6212 retrieves the next QUIC connection to the remote LSR for MPLS-in-QUIC, and the method 6200 then returns to block 6206 to evaluate feasibility of the next connection as a tunnel for the overlay. Block 6212 configures a new QUIC connection to the remote LSR for MPLS-in-QUIC. It is noted that the block 6212 may be implemented by the method 5700 of FIG. 57. From block 6212, the method 6200 proceeds to block 6214. Block 6214 checks if the connection has been set-up successfully. If the connection has not been set up successfully, then the method 6200 proceeds to block 6226, otherwise the method 6200 proceeds to block 6216. Block 6226 declares and handles the failure to configure the MPLS overlay. Block 6216 allocates an LSP identifier to uniquely identify the MPLS overlay in the LSR. The LSP identifier binds the QUIC connection, outgoing label(s), and other parameters associated with the MPLS overlay. From block 6216, the method 6200 then proceeds to block 6218. Block 6218 sets the outgoing MPLS label of the LSP/overlay as the outgoing label of the LSP identifier, and the method 6200 then proceeds to block 6220. Block 6220 sets the QUIC connection as the tunnel associated with the LSP identifier, and the method 6200 then proceeds to block 6222. Block 6222 allocates an unused Stream ID in the connection as the identifier for the stream to be used to exchange packets for the overlay. From block 6222, the method 6200 proceeds to block 6224. Block 6224 creates a mapping between LSP identifier and the Stream ID of the overlay. From block 6224, the method proceeds to block 6299 where the method 6200 ends. At block 6299, the method 6200 ends.

Figure 63:
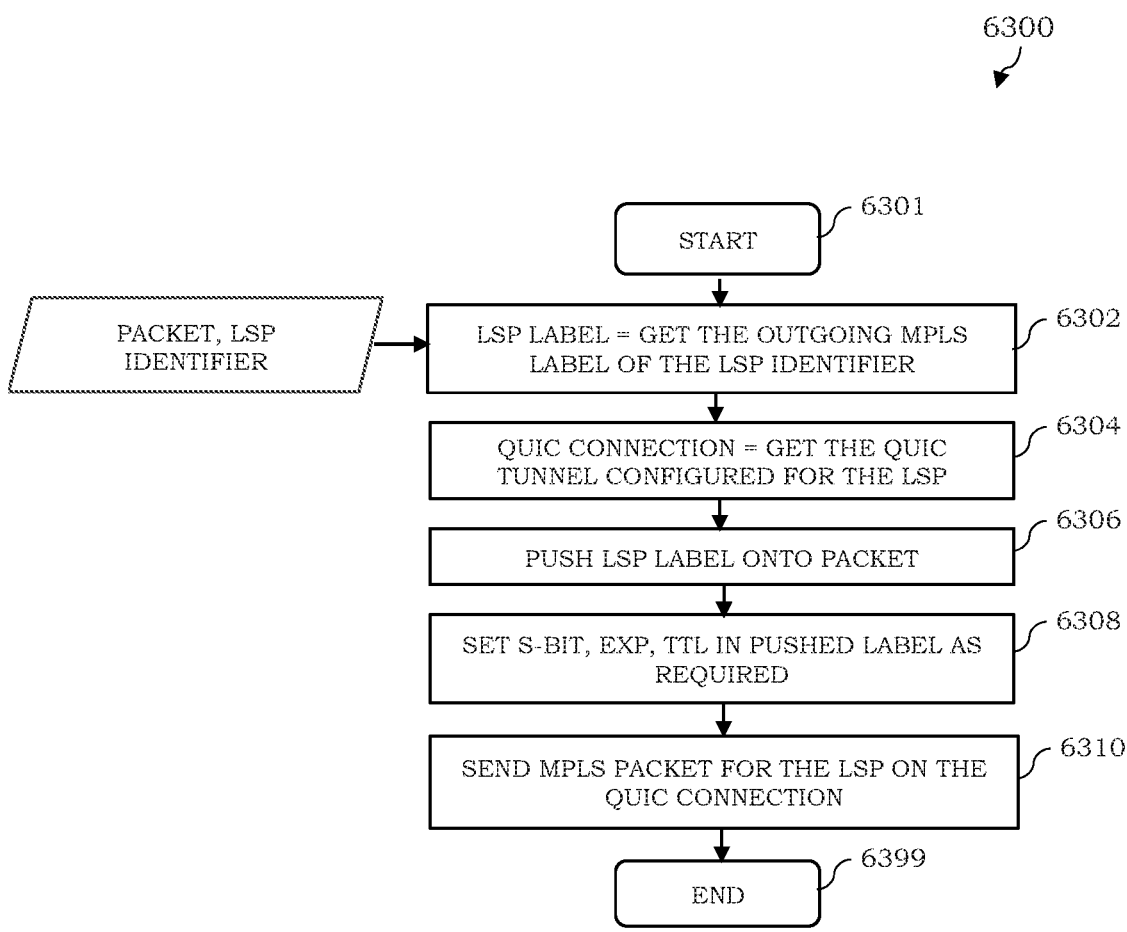
FIG. 63 depicts an example embodiment of a method for transmitting a packet on MPLS-in-QUIC.

FIG. 63 depicts an example embodiment of a method for transmitting a packet on MPLS-in-QUIC. The method 6300 may be based on the generic method 2300 presented in FIG. 23 (except that block 2310 may not be implemented as there are no dynamic parameters for the QUIC headers in MPLS-in-QUIC packets). It will be appreciated that, although primarily presented as being performed serially, at least a portion of the blocks of method 6300 may be performed contemporaneously or in a different order than as presented in FIG. 63. The inputs to method 6300 include the packet to be transmitted and the LSP identifier that identifies the LSP or the MPLS overlay. At block 6301, the method 6300 begins. Block 6302 retrieves the state of the outgoing label of the LSP by the LSP identifier, and the method 6300 then proceeds to block 6304. Block 6304 gets the QUIC tunnel configured for the LSP Identifier, which is the reliable transport layer connection, and the method 6300 then proceeds to block 6306. Block 6306 pushes the outgoing label of the LSP onto the packet, and the method 6300 then proceeds to block 6308. Block 6308 sets the S-bit, EXP, and TTL fields in the pushed label as needed for the packet. For example, if the packet already had another label before pushing the outgoing label of the LSP, then the S-bit is set to 0, otherwise the S-bit is set to 1. The TTL and EXP values may be set by a policy configured for the LSP. For example, if the policy says to use a consistent EXP value for all packets on the LSP, then the configured EXP value is set. If the policy has mapping of the EXP values based on the certain fields in the native header of the packet then the mapped EXP value is set. From block 6308, the method 6300 proceeds to block 6310. Block 6310 sends the MPLS packet on the QUIC connection, and the method 6300 then proceeds to block 6399 where the method 6300 ends. At block 6399, the method 6300 ends.

Figure 64:
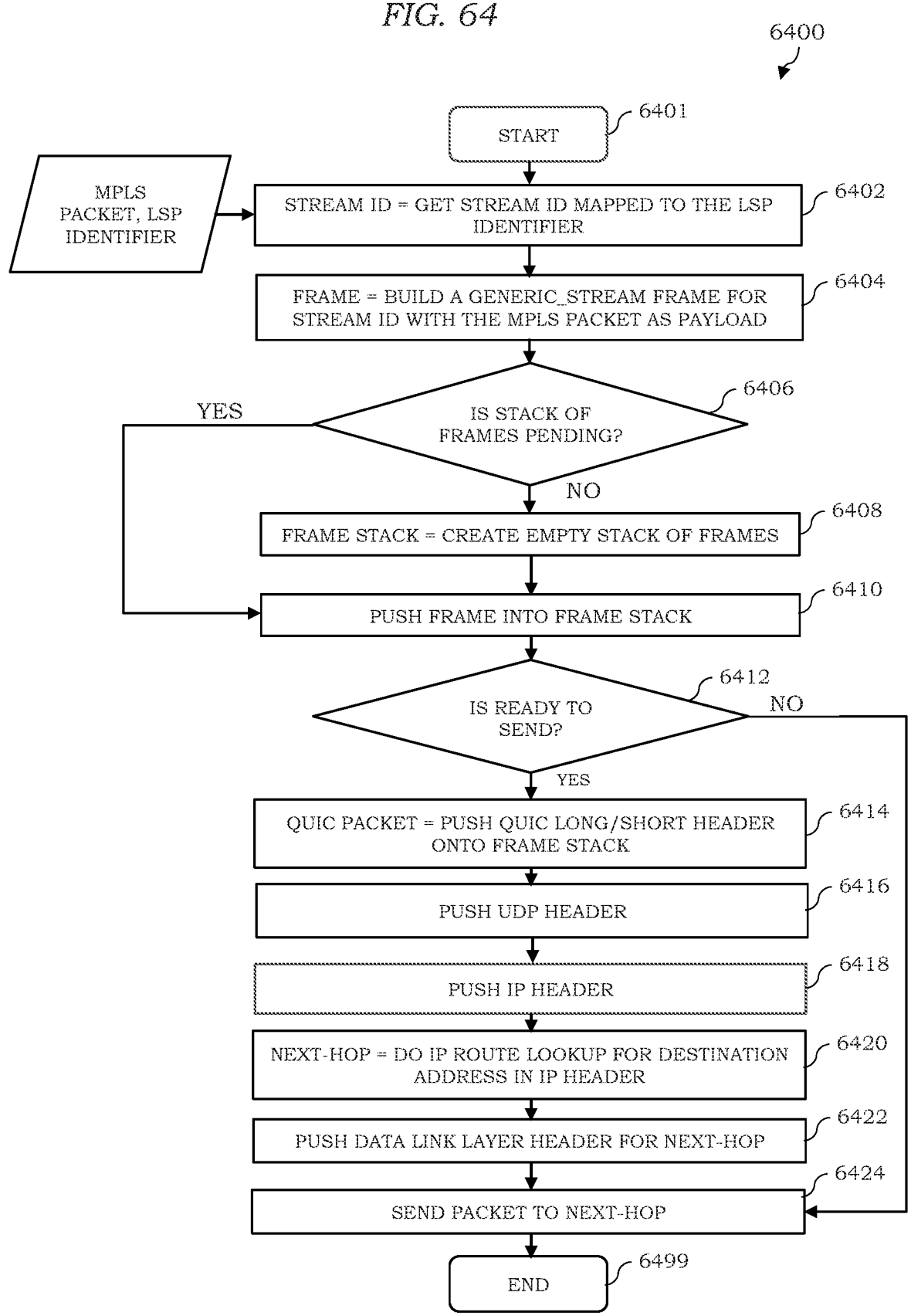
FIG. 64 depicts an example embodiment of a method for transmitting an MPLS packet on a QUIC connection.

FIG. 64 depicts an example embodiment of a method for transmitting an MPLS packet on a QUIC connection. The method 6400 may be used to provide block 6310 of method 6300 of FIG. 63 and may be based on the generic method 2400 presented in FIG. 24 (except that there are no dynamic parameters for the QUIC headers). It will be appreciated that, although primarily presented as being performed serially, at least a portion of the blocks of method 6400 may be performed contemporaneously or in a different order than as presented in FIG. 64. The inputs to method 6400 include the MPLS packet to be transmitted and the LSP identifier that identifies the LSP or the MPLS overlay. At block 6401, the method 6400 begins. Block 6402 retrieves the Stream ID mapped to the LSP identifier of the MPLS overlay, and the method 6400 proceeds to block 6404. 6404 builds a GENERIC_STREAM frame for the Stream ID with the MPLS packet as its payload and the method 6400 then proceeds to block 6406. Block 6406 checks if one or more frames are pending to be sent on the QUIC connection. Since QUIC may bundle multiple frames on a single QUIC packet, it is possible that previous frames may have been queued up and are yet to be sent. Secondly, previous frames may also be pending due to congestion, flow control, or the like. If no frames are pending then the method 6400 proceeds to block 6408, otherwise the method 6400 proceeds to block 6410. Block 6408 creates an empty stack of frames and the method 6400 then proceeds to block 6410. Block 6410 pushes the GENERIC_STREAM frame (including the MPLS packet) into the stack of frames, and the method 6400 then proceeds to block 6412. Block 6412 checks if the stack of frames is ready to be sent over the QUIC connection. It is possible that the stack of frames may not be sent immediately due to congestion, flow control, or the like, or the LSR could be waiting for more frames within a time window to send an optimally-sized QUIC packet. If the stack of frames is not yet ready to be sent then the stack of frames will be sent later when ready, so the method 6400 proceeds to block 6499 where the method 6400 ends (e.g., until a later time when method 6400 may be re-executed). If the stack of frames is ready to be sent, then the method 6400 proceeds to block 6414. Block 6414 pushes the QUIC Header (e.g., the QUIC Long Header or the QUIC Short Header as deemed appropriate for the connection) for the connection onto the stack of frames. This results in a complete QUIC packet. The Destination Connection ID field in the QUIC Header is filled as per the Connection IDs negotiated in the connection. It is noted that blocks 6404-6414 may be performed by the QUIC layer in the LSR. From block 6414, the method 6400 proceeds to block 6416. Block 6416 pushes the UDP header onto the QUIC packet. The source port in UDP header may be a random value or may be a value based on an Equal Cost Multipath (ECMP) hash. The destination port in UDP header is set to indicate the QUIC packet as its payload, e.g., it could be 80, 443 or a network wide value chosen administratively. From block 6416, the method 6400 proceeds to block 6418. Block 6418 pushes the IP header onto the UDP packet. The source and destination address in the IP header are filled as per a pair of local and remote IP addresses in the QUIC connection (the addresses are provided by block 6414). The Protocol field (if IPv4 Header) or the Next Header field (if IPv6 Header) is set to 17 to indicate the payload as UDP. From block 614, the method 6400 proceeds to block 6420. Block 6420 performs an IP route table lookup for the destination address in the IP Header, which results in the next-hop for the packet, and the method 6400 then proceeds to block 6422. It is noted that blocks 6418-6420 may be performed by the IP layer in the LSR. Block 6422 pushes the Data Link Layer Header onto the IP packet, which is used to send the packet on the link to the next-hop. From block 6422, the method 6400 proceeds to block 6424. Block 6424 sends the packet on the wire to the next-hop, and the method 6400 then proceeds to block 6499 where the method 6400 ends. At block 6499, the method 6400 ends.

Figure 65A:
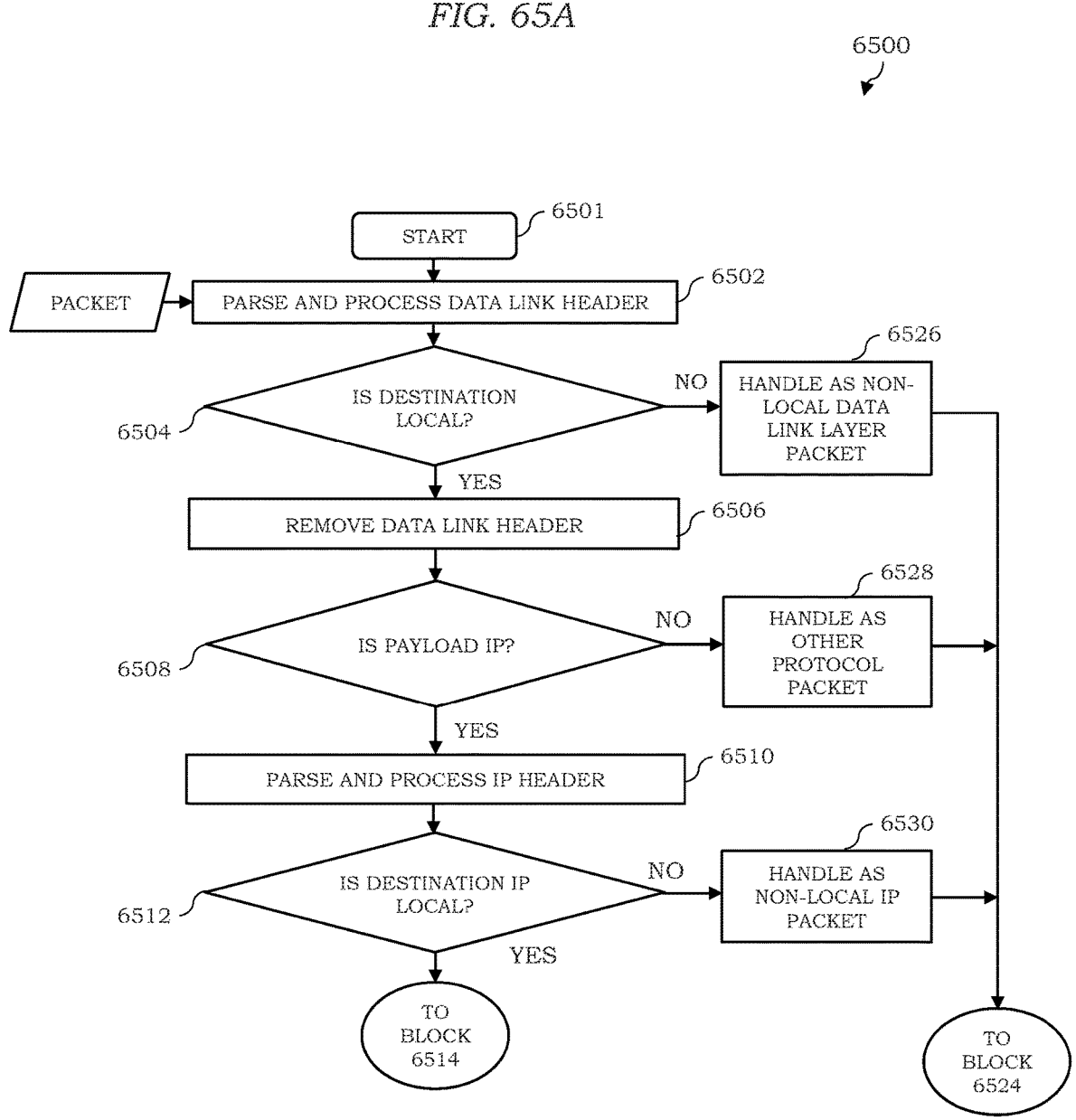
FIGS. 65A-65B depict an example embodiment of a method for receiving and processing of MPLS-in-QUIC packets.
Figure 65B:
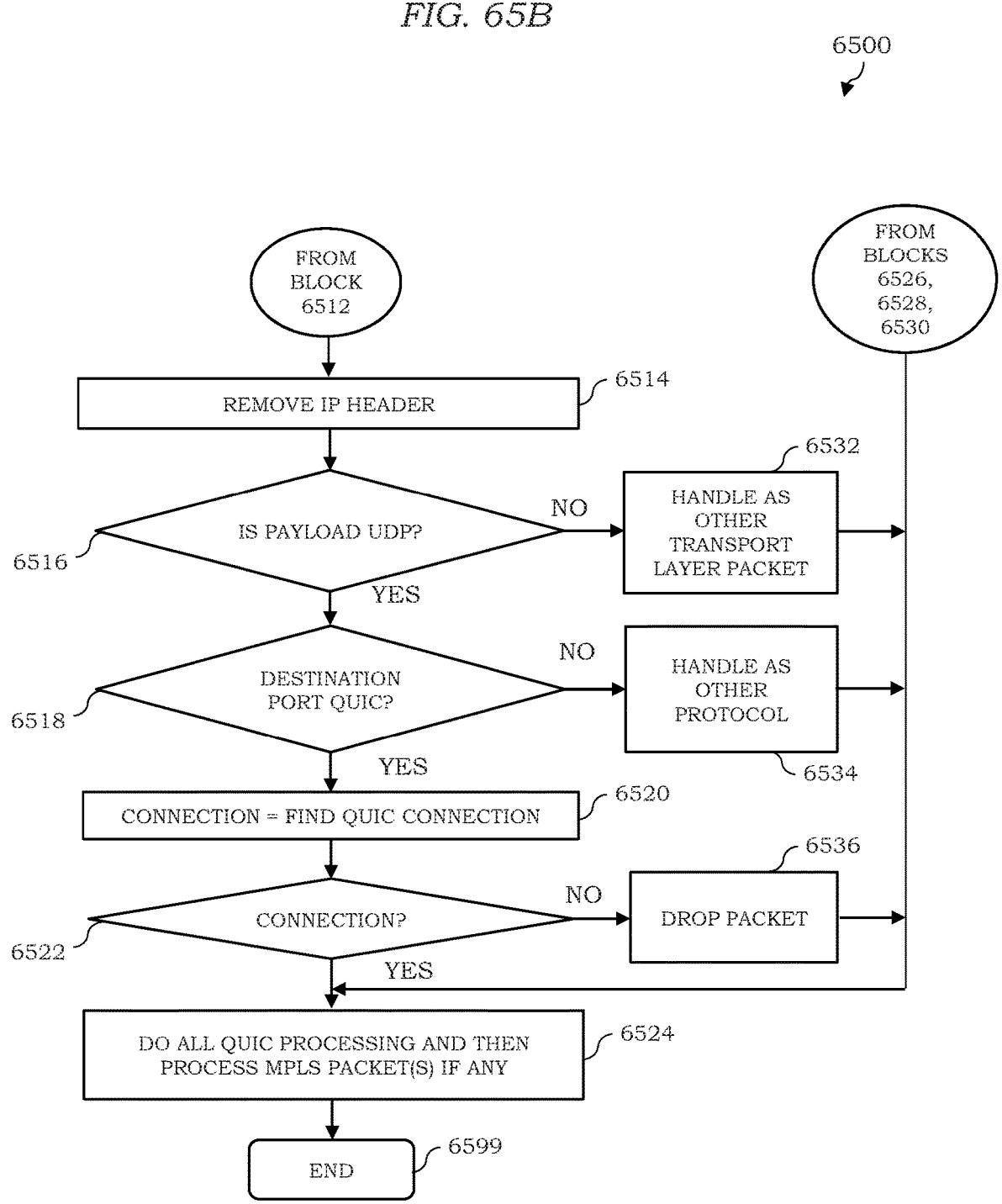

FIGS. 65A-65B depict an example embodiment of a method for receiving and processing of MPLS-in-QUIC packets. The method 6500 may be based on the generic method 2500 presented in FIG. 25. It will be appreciated that, although primarily presented as being performed serially, at least a portion of the blocks of method 6500 may be performed contemporaneously or in a different order than as presented in FIGS. 65A-65B. The input to method 6500 includes a packet received on the wire. At block 6501, the method 6500 begins.

Block 6502 parses and processes the data link header at the top of the packet, and the method 6500 then proceeds to block 6504. It is noted that block 6502 may be performed by the data link layer of the LSR.

Block 6504 checks if the data link layer indicates the packet to be local, meaning that this LSR that is executing the method 6500 is the termination point of the data link on which the packet arrived. For example, if the data link header is an Ethernet header and if the destination MAC address in the Ethernet header is local to the LSR, then the Ethernet link terminates on the LSR. If the packet is local at the data link layer then the method 6500 proceeds to block 6506, otherwise the method 6500 proceeds to block 6526. Block 6526 performs handling of the packet at the data link layer as a non-local packet, which may result in forwarding of the packet further at the data link layer, and the method 6500 then proceeds to block 6599 where the method 6500 ends. Block 6506 removes the data link header from the packet as the LSR is the end of the data link and the method 6500 then proceeds to block 6508. It is noted that blocks 6504-6506 and block 6526 may be performed by the data link layer of the LSR.

Block 6508 checks if the payload indicated by the data link header is IP. For example, if data link header is an Ethernet header then its Ethertype field indicates the payload type. If the Ethernet header has VLAN tags, then the Ethertype field in the last VLAN tag indicates the payload type. If the payload is IP, then the method 6500 proceeds to block 6510, otherwise the method 6500 proceeds to block 6528. Block 6528 handles the packet as non-IP packet, and the method 6500 then proceeds to block 6599 where the method 6500 ends. It is noted that block 6508 and block 6526 may be performed by the data link layer of the LSR.

Block 6510 processes the IP packet in the IP layer based on its IP header. For example, the destination address of the IP header is looked up in an IP route table to make a forwarding decision on the IP packet. From block 6510, the method 6500 proceeds to block 6512. Block 6512 checks if the destination address is local (e.g., whether an IP route table lookup matched the destination address as a locally configured IP address in the LSR). If the destination address is not local, then the method 6500 proceeds to block 6530, otherwise the method 6500 proceeds to block 6514. Block 6530 handles the packet as non-local IP packet, such as by forwarding the packet to the next-hop associated with the matching route entry from the IP route table lookup, and the method 6500 then proceeds to block 6599 where the method 6500 ends. It is noted that blocks 6510-6512 and block 6530 may be performed by the IP layer of the LSR.

Block 6514 removes the IP header from the IP packet, as it is a local packet, and the method 6500 then proceeds to block 6516. Block 6516 checks if the packet is a UDP packet. For example, if the IP header was IPv4 then block 6516 may check if the protocol field in the IPv4 header was set to 17 (UDP) or if the IP header was IPv6 then block 6516 may check if the next-header field in the IPv6 header was set to 17 (UDP). If the packet is not a UDP packet, then the method 6500 proceeds to block 6532, otherwise the method 6500 proceeds to block 6518. Block 6532 handles the packet for the respective IP protocol type and then the method 6500 proceeds to block 6599 where the method 6500 ends. It is noted that blocks 6514-6516 may be performed by the IP layer of the LSR.

Block 6518 checks if the destination port in the UDP header indicates QUIC as the payload (e.g., the value is 80, 443, or a network wide value assigned administratively to identify QUIC as the payload). If the payload is not QUIC, then the method 6500 proceeds to block 6534, otherwise the method 6500 proceeds to block 6520. Block 6534 handles the packet for the respective port and the method 6500 then proceeds to block 6599 where the method 6500 ends.

Block 6520 finds the QUIC connection for the QUIC packet based on the Destination Connection ID in the QUIC Long Header or the QUIC Short Header, and the method 6500 then proceeds to block 6522. Block 6522 checks if a matching QUIC connection is found. If a matching QUIC connection is not found, then the method 6500 proceeds to block 6536, otherwise the method 6500 proceeds to block 6524. Block 6536 drops the packet as erroneous packet and the method 6500 then proceeds to block 6599 where the method 6500 ends.

Block 6524 performs QUIC layer processing on the QUIC packet. For each GENERIC_STREAM frame in the packet that indicates MPLS as its payload, it processes the MPLS packets from the Stream Data in the frame. From block 6524, the method 6500 proceeds to block 6599 where the method 6500 ends.

At block 6599, the method 6500 ends.

Figure 66:
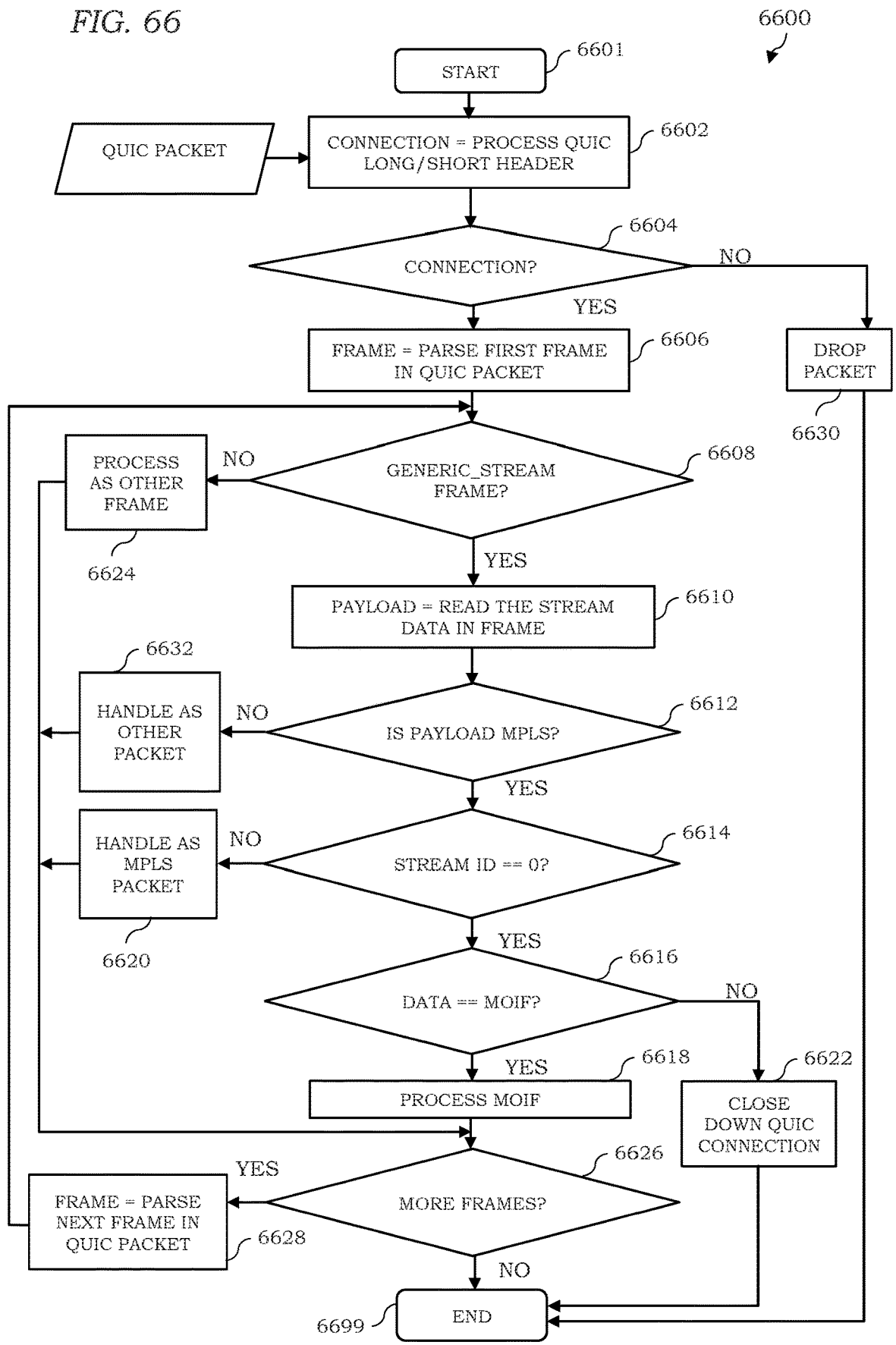
FIG. 66 depicts an example embodiment of a method for processing of MPLS-in-QUIC packets from a QUIC packet.

FIG. 66 depicts an example embodiment of a method for processing of MPLS-in-QUIC packets from a QUIC packet. The method 6600 may be used to provide block 6524 of method 6500 of FIGS. 65A-65B and may be based on the generic method 2500 presented in FIG. 25. It will be appreciated that, although primarily presented as being performed serially, at least a portion of the blocks of method 6600 may be performed contemporaneously or in a different order than as presented in FIG. 66. The input to method 6600 includes a QUIC packet received for a potential existing connection. At block 6601, the method 6600 begins. Block 6602 processes the QUIC Short Header or the QUIC Long Header (whichever is present, although it will be appreciated that most likely it will be the QUIC Short Header) in the received packet. In this block, it finds the existing QUIC connection based on the connection ID(s) in the header. From block 6602, the method 6600 proceeds to block 6604. Block 6604 checks if a connection is found. If a connection is not found, then the method 6600 proceeds to block 6630, otherwise the method 6600 proceeds to block 6606. Block 6630 drops the packet and the method 6600 then proceeds to block 6699 where the method 6600 ends. Block 6606 parses the first frame in the QUIC packet and the method 6600 then proceeds to block 6608. Block 6608 checks if the frame is a GENERIC_STREAM frame. If the frame is not a GENERIC_STREAM frame then the method 6600 proceeds to block 6624, otherwise the method 6600 proceeds to block 6610. Block 6624 processes the frame using QUIC mechanisms and the method 6600 then proceeds to block 6626. Block 6610 reads the Stream Data (Payload) from the GENERIC_STREAM frame and the method 6600 then proceeds to block 6612. Block 6612 checks if the payload, determined by the Layer Type and Protocol ID fields in the GENERIC_STREAM, indicated that the packet is an MPLS packet. If the payload type is MPLS then p the method 6600 proceeds to block 6614, otherwise the method 6600 proceeds to block 6632. Block 6632 handles the payload as per the payload type. Block 6614 checks if the Stream ID in GENERIC_STREAM is 0. If the Stream ID in the GENERIC_STREAM is not 0, then the method 6600 proceeds to block 6620, otherwise the method 6600 proceeds to block 6616. Block 6620 provides the payload to the MPLS overlay layer. The MPLS Label Stack of an MPLS Packet in the payload identifies the MPLS overlay to which the MPLS payload belongs. From block 6620 the method 6600 proceeds to block 6626. Block 6616 checks if the payload is a MOIF packet. This determination is made if the Stream ID of the GENERIC_STREAM frame is 0 and the payload is MOIF. If the payload is not a MOIF packet then this packet is not expected and the method 6600 proceeds to block 6622, otherwise the method 6600 proceeds to block 6618. Block 6622 closes the QUIC connection using appropriate methods (e.g., which notifies the remote LSR with reason for closure, such as by sending a CONNECTION CLOSE frame in a QUIC packet in the context of the connection), and the method 6600 then proceeds to block 6699 where the method 6600 ends. Block 6618 processes the MOIF. It is noted that if the LSR was the initiator of the connection then the block 6618 may be implemented by the method 1700 of FIG. 17, otherwise the block 6618 may be implemented by the method 2100 of FIG. 21. From block 6618 the method 6600 proceeds to block 6626. It is noted that blocks 6614-6620 may be performed by the MPLS overlay layer, which is a user of the QUIC connection. Block 6626 checks if there are more frames in the QUIC packet. If there are no more frames in the QUIC packet then the method 6600 proceeds to block 6699 where the method 6600 ends, otherwise the method 600 proceeds to block 6628. Block 6628 parses the next frame in the QUIC packet and the method 6600 then returns to block 6608 to repeat the subsequent blocks for the next frame. At block 6699, the method 6600 ends.

It is noted that whether the top label of the encapsulated MPLS packet is downstream-assigned or upstream-assigned may be determined according various criteria. For example, if the tunnel destination IP address is a unicast address, the top label may be downstream-assigned. For example, if the tunnel destination IP address is an IP multicast address, either all encapsulated MPLS packets in the particular tunnel have a downstream-assigned label at the top of the stack or all encapsulated MPLS packets in the particular tunnel have an upstream-assigned label at the top of the stack. The means by which this is determined for a particular tunnel may be performed in various ways. In the absence of any knowledge about a specific tunnel, the label may be presumed to be upstream-assigned.

It is noted that intermediate routers, upon receiving UDP encapsulated QUIC packets, may balance these packets based on the hash of the five-tuple (i.e., source IP address in IP Header, destination IP address in IP Header, source port in UDP Header, destination port in UDP Header, and protocol/next-header field in IP Header) of UDP packets. If load balancing is desirable among MPLS overlays, then a pool of IP addresses may be used at both LSRs in the QUIC connection and then assigned to send MPLS overlay packets across the pool of IP addresses.

It will be appreciated that, although omitted for purposes of clarity, various example embodiments presented herein for supporting MPLS-in-TCP, MPLS-in-SCTP, and MPLS-in-QUIC may be used, or adapted for use, to provide MPLS-in-TLS.

Figure 67:
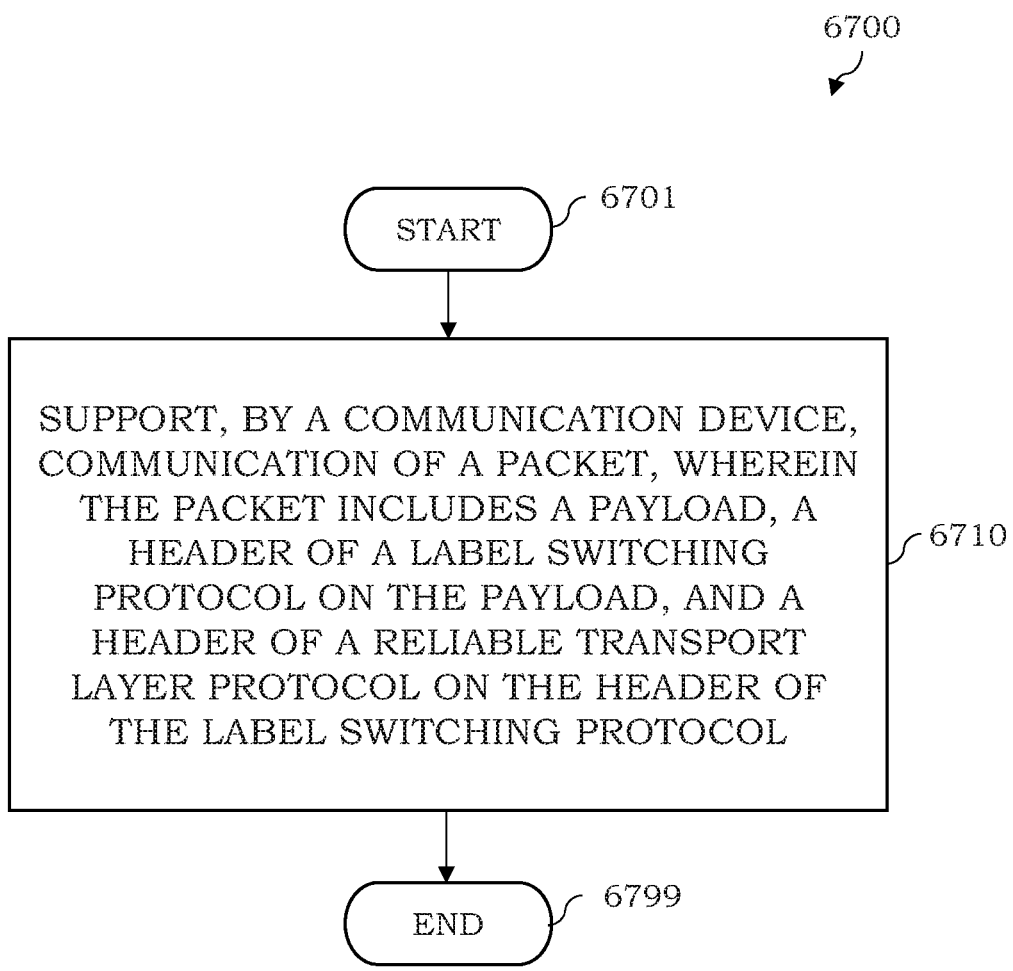
FIG. 67 depicts an example embodiment of a method for supporting reliability of an overlay.

FIG. 67 depicts an example embodiment of a method for supporting reliability of an overlay. It will be appreciated that although primarily presented as being performed serially, at least a portion of the blocks of method 6700 may be performed contemporaneously or in a different order than as presented in FIG. 67. At block 6701, the method 6700 begins. At block 6710, support, by a communication device, communication of a packet, wherein the packet includes a payload, a header of a label switching protocol on the payload, and a header of a reliable transport layer protocol on the header of the label switching protocol. At block 6799, the method 6700 ends.

Various example embodiments for supporting reliability of an overlay may provide various advantages or potential advantages. For example, various example embodiments for supporting reliability of an overlay may obviate the need to rely of relatively unreliable overlays (e.g., in the case of MPLS overlays, relatively unreliable overlays such as MPLS-in-IP overlays, MPLS-in-GRE overlays, MPLS-in-UDP overlays, and so forth); however, it will be appreciated that at least some such overlays may still be used for various purposes. Various example embodiments for supporting reliability of an overlay may provide various other advantages or potential advantages.

Figure 68:
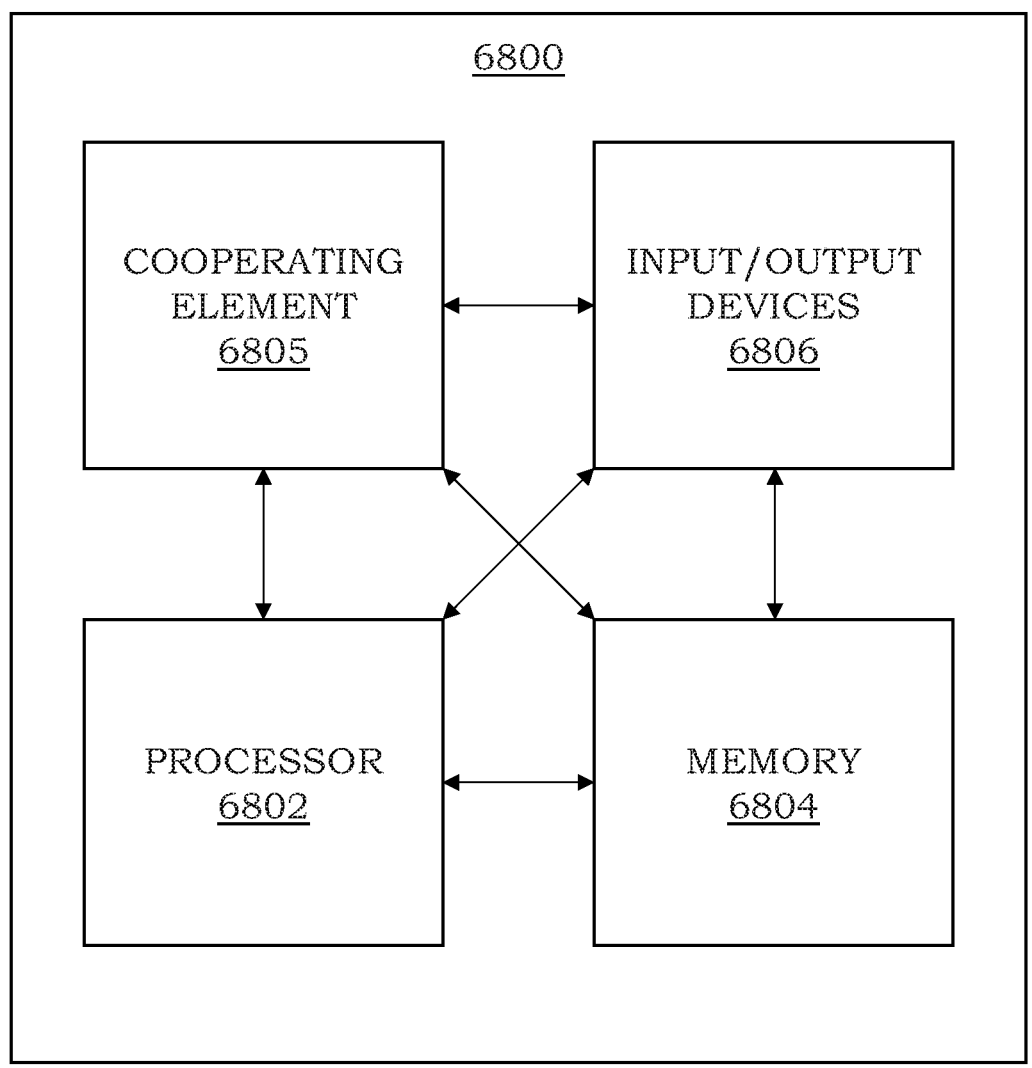
FIG. 68 depicts an example embodiment of a computer suitable for use in performing various functions presented herein.

FIG. 68 depicts an example embodiment of a computer suitable for use in performing various functions presented herein.

The computer 6800 includes a processor 6802 (e.g., a central processing unit (CPU), a processor, a processor having a set of processor cores, a processor core of a processor, or the like) and a memory 6804 (e.g., a random access memory, a read only memory, or the like). The processor 6802 and the memory 6804 may be communicatively connected. In at least some example embodiments, the computer 6800 may include at least one processor and at least one memory including computer program code, wherein the at least one memory and the computer program code are configured to, with the at least one processor, cause the computer to perform various functions presented herein.

The computer 6800 also may include a cooperating element 6805. The cooperating element 6805 may be a hardware device. The cooperating element 6805 may be a process that can be loaded into the memory 6804 and executed by the processor 6802 to implement various functions presented herein (in which case, for example, the cooperating element 6805 (including associated data structures) can be stored on a non-transitory computer-readable storage medium, such as a storage device or other suitable type of storage element (e.g., a magnetic drive, an optical drive, or the like)).

The computer 6800 also may include one or more input/output devices 6806. The input/output devices 6806 may include one or more of a user input device (e.g., a keyboard, a keypad, a mouse, a microphone, a camera, or the like), a user output device (e.g., a display, a speaker, or the like), one or more network communication devices or elements (e.g., an input port, an output port, a receiver, a transmitter, a transceiver, or the like), one or more storage devices (e.g., a tape drive, a floppy drive, a hard disk drive, a compact disk drive, or the like), or the like, as well as various combinations thereof.

It will be appreciated that computer 6800 may represent a general architecture and functionality suitable for implementing functional elements described herein, portions of functional elements described herein, or the like, as well as various combinations thereof. For example, computer 6800 may provide a general architecture and functionality that is suitable for implementing one or more elements presented herein, such as a network devices (e.g., routers or the like), network controllers, or the like, as well as various combinations thereof.

It will be appreciated that at least some of the functions presented herein may be implemented in software (e.g., via implementation of software on one or more processors, for executing on a general purpose computer (e.g., via execution by one or more processors) so as to provide a special purpose computer, and the like) and/or may be implemented in hardware (e.g., using a general purpose computer, one or more application specific integrated circuits, and/or any other hardware equivalents).

It will be appreciated that at least some of the functions presented herein may be implemented within hardware, for example, as circuitry that cooperates with the processor to perform various functions. Portions of the functions/elements described herein may be implemented as a computer program product wherein computer instructions, when processed by a computer, adapt the operation of the computer such that the methods and/or techniques described herein are invoked or otherwise provided. Instructions for invoking the various methods may be stored in fixed or removable media (e.g., non-transitory computer-readable media), transmitted via a data stream in a broadcast or other signal bearing medium, and/or stored within a memory within a computing device operating according to the instructions.

It will be appreciated that the term "or" as used herein refers to a non-exclusive "or" unless otherwise indicated (e.g., use of "or else" or "or in the alternative").

It will be appreciated that, although various embodiments which incorporate the teachings presented herein have been shown and described in detail herein, those skilled in the art can readily devise many other varied embodiments that still incorporate these teachings.

What is claimed is:

1. An apparatus, comprising:
at least one processor; and
at least one memory storing instructions that, when executed by the at least one processor, cause the apparatus to:
support, by a communication device, communication of a packet, wherein the packet includes a payload, a header of a label switching protocol encapsulating the payload, a control header of the label switching protocol encapsulating the header of the label switching protocol and the payload, and a header of a reliable transport layer protocol encapsulating the control header of the label switching protocol, the header of the label switching protocol, and the payload.

2. The apparatus of claim 1, wherein the header of the label switching protocol includes a set of labels.

3. The apparatus of claim 2, wherein the set of labels is organized as a label stack.

4. The apparatus of claim 1, wherein the label switching protocol is associated with a label switching overlay.

5. The apparatus of claim 1, wherein the label switching protocol includes a Multiprotocol Label Switching (MPLS) protocol.

6. The apparatus of claim 1, wherein the reliable transport layer protocol includes a connection-oriented transport layer protocol.

7. The apparatus of claim 1, wherein the reliable transport layer protocol includes a transport layer protocol configured to support at least one of flow control or congestion control.

8. The apparatus of claim 1, wherein the reliable transport layer protocol includes a Transmission Control Protocol (TCP), a Stream Control Transmission Protocol (SCTP), a Quick User Datagram Protocol (UDP) Internet Connection (QUIC) protocol, or a Transport Layer Security (TLS) protocol.

9. The apparatus of claim 1, wherein the control header is configured to indicate a size of the payload and the header of the label switching protocol.

10. The apparatus of claim 1, wherein the packet includes a header of a network layer protocol encapsulating the header of the reliable transport layer protocol, the control header of the label switching protocol, the header of the label switching protocol, and the payload.

11. The apparatus of claim 10, wherein the network layer protocol includes an Internet Protocol (IP).

12. The apparatus of claim 10, wherein the packet includes a header of a data link layer protocol encapsulating the header of the network layer protocol, the header of the reliable transport layer protocol, the control header of the label switching protocol, the header of the label switching protocol, and the payload.

13. The apparatus of claim 12, wherein the data link layer protocol includes at least one of Ethernet or Point-to-Point Protocol (PPP).

14. The apparatus of claim 1, wherein, to support communication of the packet, the instructions, when executed by the at least one processor, cause the apparatus to:
generate, by the communication device, the packet; and
send, by the communication device toward a next-hop node, the packet.

15. The apparatus of claim 1, wherein, to support communication of the packet, the instructions, when executed by the at least one processor, cause the apparatus to:
receive, by the communication device, the packet; and
process the packet.

16. The apparatus of claim 1, wherein the instructions, when executed by the at least one processor, cause the apparatus to:
support, by the communication device, communication of an overlay initial frame configured to convey one or more overlay parameters for an overlay that is supported between the communication device and a remote communication device based on the reliable transport layer protocol.

17. The apparatus of claim 16, wherein the overlay initial frame is sent by the communication device toward the remote communication device or received by the communication device from the remote communication device.

18. A method, comprising:
supporting, by a communication device, communication of a packet, wherein the packet includes a payload, a header of a label switching protocol encapsulating the payload, a control header of the label switching protocol encapsulating the header of the label switching protocol and the payload, and a header of a reliable transport layer protocol encapsulating the control header of the label switching protocol, the header of the label switching protocol, and the payload.

19. An apparatus, comprising:
at least one processor; and
at least one memory storing instructions that, when executed by the at least one processor, cause the apparatus to:
  support, by a communication device, communication of a packet including a payload, a header of a label switching protocol encapsulating the payload, and a header of a reliable transport layer protocol encapsulating the header of the label switching protocol and the payload.

* * * * *